US011107274B2

(12) United States Patent
Zhang

(10) Patent No.: US 11,107,274 B2
(45) Date of Patent: Aug. 31, 2021

(54) METHODS OF PROCESSING THREE DIMENSIONAL MODELS

(71) Applicant: Purdue Research Foundation, West Lafayette, IN (US)

(72) Inventor: Jiansong Zhang, Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 16/574,001

(22) Filed: Sep. 17, 2019

(65) Prior Publication Data

US 2020/0090400 A1 Mar. 19, 2020

Related U.S. Application Data

(60) Provisional application No. 62/732,033, filed on Sep. 17, 2018.

(51) Int. Cl.
*G06T 19/20* (2011.01)
*G06T 17/05* (2011.01)
*G06T 7/70* (2017.01)
*G06T 17/30* (2006.01)

(52) U.S. Cl.
CPC ............... *G06T 17/05* (2013.01); *G06T 7/70* (2017.01); *G06T 17/30* (2013.01); *G06T 19/20* (2013.01)

(58) Field of Classification Search
CPC .......... G06T 17/05; G06T 19/20; G06T 7/70; G06T 17/30
See application file for complete search history.

(56) References Cited

U.S. PATENT DOCUMENTS

| 7,373,284 B2 * | 5/2008 | Stabelfeldt | G06F 30/23 703/2 |
| 2001/0047250 A1 * | 11/2001 | Schuller | G06F 30/13 703/1 |
| 2017/0092008 A1 * | 3/2017 | Djorgovski | G06T 15/205 |

(Continued)

OTHER PUBLICATIONS

Ferreira, A WebGL application based on BIM IFC, Masters degree dissertation, 2012.

(Continued)

*Primary Examiner* — Said Broome
(74) *Attorney, Agent, or Firm* — Piroozi-IP, LLC

(57) ABSTRACT

A data-driven, object-oriented, and customizable method for visualizing a three-dimensional (3D) structure is disclosed which includes receiving a model-based data file including instantiation of elements of a structure, identifying one or more instances of one or more objects, providing data associated with the plurality of polygons for the object geometry to a visualization engine, providing data associated with the plurality of polygons for the object placement information to the visualization engine, providing data associated with the plurality of polygons for the object color and transparency information to the visualization engine, providing data associated with the plurality of polygons for the object functional information to the visualization engine, generating a 3D model of the object based on the plurality of polygons, and outputting a rendering of the 3D model for displaying on a digital display.

4 Claims, 47 Drawing Sheets

(56) References Cited

U.S. PATENT DOCUMENTS

2017/0315697 A1* 11/2017 Jacobson ............ H04L 12/2816

OTHER PUBLICATIONS

Chandrasekar, Calculate rotation matrix to align vector A to vector B in 3d, Mathematics Stack Exchange article, Accessed 2017.
Claus, Industry foundation classes data model based lighting analyses building information modeling workflow optimization: A conversion from the Industry Foundation Classes data file format to a validated Radiance file format, Masters Thesis, 2015.
Selman, Java 3D Programming, Chapter 15, Accessed 2017.

* cited by examiner

1300

```
Start
  ↓
```

┌─ 1302
Input: a list of points (LoP1) representing boundary points of the bottom face of a solid (S), and list of points (LoP2) that contains the boundary points of the top face of the solid (S)

┌─ 1304
Divide bottom face, which is bounded by LoP1 into triangles, all triangles being formed by the first point ($p_0$) in the list and two consecutive neighboring points ($p_i$ and $p_{i+1}$, where $i \geq 1$ and $i + 1 <$ length of point list) in reverse order: $p_0 - p_{i+1} - p_i$ ┌─ 1306
Divide the top face, which is bounded by LoP2 into triangles, in the same was as the previous step 1304

┌─ 1308
Divide each parallelogrammic side face (which is bounded by two neighboring points in LoP1 $p_i$ and $p_{i+1}$ and corresponding two neighboring points in LoP2 $p'_i$ and $p'_{i+1}$, where $i \geq 1$ and $i + 1 <$ length of point list) into two triangles $p_i - p_{i+1} - p'_{i+1}$ and $p'_{i+1} - p'_i - p_i$, when $i + 1 =$ length of point list, the two triangles are $p_i - p_0 - p'_0$ and $p'_0 - p'_i - p_i$.

┌─ 1310
Output: graphical elements (triangles) for visualizing the solid shape (S)

End

```
         ┌─────────┐
         │  Start  │
         └────┬────┘
              ▼                                           ┌─ 1402
    ╱─────────────────────────────────────────────────────╱
   ╱  Input: an "IfcPolyLoop", a Boolean value for describing the
  ╱   orientation of its parent "IfcFaceOuterBound"               ╱
 ╱─────────────────────────────────────────────────────────────╱
              │
              ▼                                           ┌─ 1404
    ┌─────────────────────────────────────────────────────┐
    │ Read the value of "Polygon" attribute of "IfcPolyLoop" into a list of
    │                       points LoP                    │
    └─────────────────────┬───────────────────────────────┘
                          ▼                               ┌─ 1406
              ┌───────────────────────────────────────────┐
              │ Use the first point (p₀) in LoP as the origin │
              └───────────────────────┬───────────────────┘
                                      ▼                   ┌─ 1408
    ┌─────────────────────────────────────────────────────┐
    │ Use the origin to form a triangle with each pair of neighboring points
    │ (pᵢ and pᵢ₊₁ where i ≥ 1 and i + 1 < length of point list) in LoP
    └─────────────────────────┬───────────────────────────┘
                              ▼                           ┌─ 1410
                          ╱───────────╲
                         ╱  Boolean    ╲
              True      ╱    Input      ╲     False
          ┌────────────╱                 ╲────────────┐
          │            ╲                 ╱            │
          │             ╲───────────────╱             │
          ▼                                           ▼
    ┌─ 1412                                     ┌─ 1414
    ┌─────────────────────┐              ┌─────────────────────┐
    │ Triangle is         │              │ Triangle is         │
    │ p₀ — pᵢ — pᵢ₊₁      │              │ p₀ — pᵢ₊₁ — pᵢ      │
    └──────────┬──────────┘              └──────────┬──────────┘
               └────────────────┬───────────────────┘
                                ▼                   ┌─ 1416
              ╱─────────────────────────────────╱
             ╱ Output: resulting list of triangles ╱
            ╱─────────────────────────────────╱
                                │
                                ▼
                          ┌──────────┐
                          │   End    │
                          └──────────┘
```

FIG. 14A

METHODS OF PROCESSING THREE DIMENSIONAL MODELS

CROSS-REFERENCE TO RELATED APPLICATIONS

The present patent application is related to and claims the priority benefit of U.S. Provisional Patent Application Ser. No. 62/732,033 filed Sep. 17, 2018, the contents of which are hereby incorporated by reference in its entirety into the present disclosure.

STATEMENT REGARDING GOVERNMENT FUNDING

This invention was made with government support under CMMI 1745374 awarded by the National Science Foundation. The government has certain rights in the invention.

TECHNICAL FIELD

The present disclosure generally relates to computing methods and algorithms for rendering geometries, and in particular, to a computing method and algorithm for rendering geometries of objects in an industry foundation classes data model.

BACKGROUND

This section introduces aspects that may help facilitate a better understanding of the disclosure. Accordingly, these statements are to be read in this light and are not to be understood as admissions about what is or is not prior art.

Industry foundation classes (IFC) is an international standard for building and construction industry data—International Organization for Standardization (ISO) #16739. IFC data model is a building information modeling (BIM) instance model encoded using the IFC data schema. IFC data has three main representations—ifczip, ifcxml, and ifc STEP file. STEP file is the native IFC format, whereas ifcxml is an xml representation of an IFC file, and ifczip is a compression file format for IFC. Computer modeling is widely used in the industry for creating, editing, analyzing and displaying architectural and other designs.

In such BIM interfaces, there is a need to visualize objects with accurate geometries, location, color and transparency in order to understand and manage their interfaces. However, such visualization methodology is either not existent currently or if available it is on a rudimentary basis.

Therefore, there is an unmet need for a novel approach for a set of computer algorithms to efficiently render the geometries, location, color, and transparency of objects in an IFC data model such that the rendered geometries can be displayed on a computer screen or other types of digital display device.

SUMMARY

A data-driven, object-oriented, and customizable method for visualizing a three-dimensional (3D) structure is disclosed. The method includes receiving a model-based data file including instantiation of elements of a structure. The method also includes identifying one or more instances of one or more objects. For each object instance, the method further includes retrieving object geometry information, dividing the object geometry into a plurality of polygons, retrieving object placement information, associating the object placement information with the plurality of polygons, retrieving object color and transparency information, and associating the object color and transparency information with the plurality of polygons. The method also includes providing data associated with the plurality of polygons for the object geometry to a visualization engine. In addition, the method includes providing data associated with the plurality of polygons for the object placement information to the visualization engine. Furthermore, the method includes providing data associated with the plurality of polygons for the object color and transparency information to the visualization engine, generating a 3D model of the object based on the plurality of polygons, and outputting a rendering of the 3D model for displaying on a digital display.

A data-driven, object-oriented, and customizable method for visualizing a three-dimensional (3D) structure is disclosed. The method includes receiving a model-based data file including instantiation of elements of a structure. The method also includes identifying one or more instances of one or more objects. For each object instance, the method further includes retrieving object geometry information, dividing the object geometry into a plurality of polygons, retrieving object placement information, associating the object placement information with the plurality of polygons, retrieving object color and transparency information, associating the object color and transparency information with the plurality of polygons, retrieving object functional information, and associating the object functional information with the plurality of polygons. The method also includes providing data associated with the plurality of polygons for the object geometry to a visualization engine. In addition, the method includes providing data associated with the plurality of polygons for the object placement information to the visualization engine. Furthermore, the method includes providing data associated with the plurality of polygons for the object color and transparency information to the visualization engine, and providing data associated with the plurality of polygons for the object functional information to the visualization engine, generating a 3D model of the object based on the plurality of polygons, and outputting a rendering of the 3D model for displaying on a digital display.

BRIEF DESCRIPTION OF DRAWINGS

FIG. 13A is a flowchart diagram for algorithm Triangle_Generation.

FIG. 14A is a flowchart diagram for algorithm Draw PolyLoop.

DETAILED DESCRIPTION

Figure 1:
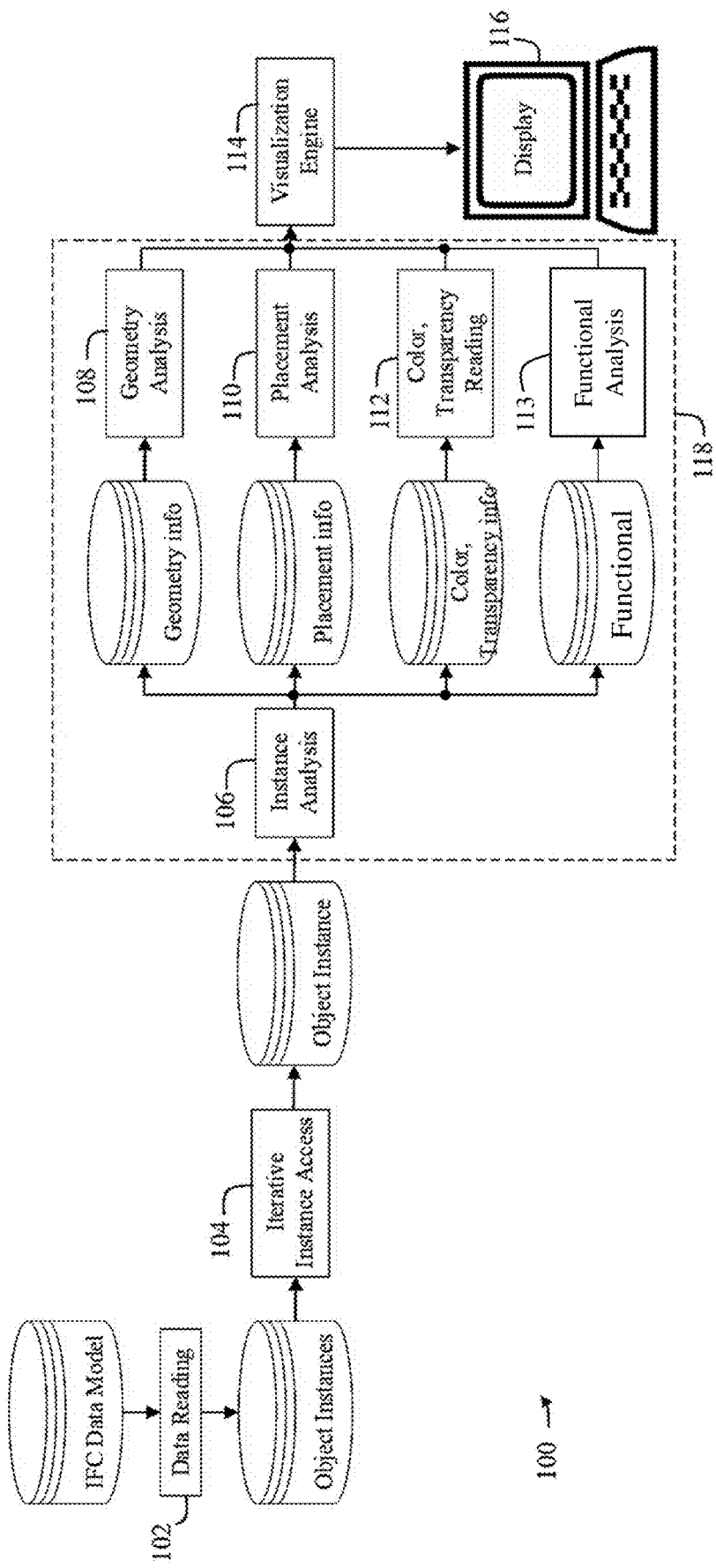
FIG. 1 is an embodiment of a method to efficiently render the geometries, location, color, and transparency of objects in an industry foundation class (IFC) data model.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

The disclosure presents a processing method in FIG. 1 and its included computer algorithms FIGS. 2-33 to efficiently render the geometries of objects in an IFC data model onto the computer screen or other types of digital display device.

Referring to FIG. 1, an embodiment of a method to efficiently render the geometries, location, color and transparency of objects in an industry foundation class (IFC) data model 100 is shown. In the embodied method 100, the first step 102 is to read all the entity instances from the IFC data model and create internal computing representations for each one of them. This step 102 falls under a broader type of process which is a parsing process, or a process in which each and every line of the IFC data model is parsed and the entity instances are transformed into computable representations such as, instances of classes in an object-oriented programming language (i.e. Java, C++, Python). The next step 104 is labeled as an iterative instance access process, which iterates through all entity instances in the IFC data model and selects the ones that are representing objects to be analyzed. Entity instances in an IFC data model representing objects may also be referred to as object instances, interchangeably. In this step 104, once an object instance is selected, a corresponding visualization process for the specific type of object is activated. It should be understood that there is a difference between entity instances and object instances. Object instances represent a subset of entity instances, in that only a portion of all entity instances in an IFC data model represent objects, such as IfcWallStandardCase, IfcWindow, IfcDoor, IfcBuildingElementProxy, and so on.

With further reference to FIG. 1, the step 106 following the step 104 is labeled as an instance analysis process in which each object instance is analyzed based on the type of object it belongs to. For all types of objects, four major types of information are extracted and used to feed the visualization engine 114: geometry information, placement information, color/transparency information, and functional information. Each type of information is processed through steps 108, 110, 112, and 113. Each of these blocks provide their associated analyses to the visualization engine 114. In particular, the block 113 analyzes functional information. The functional information can be further used to adjust the visualization of the above three types of information when in need. These may include forces, heat and mass flow, stresses, strains, electrical characteristics, optical characteristics, and other functional features such as material properties and behaviors that are relevant to the structure. For example, suppose heat profile of a structure is of interest. The sources of heat within the structure and the thermal parameters of the structure are analyzed to adjust, and provided along with geometry (e.g., size of walls), placement (location and orientation with respect to, e.g., south-facing), color, and transparency (e.g., windows, etc.) to the visualization engine 114 in order for the visualization engine 114 to not only visualize the structure but also the thermal parameters (e.g., similar to an infrared view of the wall, or structure). Once that information is processed, the next step is to feed the information into the visualization engine 114. Once the visualization engine 114 has finished its processes, a three-dimensional rendered object is displayed on a digital display 116 such as a computer screen.

In one embodiment, algorithms were developed for processing the following types of IFC objects: "IfcBuildingElementProxy," "IfcCovering," "IfcDoor," "IfcFurnishingElement," "IfcMember," "IfcFooting," "IfcOpeningElement," "IfcRailing," "IfcSlab," "IfcStairFlight," "IfcWallStandardCase," "IfcWall," and "IfcWindow." Furthermore, a generalized algorithm 200 (shown in FIG. 2) for processing (i.e. analyzing and visualizing) any type of object is also disclosed.

Figure 2:
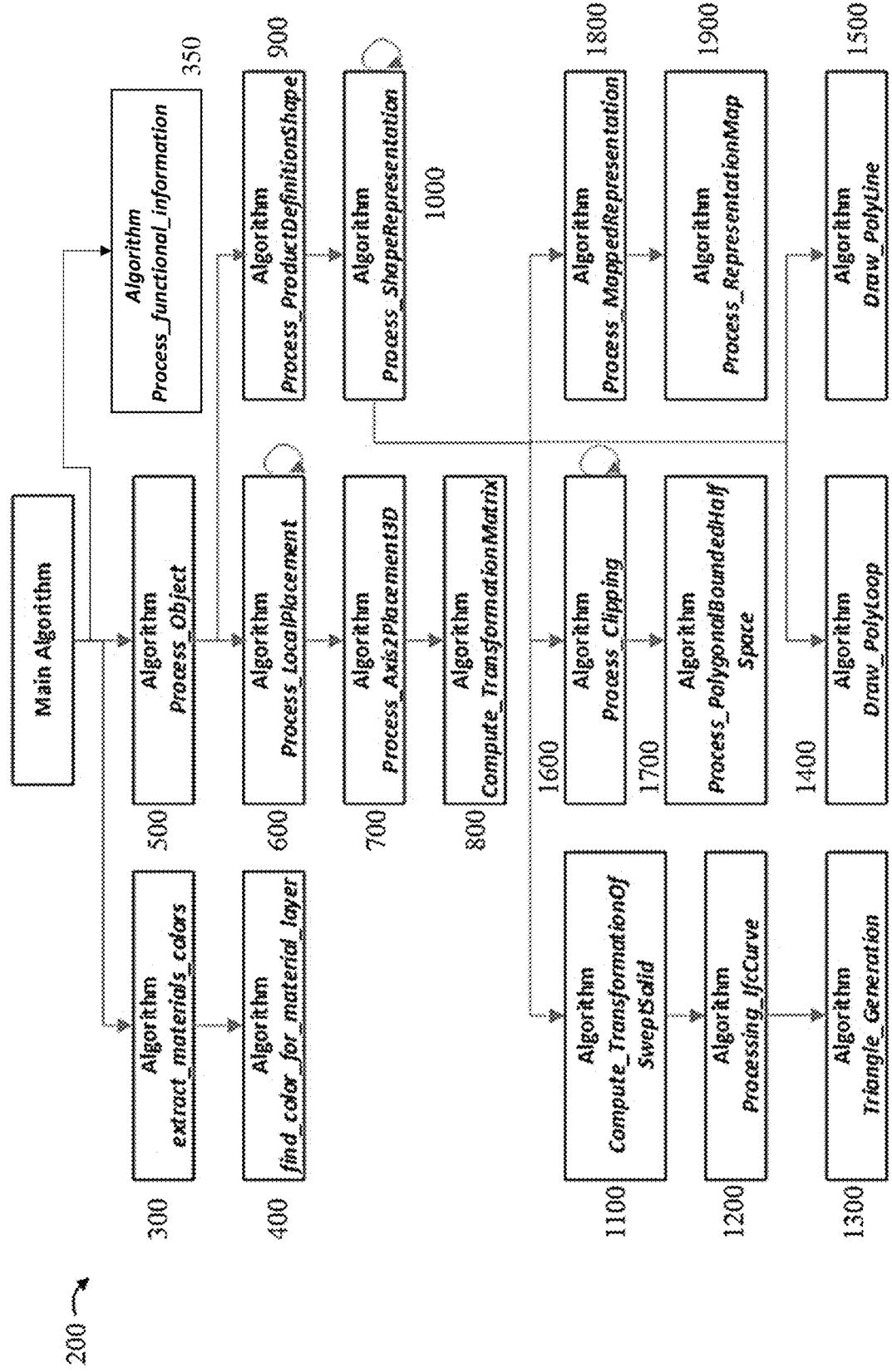
FIG. 2 is a call-relation diagram for an embodiment of a generalized algorithm for analyzing and visualizing an object in IFC.
Figure 3A:
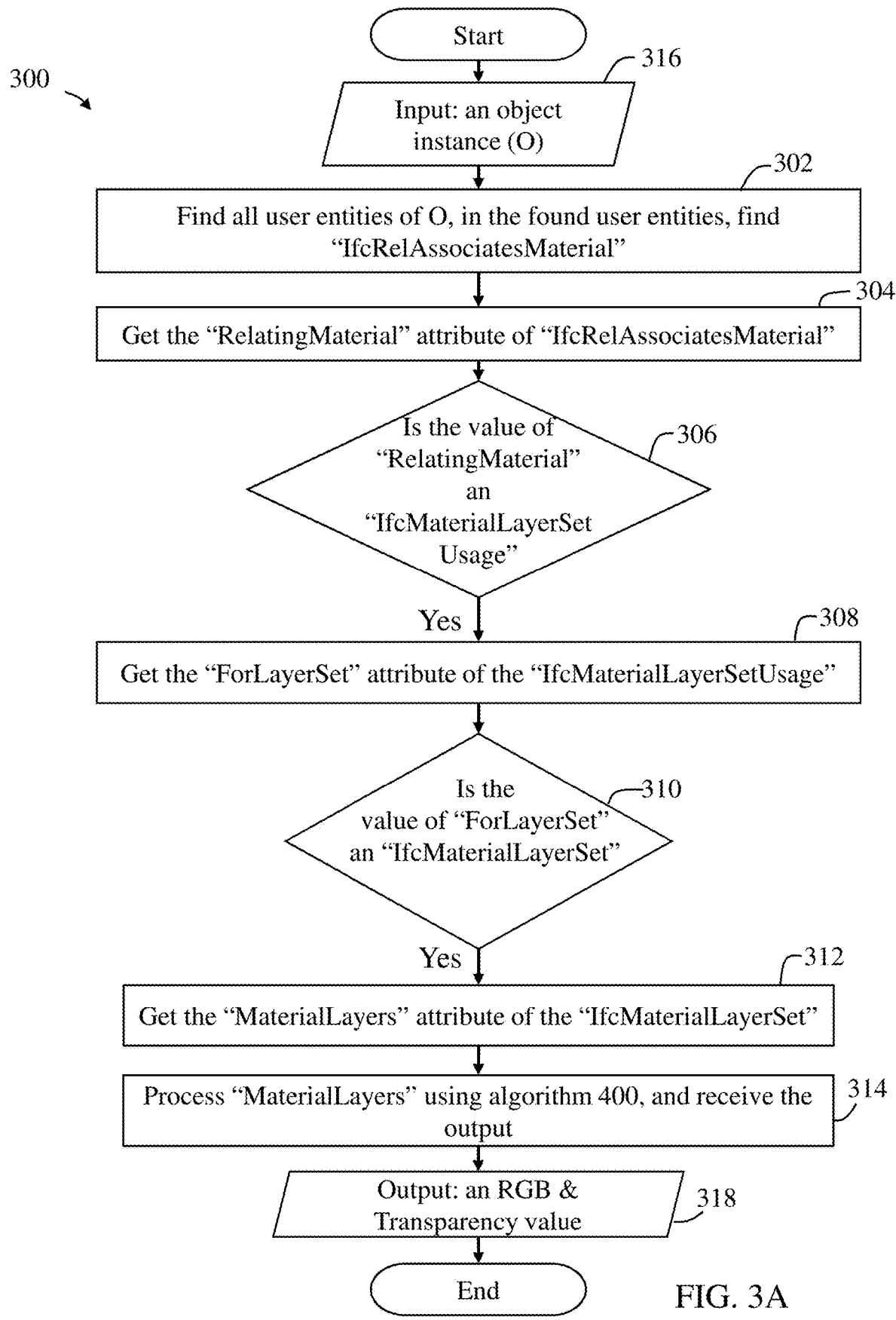
FIGS. 3A and 3B are flowchart diagrams for algorithm extract_materials_colors and algorithm Process_Junctional_information.
Figure 3B:
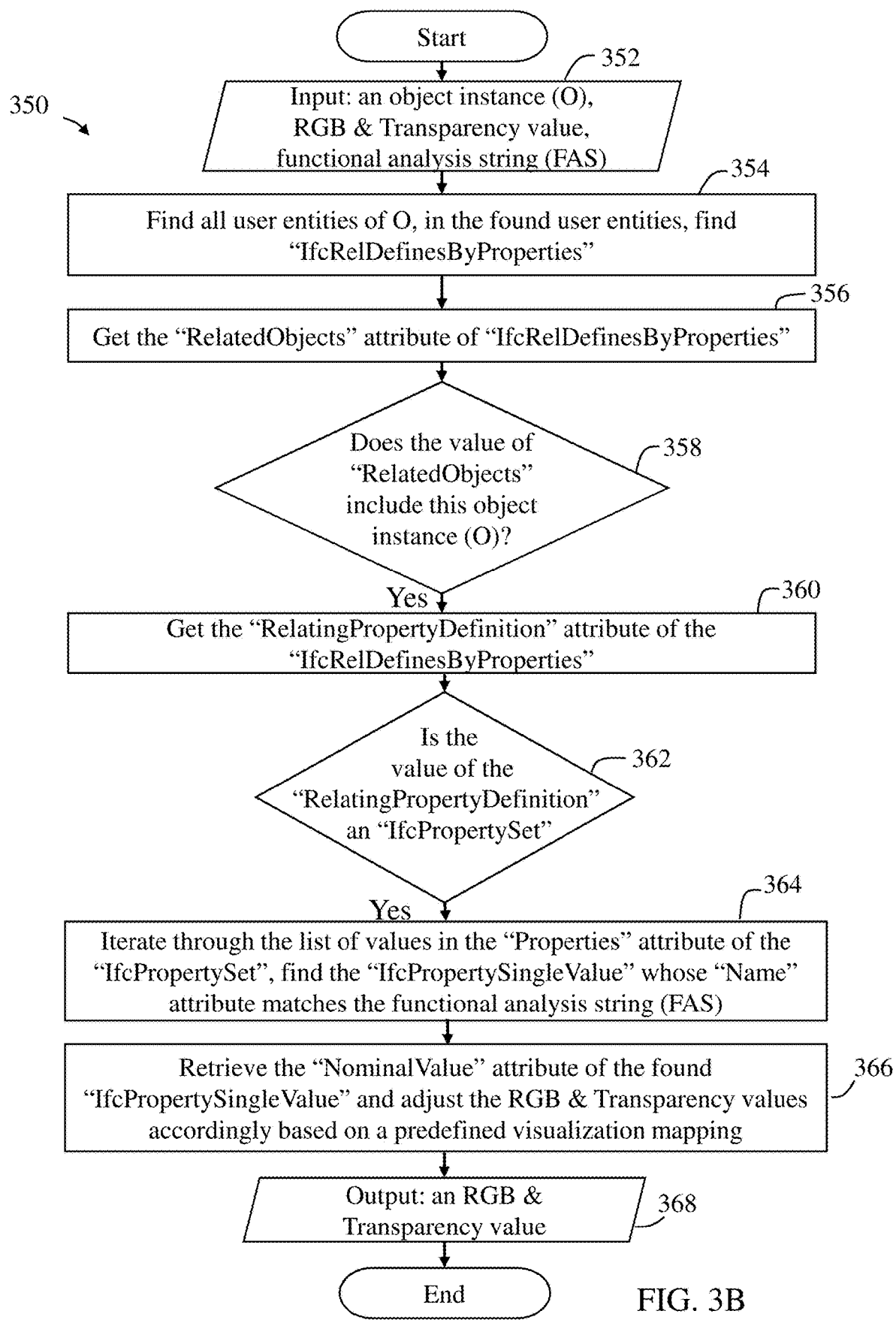

With reference to FIG. 2, a call-relation diagram for an embodiment of a generalized algorithm 200 for analyzing and visualizing an object in IFC is shown. The algorithm 200 includes a number of other algorithms interconnected as shown in FIG. 2. These algorithms are shown in FIGS. 3A, 3B, 4A, 4B, 4C, 5-10, 11A, 11B, 11C, 12, 13A, 14A, 15, 16A, 16B, 17A, 17B, 17C, 17D, 18A, 18B, and 19. With reference to FIG. 3A, a flowchart diagram for algorithm 300 extract materials colors is shown. The algorithm 300 takes as an input 316 an object instance (O), the algorithm then extracts the color and transparency information for said object instance (O) and outputs 318 an RGB value of color, and a transparency value. In order to accomplish this, the first step 302 in the algorithm 300 is to find all user entities, such as the entities that use O as a value of one of their attributes, of O, then in the found user entities, find "IfcRelAssociatesMaterial". The next step 304 is to get the "RelatingMaterial" attribute of "IfcRelAssociatesMaterial". The next step 306 is to determine whether or not the value of this "RelatingMaterial" attribute is an "IfcMaterialLayerSetUsage". If it is, then step 308 is processed. If is not, then the flowchart proceeds to the End at the bottom of the flowchart. It should be noted that in all the flowcharts of the present disclosure, unless otherwise shown, the alternative to a decision block proceeds to the bottom of the flowchart (i.e., to the "End" block). In this step 308, the "ForLayerSet" attribute of "IfcMaterialLayerSetUsage" is acquired. The next step 310 is to determine if the value of the "ForLayerSet" attribute is an "IfcMaterialLayerSet". If it is, then proceed to step 312 wherein, the "MaterialLayers" attribute of the "IfcMaterialLayerSet" is acquired. Proceeding to step 314, the "MaterialLayers" is used as input for algorithm 400, wherein the algorithm 400 processes the "MaterialLayers" and returns the RGB and transparency values. The algorithm 350, shown in FIG. 3B, takes as an input 352 an object instance (O), its found RGB and transparency values output from algorithm 300, and a functional analysis string (FAS) defined by the user. The first step 354 in the algorithm 350 is to find all user entities, such as the entities that use O as a value of one of their attributes, of O, then in the found user entities, find "IfcRelDefinesByProperties". The next step 356 is to get the "RelatedObjects" attribute of "IfcRelDefinesByProperties". The next step 358 is to determine if the value of the "RelatedObjects", which is a list of objects, contains the input object instance (O). If it does, then proceed to step 360 wherein, the "RelatingPropertyDefinition" attribute of the "IfcRelDefinesByProperties" is acquired. Proceeding to step 362, is to determine if the value of the "RelatingPropertyDefinition" attribute is a "IfcPropertySet". If it is, the step 364 iterates through the list of values in the "Properties" attribute of the "IfcPropertySet" and find the "IfcPropertySingleValue" whose "Name" attribute matches the input functional analysis string (FAS). Proceeding to step 366, the "NominalValue" attribute of the found "IfcPropertySingleValue" is retrieved and used to adjust the RGB and Transparency values according to a predefined visualizing mapping (i.e., a mapping from functional analysis values to RGB and Transparency values).

Figure 4A:
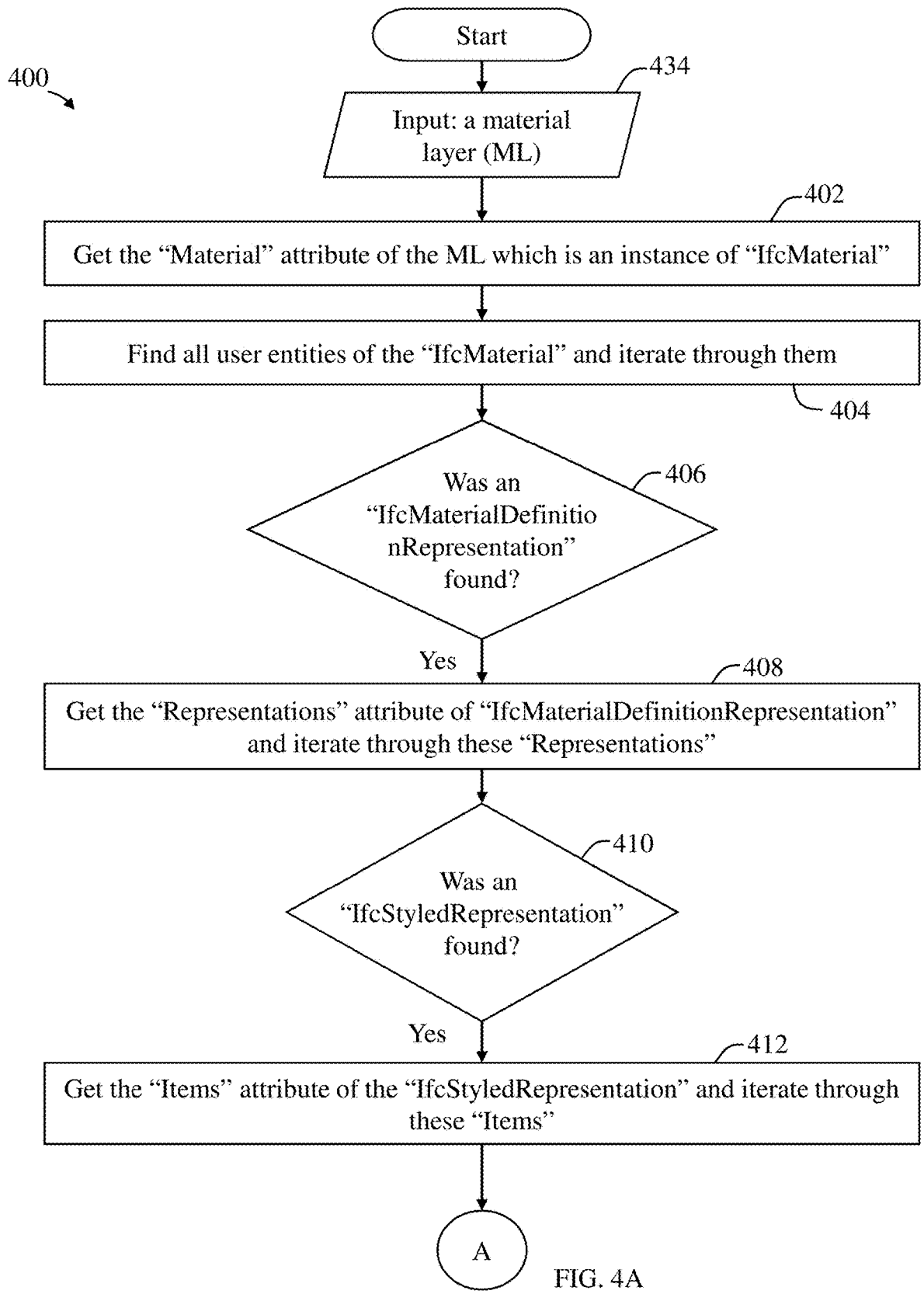
FIGS. 4A-C represent a flowchart diagram for algorithm find_color_for_material_layer.
Figure 4B:
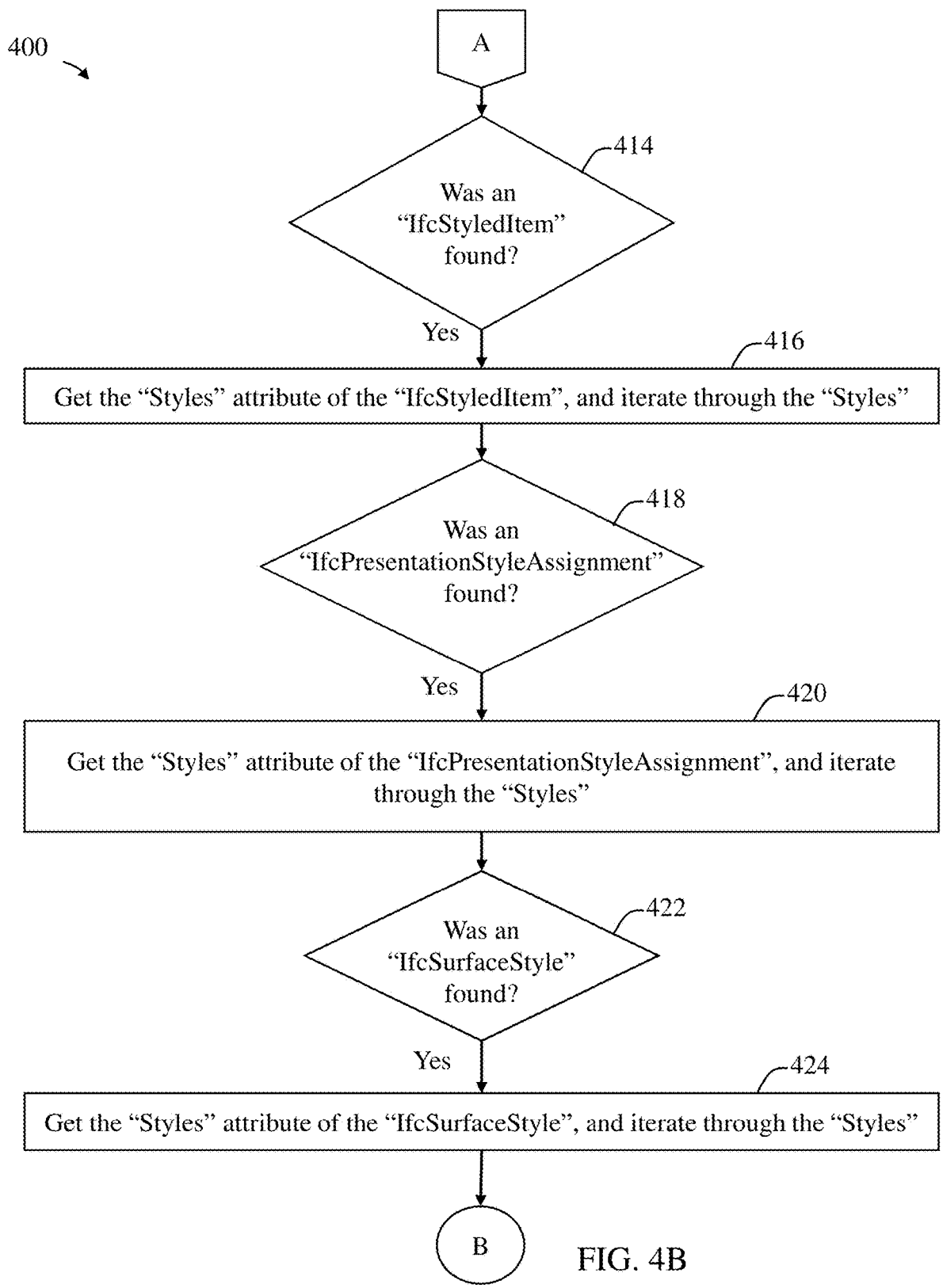
Figure 4C:
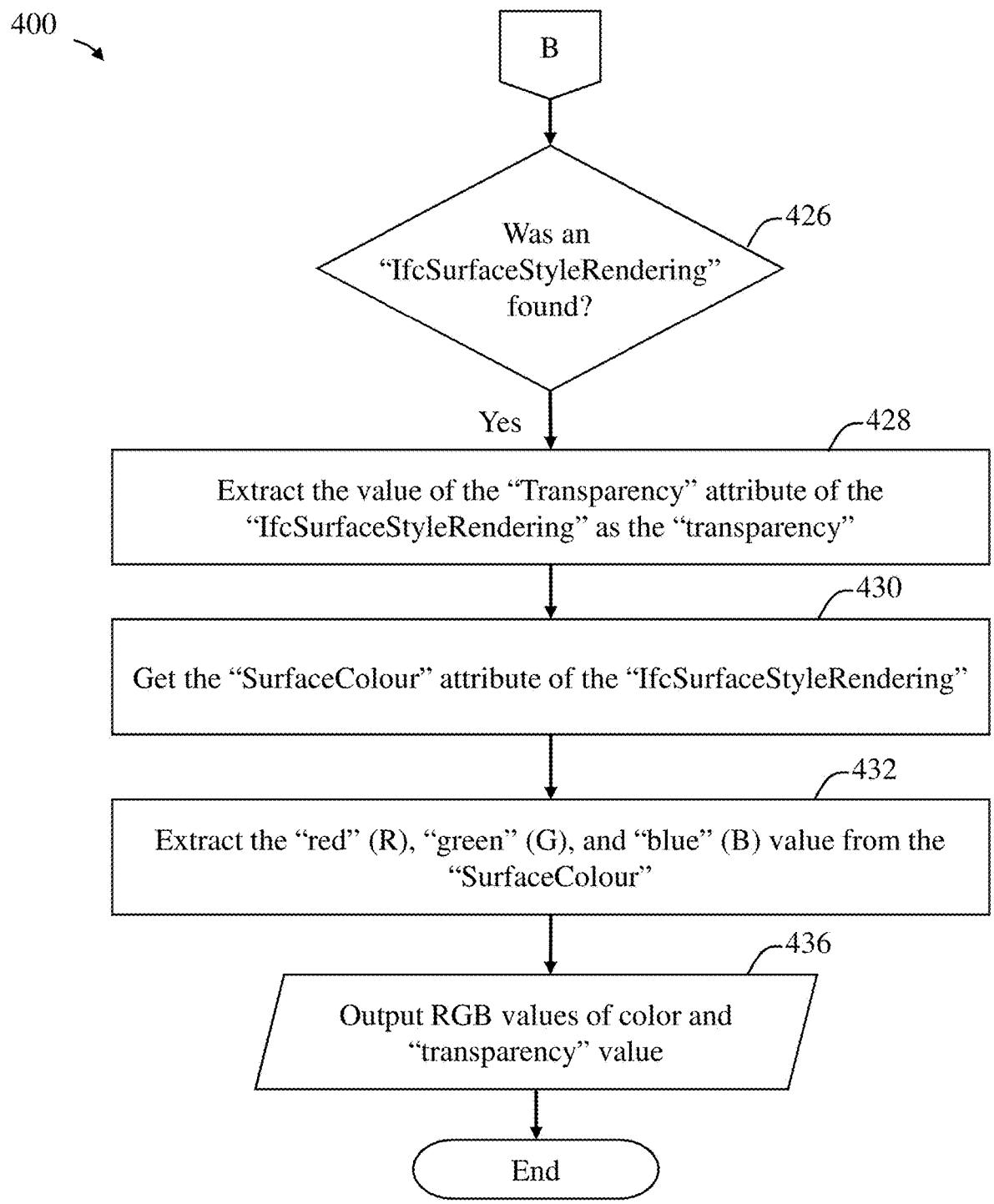

With reference to FIGS. 4A-C, a flowchart diagram for algorithm 400 find color for material layer is shown. This algorithm 400 takes as an input 434 a material layer (ML), extracts the color and transparency information for said ML and outputs 436 RGB values of color, and a transparency value. The first step 402 is to get the "Material" attribute of the ML which is an instance of "IfcMaterial". The next step 404 is to find all user entities of the "IfcMaterial" and iterate through them. The next step 406 is to determine if an "IfcMaterialDefinitionRepresentation" was found in step 404. If an "IfcMaterialDefinitionRepresentation" is found, the next step is 408 which requires that the "Representations" attribute of "IfcMaterialDefinitionRepresentation" is acquired and iterated through. The next step 410 is to determine if an "IfcStyledRepresention" was found in step 408. If it was, the next step 412 is to get the "Items" attribute of the "IfcStyledRepresentation" and iterate through the "Items". The next step 414 is to determine if an "IfcStyledItem" was found in step 408. If it was, the next step is 416 is to get the "Styles" attribute of the "IfcStyledItem" and iterate through the "Styles". The next step 418 is to determine if an "IfcPresentationStyleAssignment" is found. If it was, the next step 420 is to get the "Styles" attribute of the "IfcPresentationStyleAssignment" and iterate through the "Styles". The next step 422 is to determine if an "IfcSurfaceStyle" was found. If it was, the next step 424 is to get the "Styles" attribute of the "IfcSurfaceStyle" and iterate through the "Styles". The next step 426 is to determine whether or not an "IfcSurfaceStyleRendering" was found. If it was, the next step 428 is to extract the value of the "Transparency" attribute of the "IfcSurfaceStyleRendering" as the "transparency". The next step 430 is to get the "SurfaceColour" attribute of the "IfcSurfaceStyleRendering". The last step 432 is to extract the "red" (R), "green" (G), and "blue" (B) value from "SurfaceColour".

Figure 5:
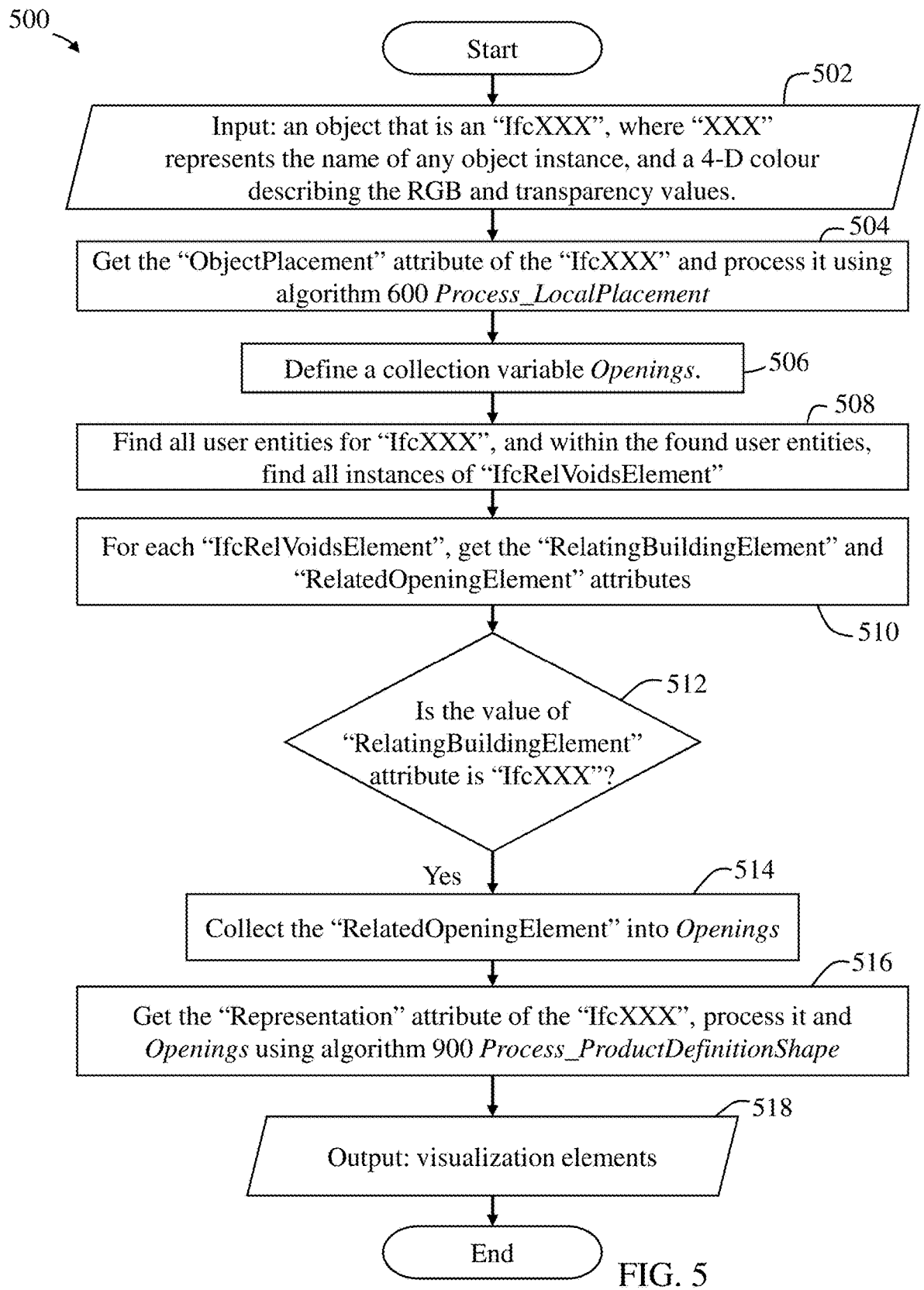
FIG. 5 is a flowchart diagram for algorithm Process_Object.

Referring to FIG. 5, a flowchart diagram for algorithm 500 Process Object is shown. The algorithm 500 takes as an input 502 an object that is an "IfcXXX", where "XXX" represents the name of any object instance, and a four dimensional colour describing the red, green, blue and transparency values. The algorithm 500 then analyzes the geometry information, placement information, and color/transparency information of the object and outputs 518 visualization elements for the object. The first step 504 is to get the "ObjectPlacement" attribute (i.e., an "IfcLocalPlacement") of the "IfcXXX", and process it using algorithm 600. The next step 506 is to define a collection variable Openings. The next step 508 is to find all user entities of the "IfcXXX" and within the found user entities, find all instances of "IfcRelVoidsElement". The next step 510 is to get the "RelatingBuildingAttribute" and "RelatedOpeningElement" for each "IfcRelVoidsElement". The next step 512 is to determine whether or not the value of the "RelatingBuildingElement" attribute is this "IfcXXX". If it is, the next step 514 is to collect the "RelatedOpeningElement" into variable Openings. The next step 516 is to get the "Representation" attribute of the "IfcXXX" (i.e., an "IfcProductDefinitionShape"), and process it along with Openings using algorithm 900. Depending on the possibility of the object having openings, step 516 may be omitted.

Figure 6:
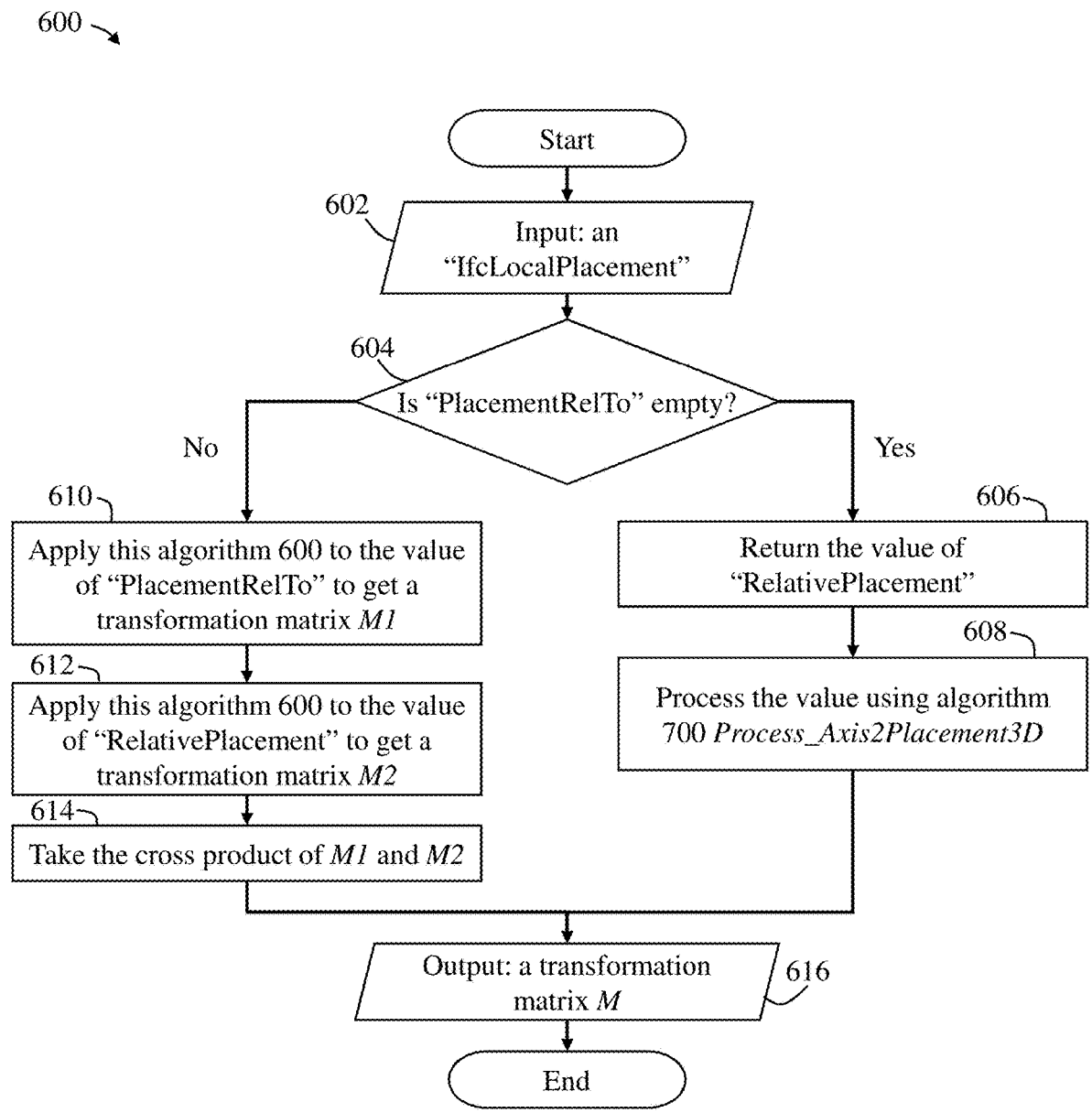
FIG. 6 is a flowchart diagram for algorithm Process_Local_Placement.

Referring to FIG. 6 a flowchart diagram for algorithm 600 Process Local Placement is shown. This algorithm 600 takes as an input 602 an "IfcLocalPlacement", it then analyzes the placement information and outputs 616 a transformation matrix that represents the rotation and translation for placing the corresponding object in world coordinate. There are two attributes in an "IfcLocalPlacement": "PlacementRelTo" and "RelativePlacement". The "PlacementRelTo" attribute specifies the reference placement and the "RelativePlacement" attribute specifies the relative placement in relation to the reference placement. The method to process the "LocalPlacement" is recursive. The first step 604 is to determine if the "PlacementRelTo" is empty. If the "PlacementRelTo" is empty, the proceeding step 606 is to return the value of "RelativePlacement" then, step 608, process "RelativePlacement" using algorithm 700 to get a transformation matrix M. If "PlacementRelTo" is not empty, the proceeding step 610 is to apply this algorithm 600 per se to the value of "PlacementRelTo to get a transformation matrix M1. The next step 612 is to apply this algorithm 600 per se to the value of "RelativePlacement" to get a transformation matrix M2. The next step 614 is to take the cross product of matrices M1 and M2 and return the result matrix M.

Figure 7:
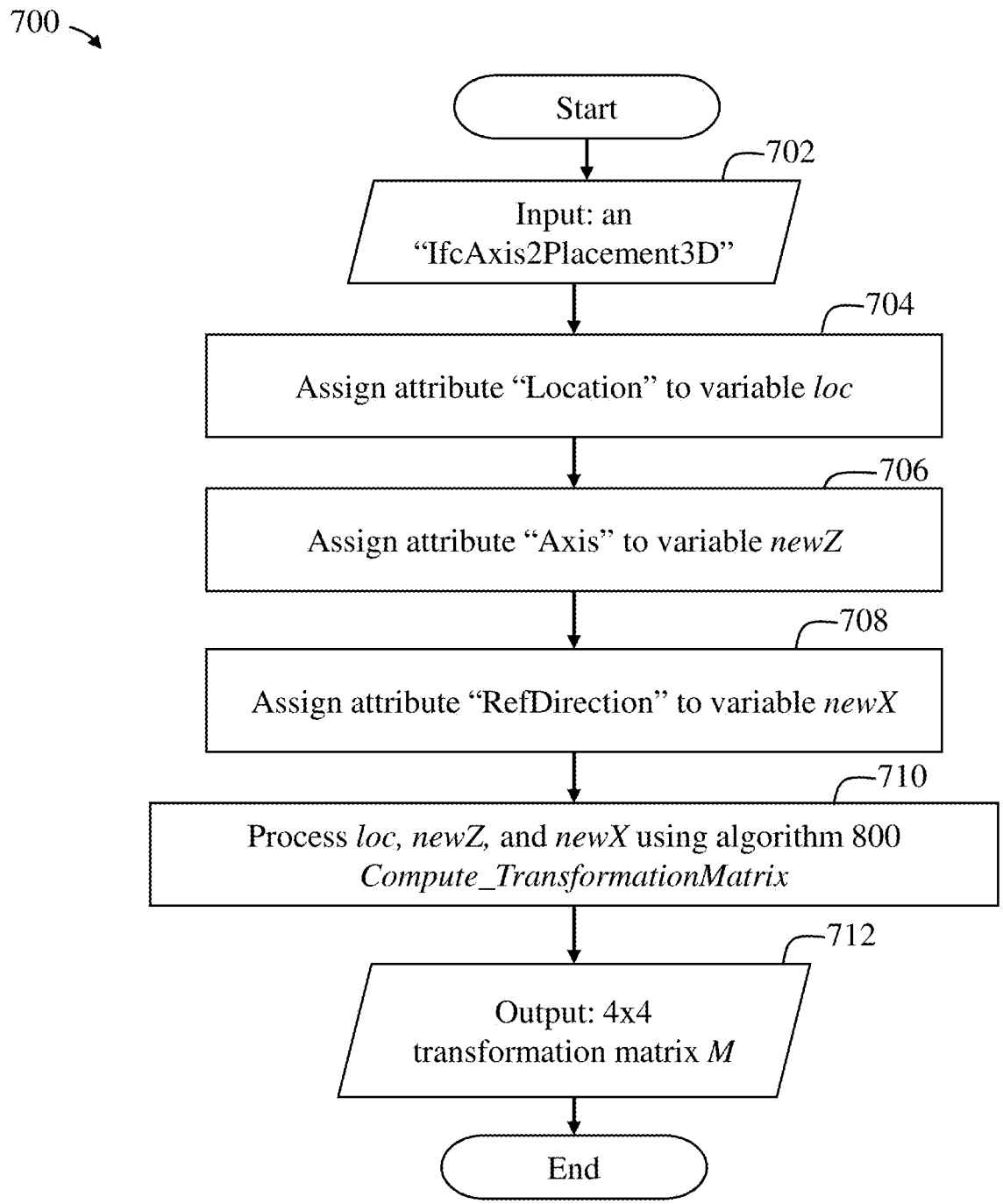
FIG. 7 is a flowchart diagram for algorithm Process_Axis2Placement3D.

Referring to FIG. 7, a flowchart diagram for algorithm 700 Process Axis2Placement3D is shown. The algorithm 700 takes as an input 702 an "IfcAxis2Placement3D", it analyzes the placement information and outputs 712 a 4×4 transformation matrix that represents the rotation and translation for placing the corresponding object in world coordinate. There are three attributes in an "IfcAxis2Placement3D": "Location", "Axis", and "RefDirection". The first step 704 is to assign the "Location" attribute to specify a point for the placement (loc). The next step 706 is to assign the "Axis" attribute to specify the Z-axis for the placement (newZ). The next step 708 is to assign the "RefDirection" attribute to specify the X-axis for the placement (newX). The sought transformation matrix M is a 4×4 matrix with the first three columns representing the rotation and the last column representing the translation. The x,y,z coordinates of the value of the "Location" attribute will be assigned to the last column, and the cosine between the vectors representing the X,Y,Z axes of the world coordinate and the vectors representing the designated X,Y,Z axes after the rotation are computed to fill the first three columns of the transformation matrix. The next step 710 is to process loc, newZ, and newX using algorithm 800 to get the desired output 712 4×4 transformation matrix M.

Figure 8:
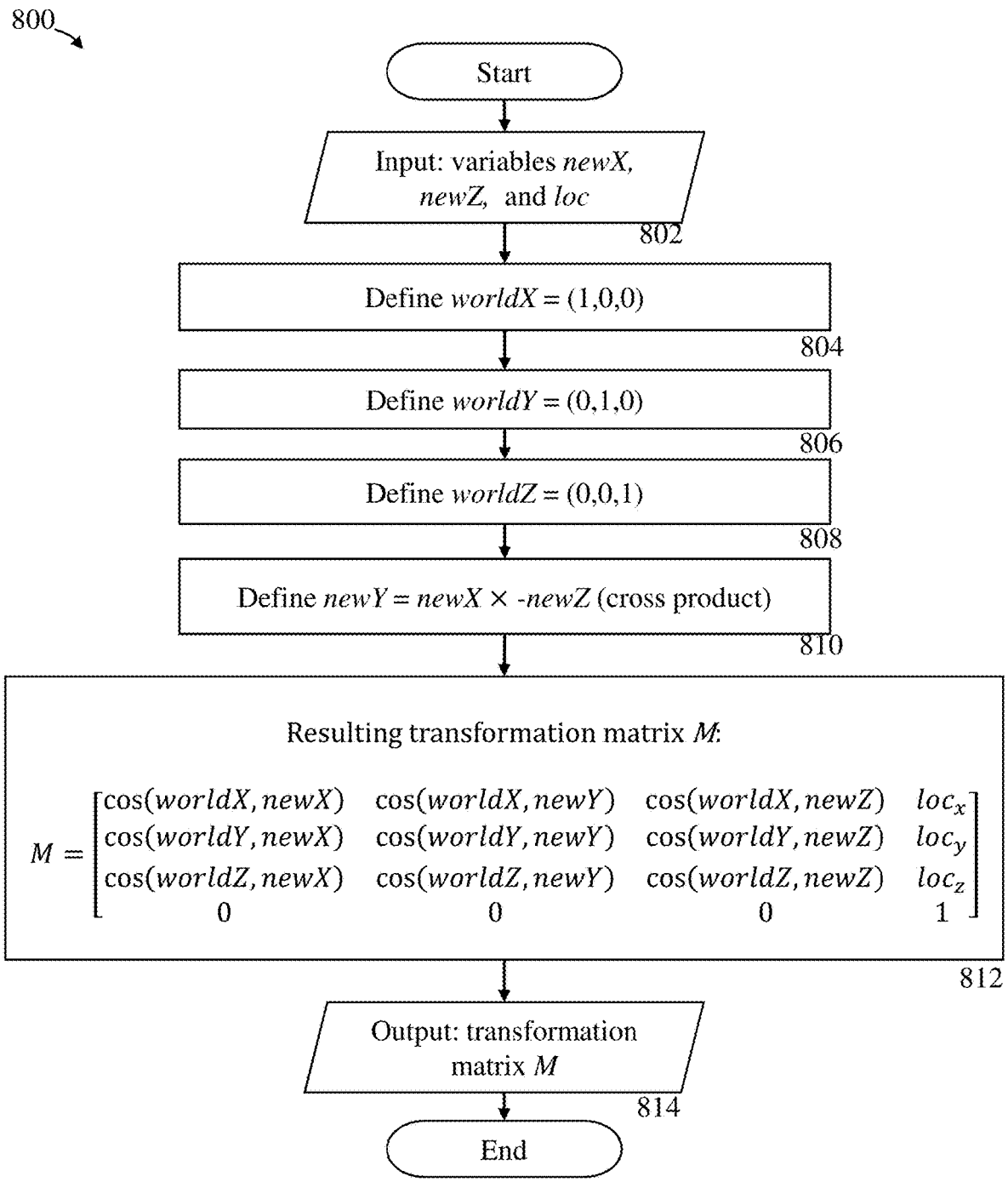
FIG. 8 is a flowchart diagram for algorithm Compute_TransformationMatrix.

Referring to FIG. 8, a flowchart diagram for algorithm 800 Compute Transformation Matrix is shown. The algorithm 800 takes as its input 802: newX, newZ, and loc. The algorithm 800 outputs a transformation matrix (M) that represents the rotation and translation. The first step 804 is to define worldX=(1,0,0), the next step 806 is to define worldY=(0,1,0), then the next step 808 is to define worldZ= (0,0,1). The next step 810 is to define newY as the cross product of newX and −newZ. The next step 812 is to obtain the transformation matrix M resulting from:

$$M = \begin{bmatrix} \cos(worldX, newX) & \cos(worldX, newY) & \cos(worldX, newZ) & loc_x \\ \cos(worldY, newX) & \cos(worldY, newY) & \cos(worldY, newZ) & loc_y \\ \cos(worldZ, newX) & \cos(worldZ, newY) & \cos(worldZ, newZ) & loc_z \\ 0 & 0 & 0 & 1 \end{bmatrix} \quad (1)$$

The resulting output is provided in step 814.

Figure 9:
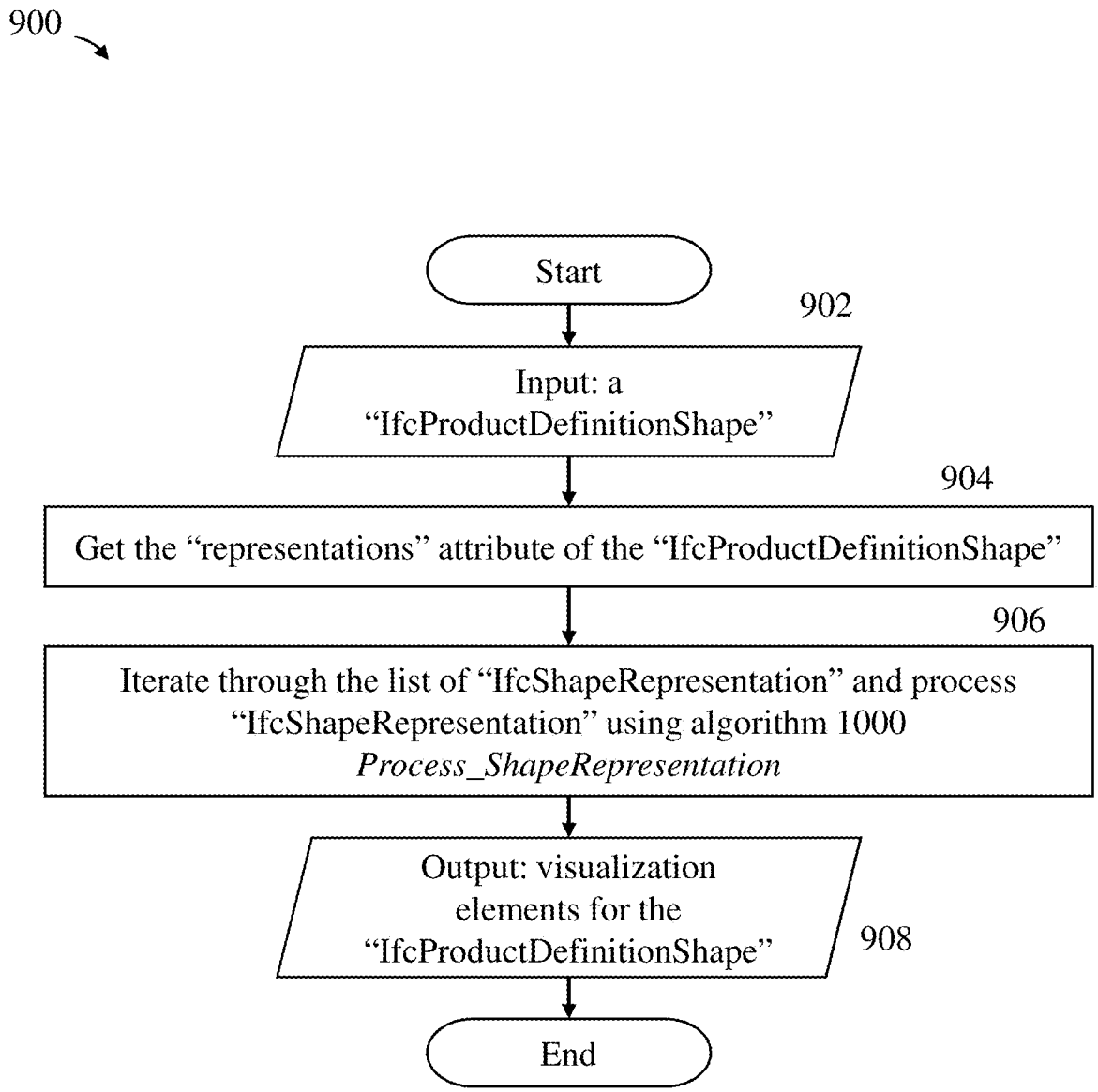
FIG. 9 is a flowchart diagram for algorithm Process_ProductDefinitionShape.

Referring to FIG. 9, a flowchart diagram for algorithm 900 Process Product Definition Shape is shown. The algorithm 900 takes an "IfcProductDefinitionShape" as an input 902 and outputs 908 the visualization elements for "IfcProductDefinitionShape". The first step 904 is to get the "representations" attribute of the "IfcProductDefinitionShape", which is a list of "IfcShapeRepresentation". The next step 906 is to iterate through the list of "IfcShapeRepresentation" and process each "IfcShapeRepresentation", with Openings as another input, using algorithm 1000.

Figure 10:
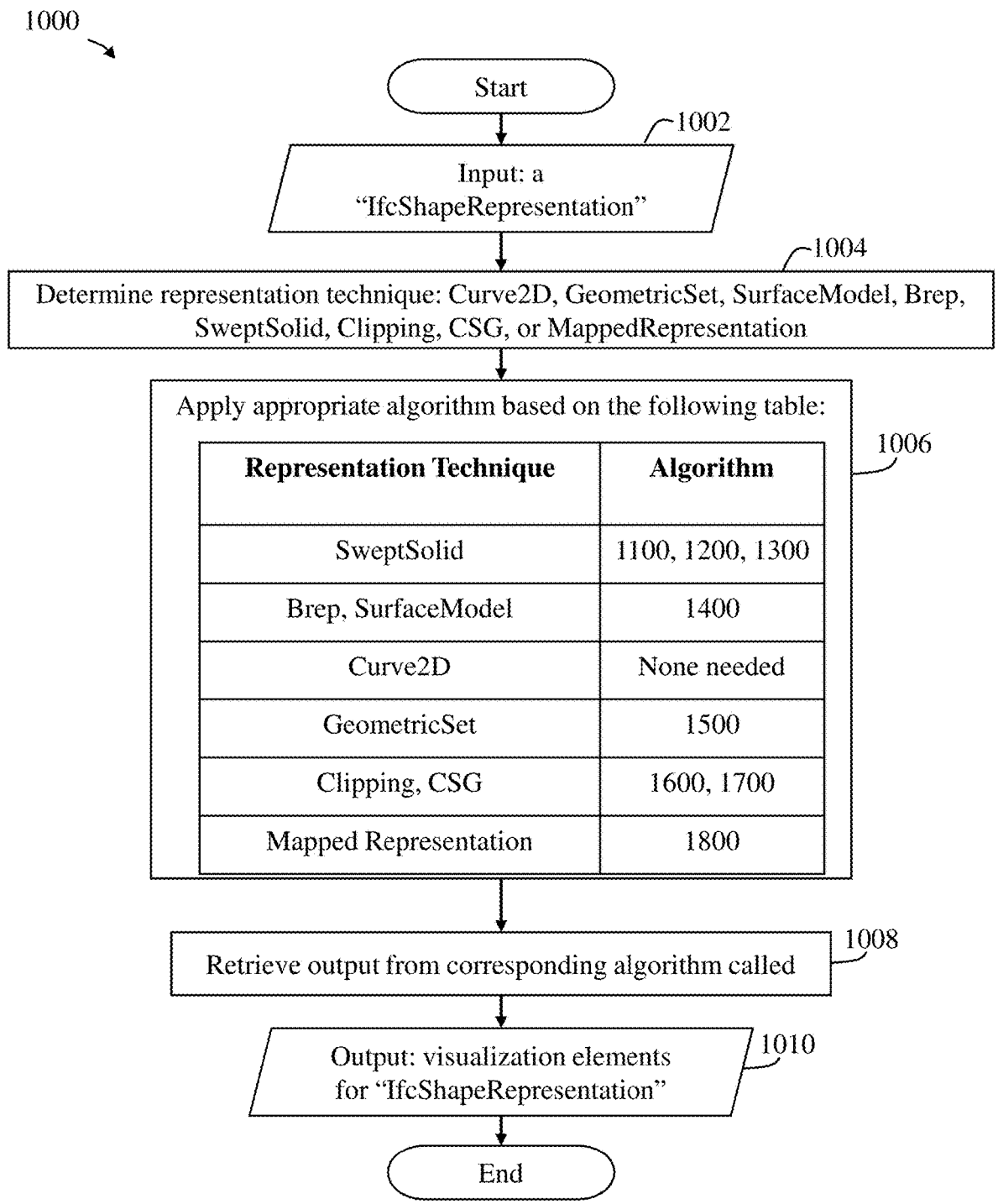
FIG. 10 is a flowchart diagram for algorithm Process_ShapeRepresentation.

Referring to FIG. 10, a flowchart diagram for algorithm 1000 Process Shape Representation is shown. The algorithm 1000 takes as an input 1002, an "IfcShapeRepresentation" and outputs 1010 visualization elements for the "IfcShapeRepresentation". The first step 1004 is to determine the representation technique used for "IfcShapeRepresentation". Each "IfcShapeRepresentation" can be using one of several types of 2D or solid representation techniques: 2 dimensional curves (Curve2D), collection of points and curves (GeometricSet), surface model (SurfaceModel), boundary representation (Brep), solid sweeping (SweptSolid), clipping (Clipping), constructed solid geometry (CSG), and mapped representation (MappedRepresentation). The next step 1006 is to process the representation technique using the appropriate algorithm. Below, table 1 shows the relationship between the representation technique and the appropriate algorithm to use in order to gather a set of visualization elements for the "IfcShapeRepresentation".

TABLE 1

Relationship between representation technique and appropriate algorithm

| Representation Technique | Algorithm |
|---|---|
| SweptSolid | 1100, 1200, 1300 |
| Brep, SurfaceModel | 1400 |
| Curve2D | None needed |
| GeometricSet | 1500 |
| Clipping, CSG | 1600, 1700 |
| Mapped Representation | 1800 |

The next step 1008 is to retrieve the output from the corresponding algorithm called and output 1010 the visualization elements for the "IfcShapeRepresentation".

The SweptSolid type of "IfcShapeRepresentation" mainly describes the geometry in its "Items" attribute, which is usually just one instance of "IfcExtrudedAreaSolid". An "IfcExtrudedAreaSolid" has four attributes: "SweptArea", "Position", "ExtrudedDirection", and "Depth". The value of the "ExtrudedDirection" attribute is an "IfcDirection" that describes a direction vector (D), which dictates the direction of the extrusion. To get the coordinates of the "ifcExtrudedAreaSolid," a transformation matrix (T2) is needed to transform 2D coordinates from the base planar surface. Algorithm 1100 is used to compute this matrix T2.

Figure 11A:
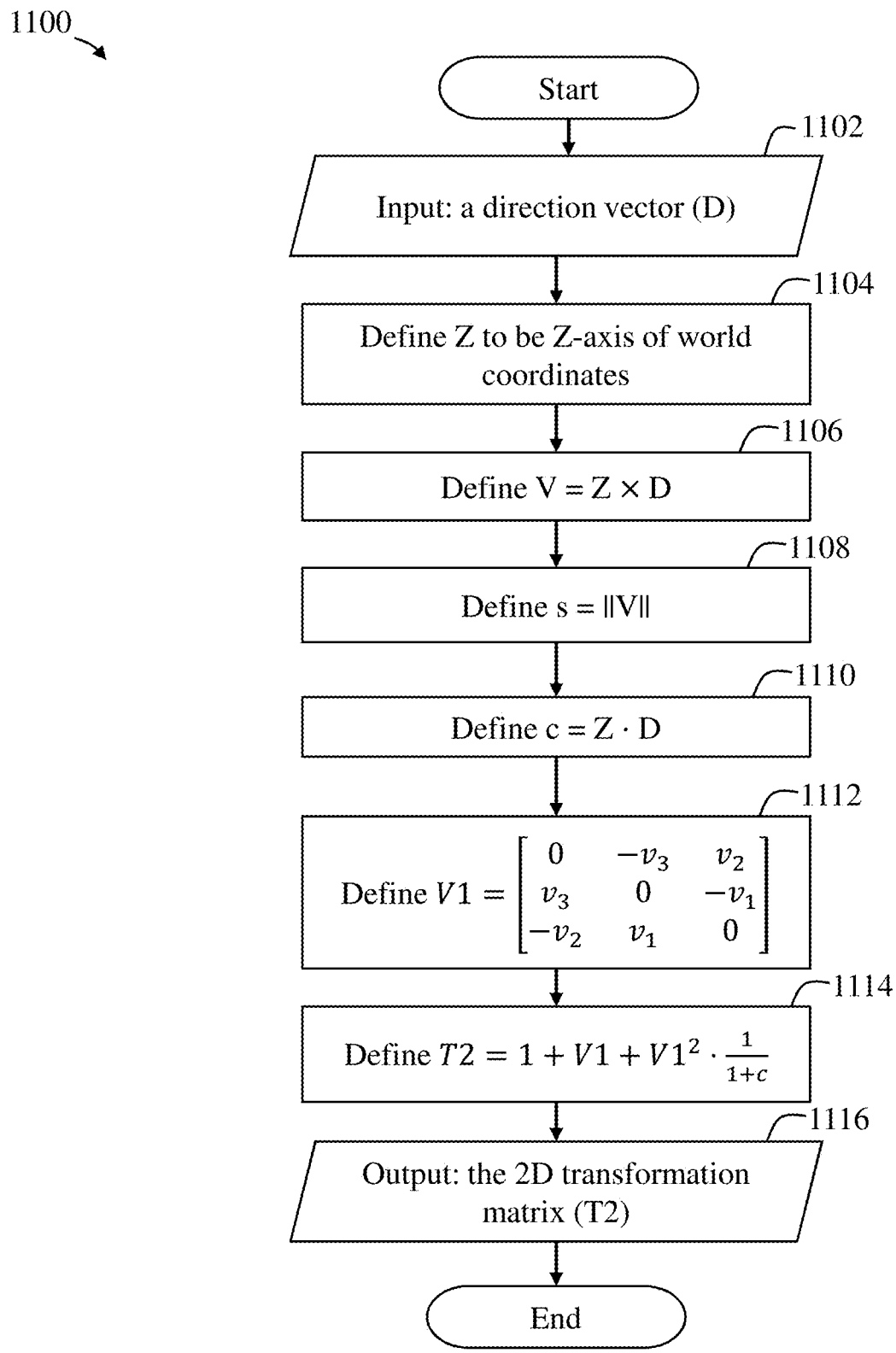
FIG. 11A is a flowchart diagram for algorithm Compute_TransformationOfSweptSolid.

Referring to FIG. 11A, a flowchart diagram for algorithm 1100 Compute Transformation of Swept Solid is shown. The algorithm takes as an input 1102 a direction vector (D), returns an output 1116 of a 2D transformation matrix (T2) for transforming base planar surface coordinates of an "IfcExtrudedAreaSolid". The first step 1104 is to define Z to be the Z-axis of world coordinates. The next step 1106 is to define the vector V to be the cross product of Z and D. The next step 1108 is to define the vector s to be the norm of vector V. The next step 1110 is to define the vector c to be the dot product of vector Z and D. The next step 1112 is to define the vector V1 by the following:

$$V1 = \begin{bmatrix} 0 & -v_3 & v_2 \\ v_3 & 0 & -v_1 \\ -v_2 & v_1 & 0 \end{bmatrix} \quad (2)$$

The next step 1114 is to define transformation matrix (T2) by the following:

$$T2 = 1 + V1 + V1^2 \cdot \frac{1}{1+c} \quad (3)$$

Finally the output 1116 is to return the 2D transformation matrix (T2).

Figure 11B:
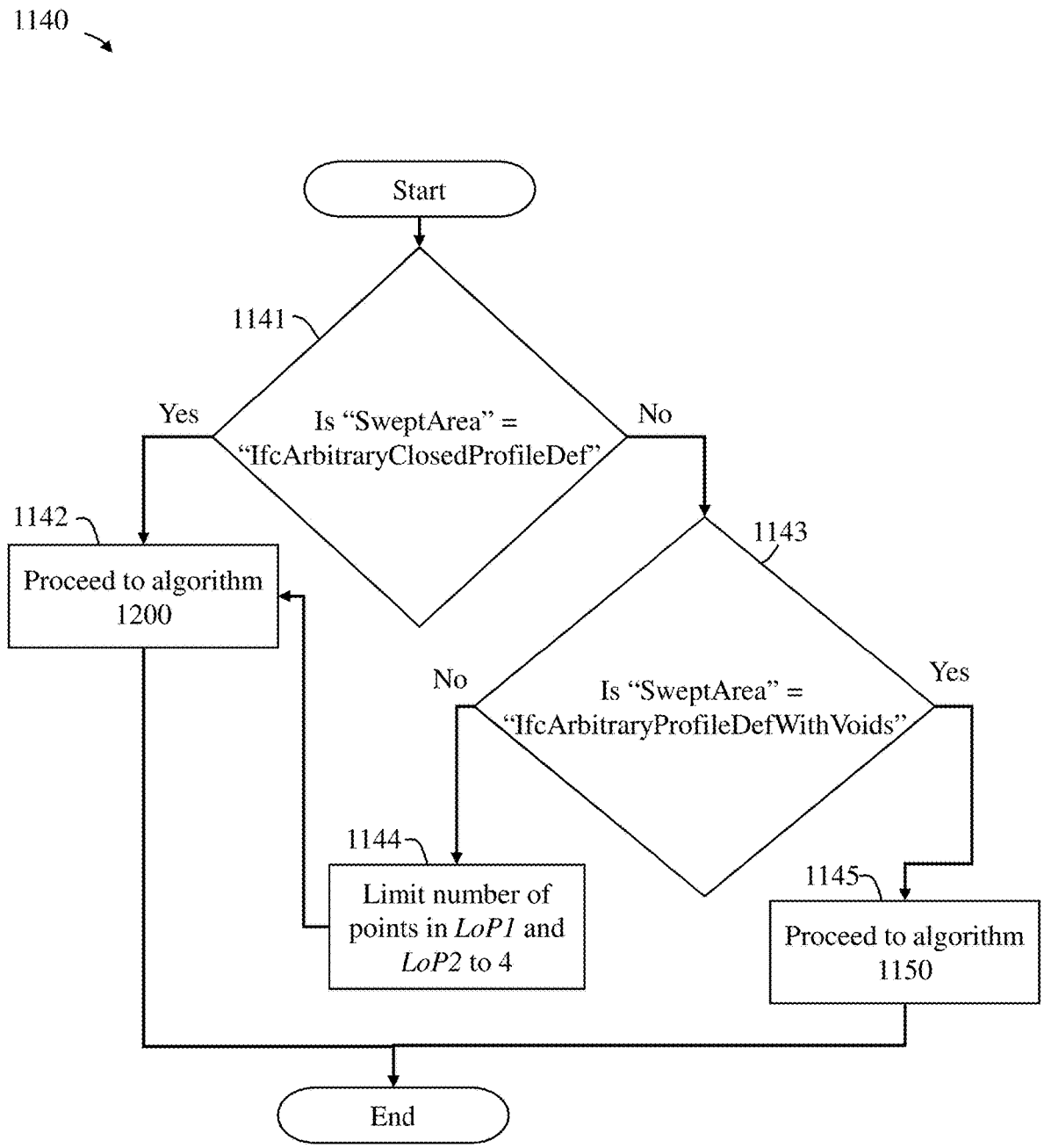
FIG. 11B is a flowchart for determining the appropriate processing method for the three values of "SweptArea".

The value of the "SweptArea" attribute is one of the following: "IfcArbitraryClosedProfileDef", "IfcArbitraryProfileDefWithVoids", or "IfcRetangleProfileDef". Referring to FIG. 11B, a flowchart 1140 for determining the appropriate processing method for the three values is shown. The first step 1141 is to determine whether the "SweptArea" attribute is an "IfcArbitraryClosedProfileDef". If it is, the next step 1142 is to proceed to algorithm 1200. If it is not, then the next step 1143 is to determine whether "SweptArea" is an "IfcArbitraryProfileDefWithVoids". If it is not, the next step 1144 is to limit the number of points in LoP1 and LoP2 to four points and to proceed to algorithm 1200. If it is, the next step 1145 is to proceed to algorithm 1150.

Figure 12:
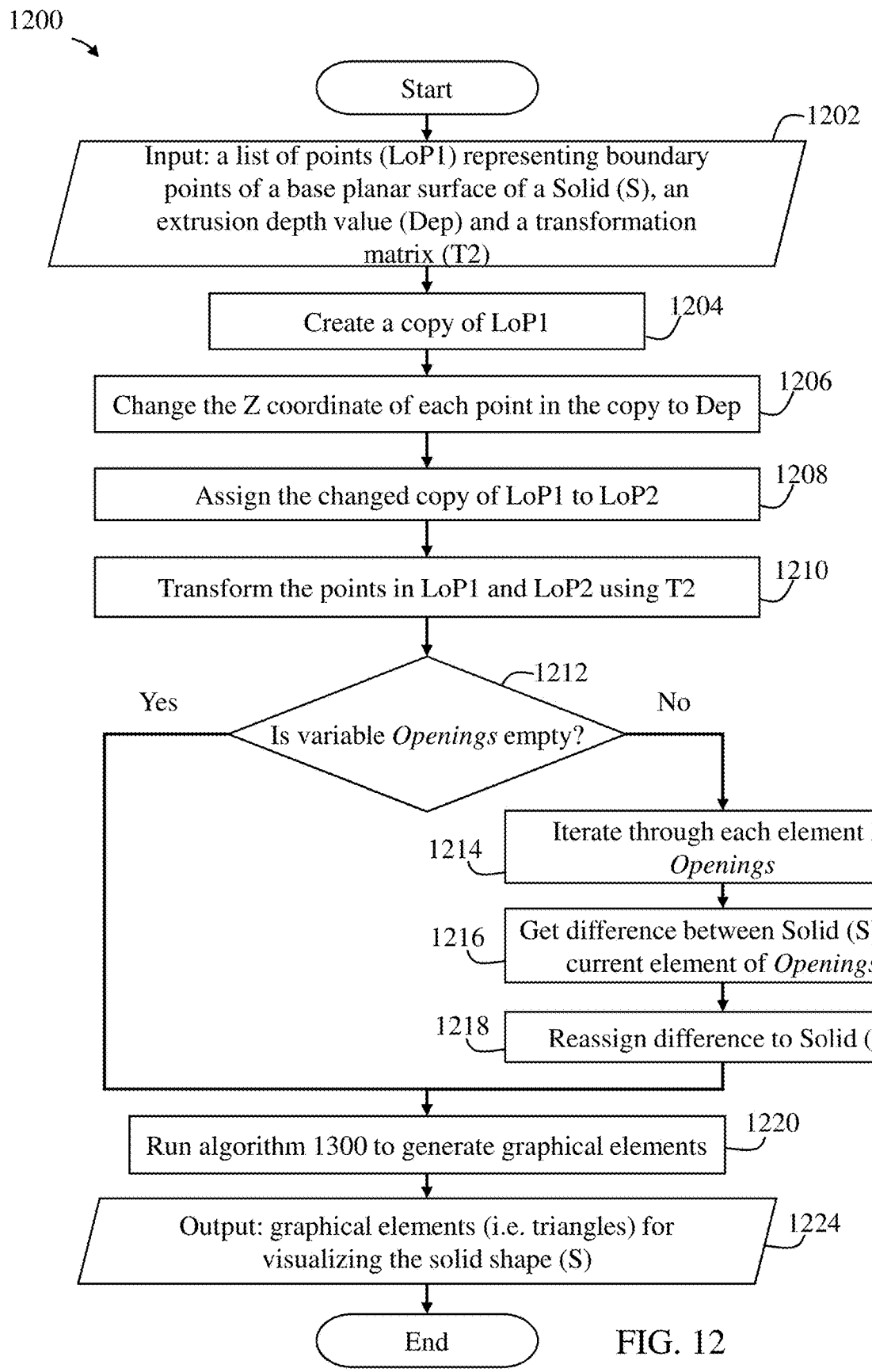
FIG. 12 is a flowchart diagram for algorithm Processing_IfcCurve.

With reference to FIG. 12, a flowchart diagram for algorithm 1200 Processing IfcCurve is shown. The algorithm 1200 takes as an input 1202 a list of points (LoP1) representing an IfcCurve that outlines the boundary of the base planar surface of a solid S using "IfcExtrudedAreaSolid" type of geometry representation, an extrusion depth value (Dep) extracted from the parent "IfcExtrudedAreaSolid" instance, and a transformation matrix (T2). The algorithm 1200 returns an output 1224 of graphical elements (i.e. triangles) for visualizing the solid shape (S) represented by the "IfcExtrudedAreaSolid". The first step 1204 is to create a copy of LoP1. The next step 1206 is to change the Z-coordinate of each point in the copy to Dep. The next step 1208 is to assign this changed copy of LoP1 to Lop2. The next step 1210 is to transform the points in LoP1 and LoP2 using transformation matrix T2 from the input 1202. At this point, the solid S is represented by a bottom face bounded by points in LOP1, a top face bounded by points in LoP2, and a set of parallelogrammic side faces bounded by each pair of neighboring points in LoP1 and corresponding pair of neighboring points in LoP2. The next step 1212 is to determine whether variable Openings is empty. If Openings is not empty, the next step 1214 is to iterate through each element in Openings, then, step 1216, get the difference between solid (S) and the current element of Openings. The next step 1218 is to reassign the difference calculated in step 1216 to solid (S). The next step 1220 is to run algorithm 1300 in order to generate the output 1224. If Openings is empty, skip step 1214 and go straight to step 1220. The output 1224 graphical elements will be fed to the visualization engine to visualize on a computer screen or other digital display device.

Referring to FIG. 13A, a flowchart diagram for algorithm 1300 Triangle Generation is shown. The algorithm 1300 takes as input 1302 a list of points (LoP1) that contains the boundary points of the bottom face of a solid (S), and a list of points (LoP2) that contains the boundary points of the top face of solid (S). The algorithm 1300 then returns an output 1310 of graphical elements (i.e., triangles) for visualizing the solid shape (S) represented by the "IfcExtrudedAreaSolid". The first step 1304 is to divide the bottom face that is bounded by points LoP1 into triangles. Wherein, all triangles are formed by the first point ($p_0$) in the list and two consecutive neighboring points ($p_i$ and $p_{i+1}$, where $i \geq 1$ and $i+1 <$ length of the point list) in reverse order: $p_0 - p_{i+1} - p_i$. The next step 1306 is to divide the top face that is bounded by points in LoP2 into triangles, in the same way as in step 1304. The next step 1308 is to divide each parallelogrammic side face (bounded by two neighboring points in LoP1 $p_i$ and $p_{i+1}$) and corresponding two neighboring points in LoP2 ($p_i'$ and $p_{i+1}'$), where $i \geq 1$ and $i+1 <$ length of the point list) into two triangles $p_i - p_{i+1} - p_{i+1}'$ and $p_{i+1}' - p_i' - p_i$, when $i+1 =$ length of point list, the two triangles are $p_i - p_0 - p_0'$ and $p_0' - p_i' - p_i$. All triangles are returned as the output 1310.

Figure 13B:
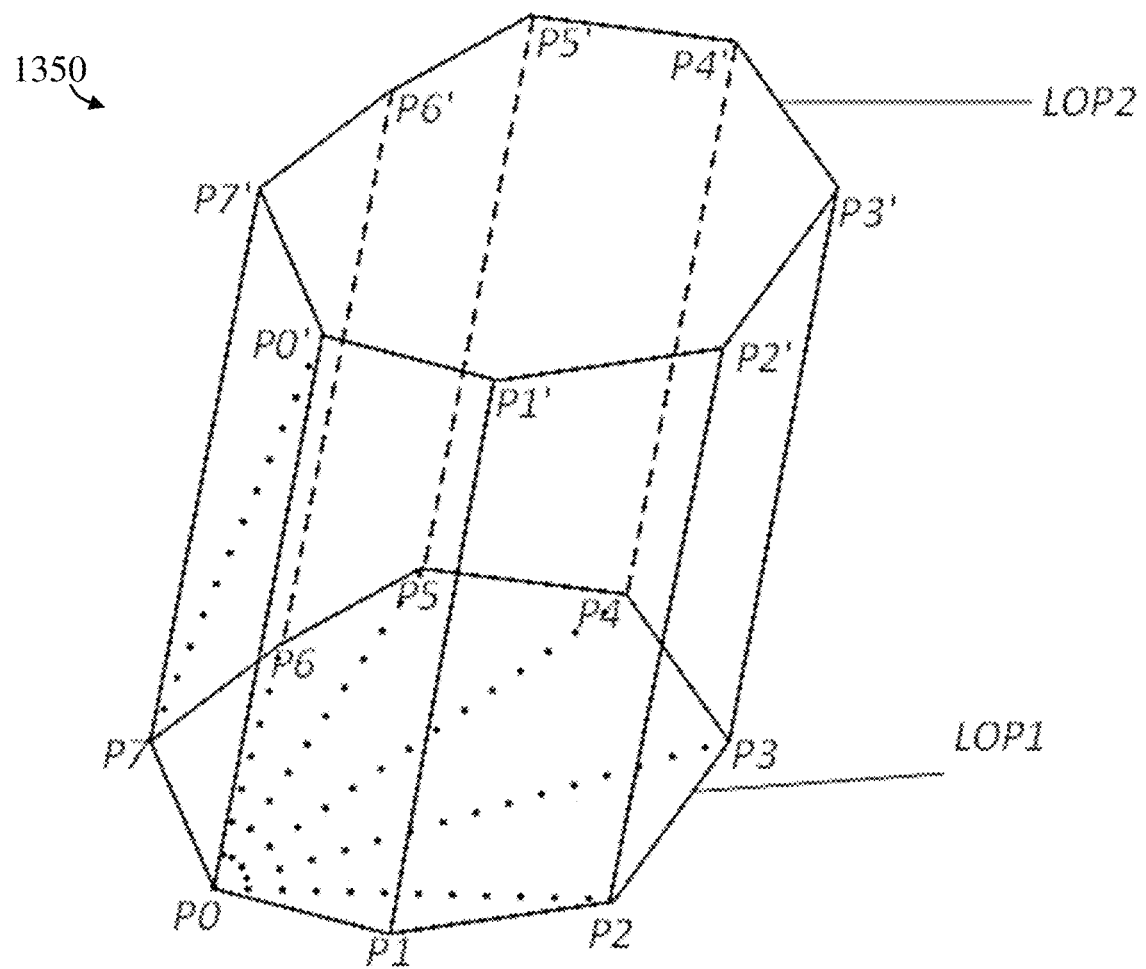
FIG. 13B is an example arbitrary solid shape created by algorithm Triangle_Generation.

As an example for illustration, FIG. 13B shows an arbitrary solid shape 1350 represented by an "IfcExtrudedAreaSolid", the top surface and bottom surfaces of which are arbitrary octangles. The bottom surface is bounded by points P0 to P7 in LoP1. The top surface is bounded by points P0' to P7' in LoP2. The dotted lines at the bottom surface shows the division of the bottom surface into six triangles, among which the first triangle is bounded by P0, P2, and P1. The second triangle is bounded by P0, P3, and P2, so on and so forth. The dotted lines on the side surface P0-P0'-P7'-P7 shows the division of the surface into two triangles P7-P0-P0' and P0'-P7'-P7.

Figure 11C:
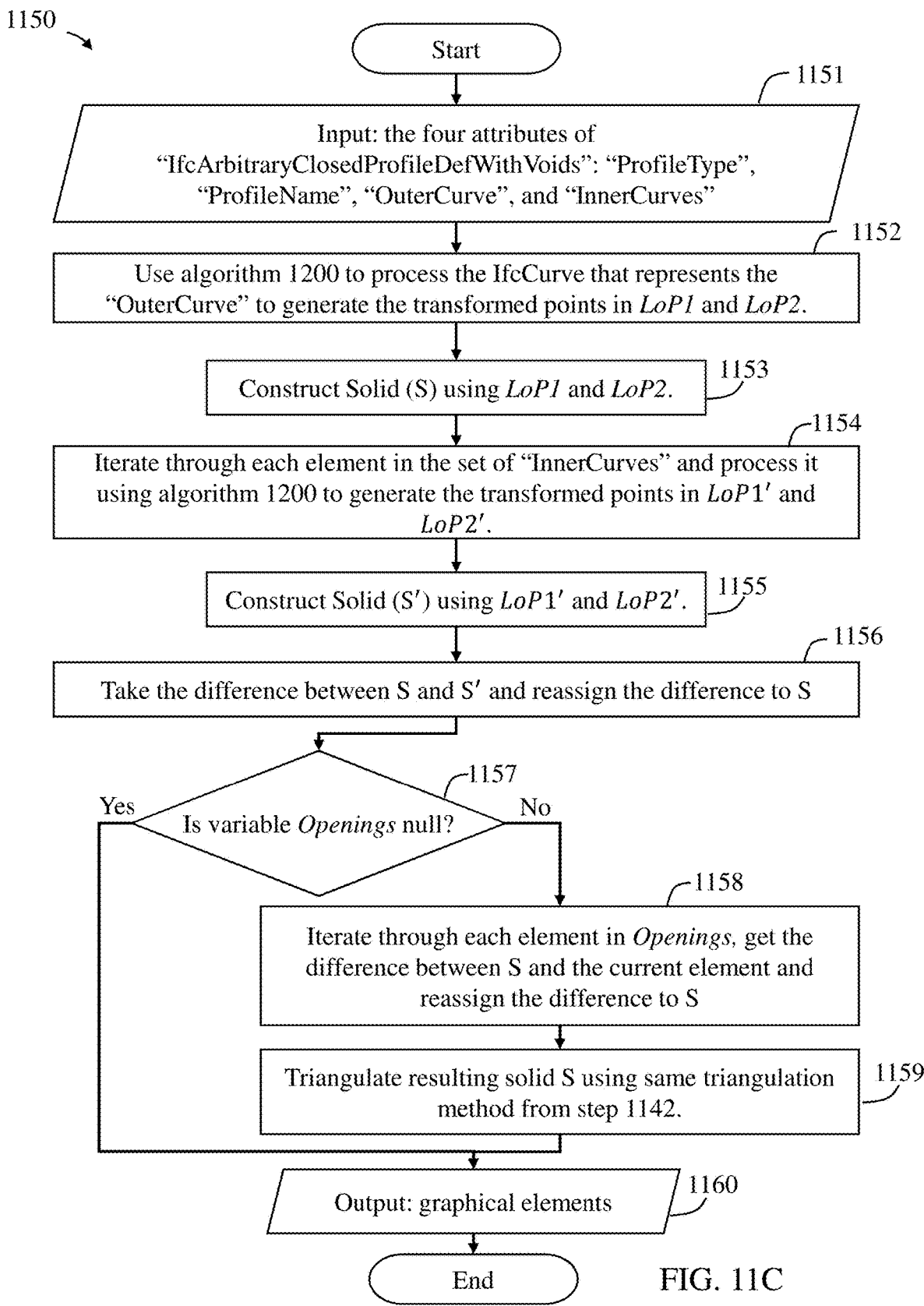
FIG. 11C is a flowchart diagram for an algorithm for handling a "SweptArea" attribute when it is an "IfcArbitraryProfileDefWithVoids".

Returning to FIG. 11B, if the first step 1141 is false then the next step 1143 is to check whether the "SweptArea" attribute is an "IfcArbitraryProfileDefWithVoids". If the step 1143 returns true, proceed to algorithm 1150. Referring to FIG. 11C, a flowchart diagram for algorithm 1150 for handling a "SweptArea" attribute when it is an "IfcArbitraryProfileDefWithVoids" is shown. Each "IfcArbitraryClosedProfileDefWithVoids" has four attributes: "ProfileType", "ProfileName", "OuterCurve", and "InnerCurves". The "OuterCurve" defines the outer boundary of the arbitrary closed profile, and it is composed of a list of points (LoP1). The "InnerCurves" is a set of one or more curves defining the boundaries of one or more voids in the arbitrary closed profile. The algorithm 1150 takes the four attributes of the "IfcArbitraryClosedProfileDefWithVoids" as an input 1151 and returns as the output 1160 graphical elements to be fed to the visualization engine. The next step 1152 is to use algorithm 1200 to process the IfcCurve that represents the "OuterCurve" in order to generate the transformed points in LoP1 and LoP2. The next step 1153 is to construct a solid S using the transformed points in LoP1 and LoP2. The next step 1154 is to iterate through each element in the "InnerCurves" attribute and process the elements using algorithm 1200 in order to generate the transformed points in LoP1' and LoP2'. The next step 1155 is to construct solid (S') using LoP1' and LoP2'. The next step 1156 is to take the difference between S and S' and reassign the difference to S. The next step 1157 is to determine whether the variable Openings is null. If step 1157 returns false, and the variable Openings is not null, then the next step 1158 is to iterate through each element in Openings, get the difference between S and the current element in Openings and reassign said difference to S. The next step 1159 is to triangulate the resulting solid S using the same triangulation method from step 1142 in FIG. 11B. If step 1157 returns true, the algorithm 1150 progresses to output 1160.

The Brep type of "IfcShapeRepresentation" mainly describes the geometry in its "Items" (4th attribute) attribute, which is usually just one instance of "IfcFacetedBrep." An "IfcFacetedBrep" has only one attribute, named "Outer." The value of its "Outer" attribute is an "IfcClosedShell." An "IfcClosedShell" has only one attribute, named "CfsFaces," whose value is an aggregate of "IfcFace." An "IfcFace" has only one attribute, named "Bounds," whose value is an "IfcFaceOuterBound." An "IfcFaceOuterBound" has two attributes—"Bound" (1st attribute) and "Orientation" (2nd attribute), respectively. The value of the "Bound" attribute is an "IfcPolyLoop" that defines the boundary of the face whereas the value of the "Orientation" attribute is a Boolean value that defines the direction of the surface normal. An "IfcPolyLoop" has only one attribute, named "Polygon," whose value is a list of "IfcCartesianPoint." Algorithm 1400 (shown in FIG. 14A) is used to draw an "IfcPolyLoop." The resulting graphical elements (i.e., triangles) are to be fed to the Visualization Engine.

Referring to FIG. 14A, a flowchart diagram for algorithm 1400 Draw PolyLoop is shown. The algorithm 1400 takes as its input 1402 an "IfcPolyLoop", and a Boolean value for describing the orientation of its parent and returns an output 1416 of graphical elements (i.e., triangles) for visualizing the "IfcPolyLoop". The first step 1404 is to read the value of the "Polygon" attribute of the "IfcPolyLoop" into a list of points LoP. The next step 1406 is to use the first point ($p_0$) in LoP as the origin. The next step 1408 is to Use the origin to form a triangle with each pair of neighboring points ($p_i$ and $p_{i+1}$, where i≥1 and i+1<length of the point list) in LoP. The next step 1410 is to evaluate whether or not the Boolean input is True or False. If the Boolean input is true, the proceeding step 1412 is to adjust the order of neighboring points such that a triangle is formed by the points $p_0-p_i-p_{i+1}$. If the Boolean input is false, the proceeding step 1414 is to adjust the order of neighboring points such that a triangle is formed by the points $p_0-p_{i+1}-p_i$. Thus resulting in the output 1416 of a list of triangle graphical elements.

Figure 14B:
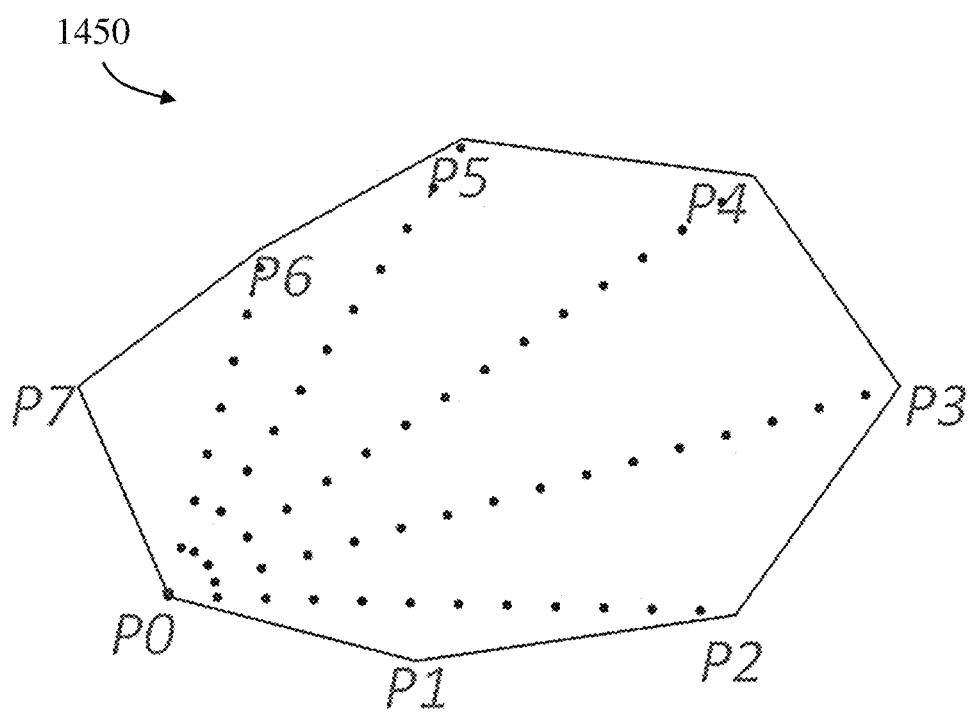
FIG. 14B is an example triangulation of an "IfcPolyLoop".

The Analysis Engine analyzes the "Brep" type of geometry by creating triangles for each "IfcPolyLoop" using algorithm 1400. FIG. 14B shows the triangulation of an arbitrary "IfcPolyLoop" 1450 as an example. P0 is the origin in this example. Assuming the Boolean value is True, the sequence of points in the triangles will be P0-P1-P2, P0-P2-P3, P0-P3-P4, etc. If the Boolean value is False, the sequence of points in the triangles will be P0-P7-P6, P0-P6-P5, P0-P5-P4, etc.

The "Curve2D" type of geometry is representing the "Axis" of an object and there is no need for visualizing it in this invented method.

The GeometricSet type of "IfcShapeRepresentation" describes the geometry in its "items" attribute (4th attribute), which is usually just one instance of "IfcGeometricSet." An "IfcGeometricSet" has only one attribute, named "elements." The value of its "elements" attribute is a set of "IfcGeometricSetSelect." An "IfcGeometricSetSelect" is an "IfcPoint," "IfcCurve," or "IfcSurface." The GeometricSet type of "IfcShapeRepresentation" is mainly used to represent the 2D 'Plan' of a building, through a set of "IfcGeometricSetSelect" in the form of "IfcPolyLine" (subtype of "IfcBoundedCurve," therefore subtype of subtype of "IfcCurve"). The algorithm 1000 analyzes the GeometricSet type of geometry by creating connected lines representing a bounded curve for each "IfcPolyLine" using algorithm 1500 (shown in FIG. 15). The resulting list of lines will be fed to the visualization engine.

Figure 15:
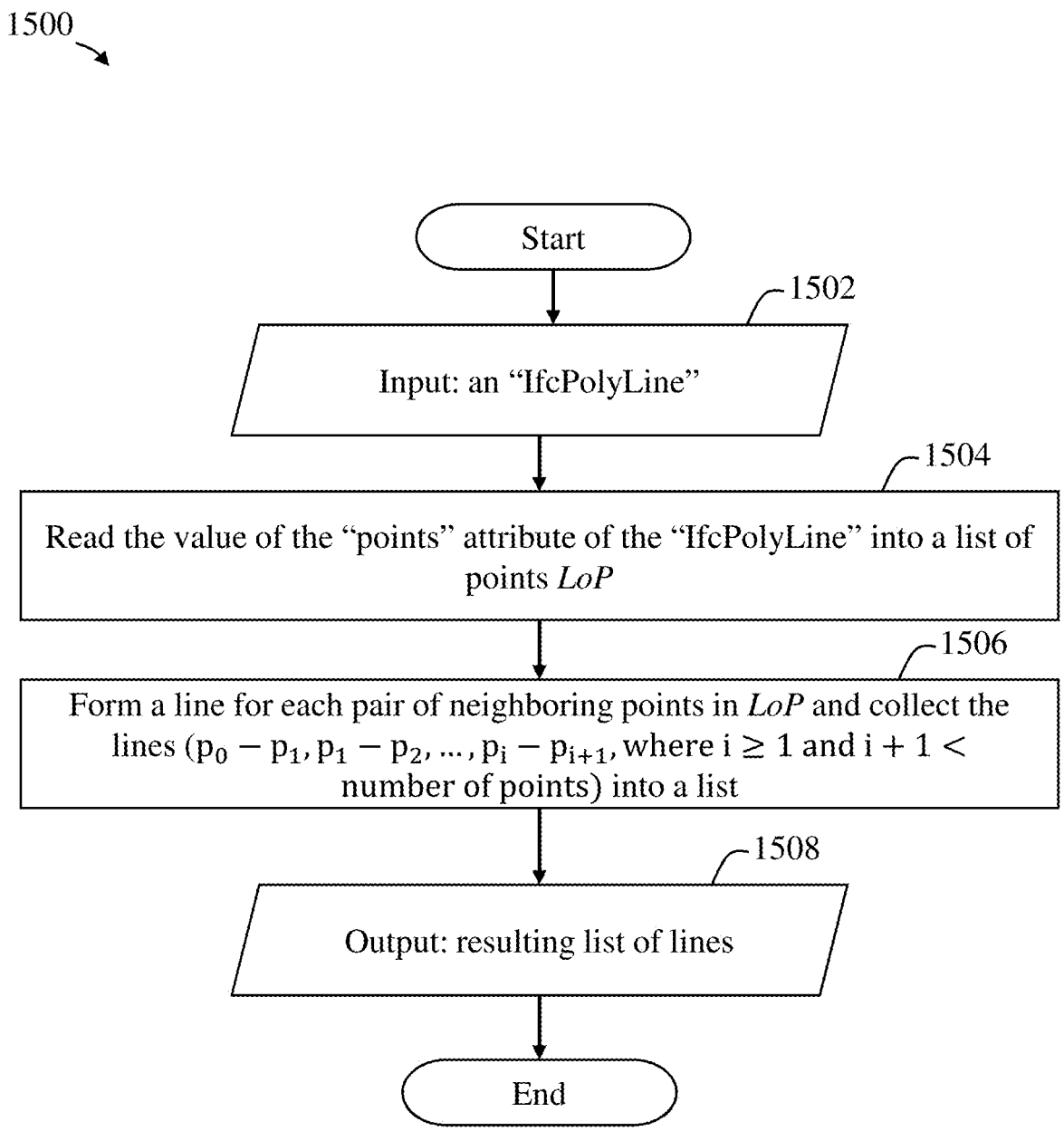
FIG. 15 is a flowchart diagram for algorithm Draw_PolyLine.

Referring to FIG. 15, a flowchart diagram for algorithm 1500 Draw PolyLine is shown. The algorithm 1500 takes as an input 1502 an "IfcPolyLine" and returns as an output 1508 graphical elements (i.e., lines) for visualizing the "IfcPolyLine". The first step 1504 is to read the value of the "points" attribute of "IfcPolyLine" into a list of points LoP. The next step 1506 is to form a line for each pair of neighboring points in LoP and collect the lines ($p_0-p_1$, $p_1-p_2$, ..., $p_i-p_{i+1}$, where i≥1 and i+1<number of points) into a list. Returned as an output 1508 is the resulting list of lines.

The SurfaceModel type of "IfcShapeRepresentation" mainly describes the geometry in its "items" attribute ($4^{th}$ attribute), which is usually just one instance of "IfcFaceBasedSurfaceModel." An "IfcFaceBasedSurfaceModel" has only one attribute named "Fbsmfaces." The value of its "Fbsmfaces" attribute is an "IfcConnectedFaceSet." An "IfcConnectedFaceSet" has only one attribute named "Cfsfaces," whose value is an aggregate of "IfcFace." An "IfcFace" has only one attribute, named "Bounds," whose value is an "IfcFaceOuterBound." An "IfcFaceOuterBound" has two attributes—"Bound" ($1^{st}$ attribute) and "Orientation" ($2^{nd}$ attribute), respectively. The value of the "Bound" attribute is an "IfcPolyLoop" that defines the boundary of the face whereas the value of the "Orientation" attribute is a Boolean value that defines the direction of the surface normal. An "IfcPolyLoop" has only one attribute, named "Polygon," whose value is a list of "IfcCartesianPoint." Algorithm 1400 described above is used to process the "IfcPolyLoop." The resulting graphical elements (i.e., triangles) will be fed to the Visualization Engine.

The Clipping type of "IfcShapeRepresentation" mainly describes the geometry in its "items" attribute (4th attribute), which is usually just one instance of "IfcBooleanClippingResult." An "IfcBooleanClippingResult" has three attributes: "Operator" (1st attribute), "Firstoperand" (2nd attribute), and "Secondoperand" (3rd attribute), respectively. The "IfcBooleanClippingResult" is processed using algorithm 1600 (shown in FIGS. 16A-B) as detailed below. The resulting solid is triangulated using the same triangulation method as in SweptSolid type of "IfcShapeRepresentation." The resulting graphical elements (i.e., triangles) will be fed to the Visualization Engine.

Figure 16A:
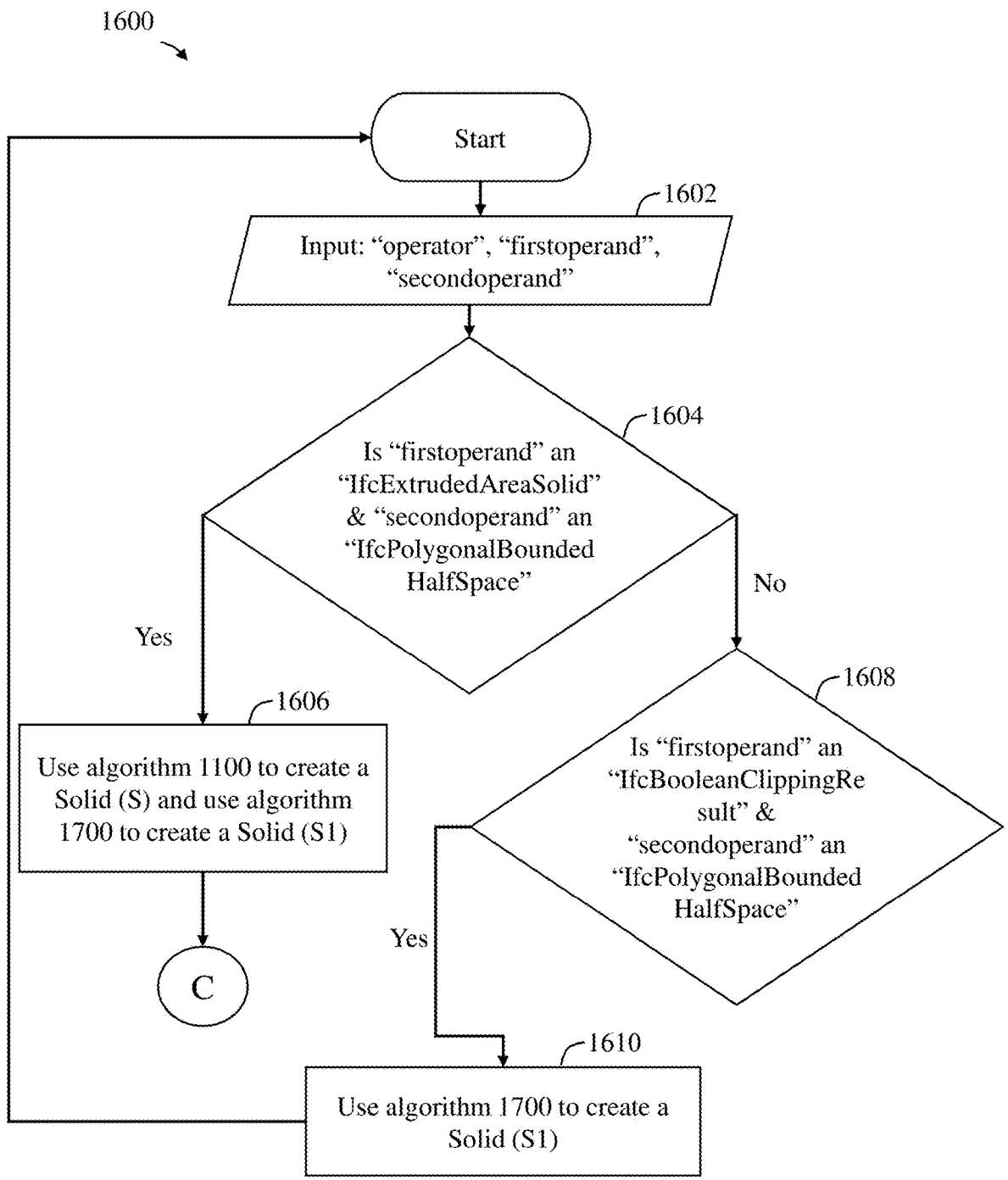
FIGS. 16A-B represent a flowchart diagram for algorithm Process_Clipping.
Figure 16B:
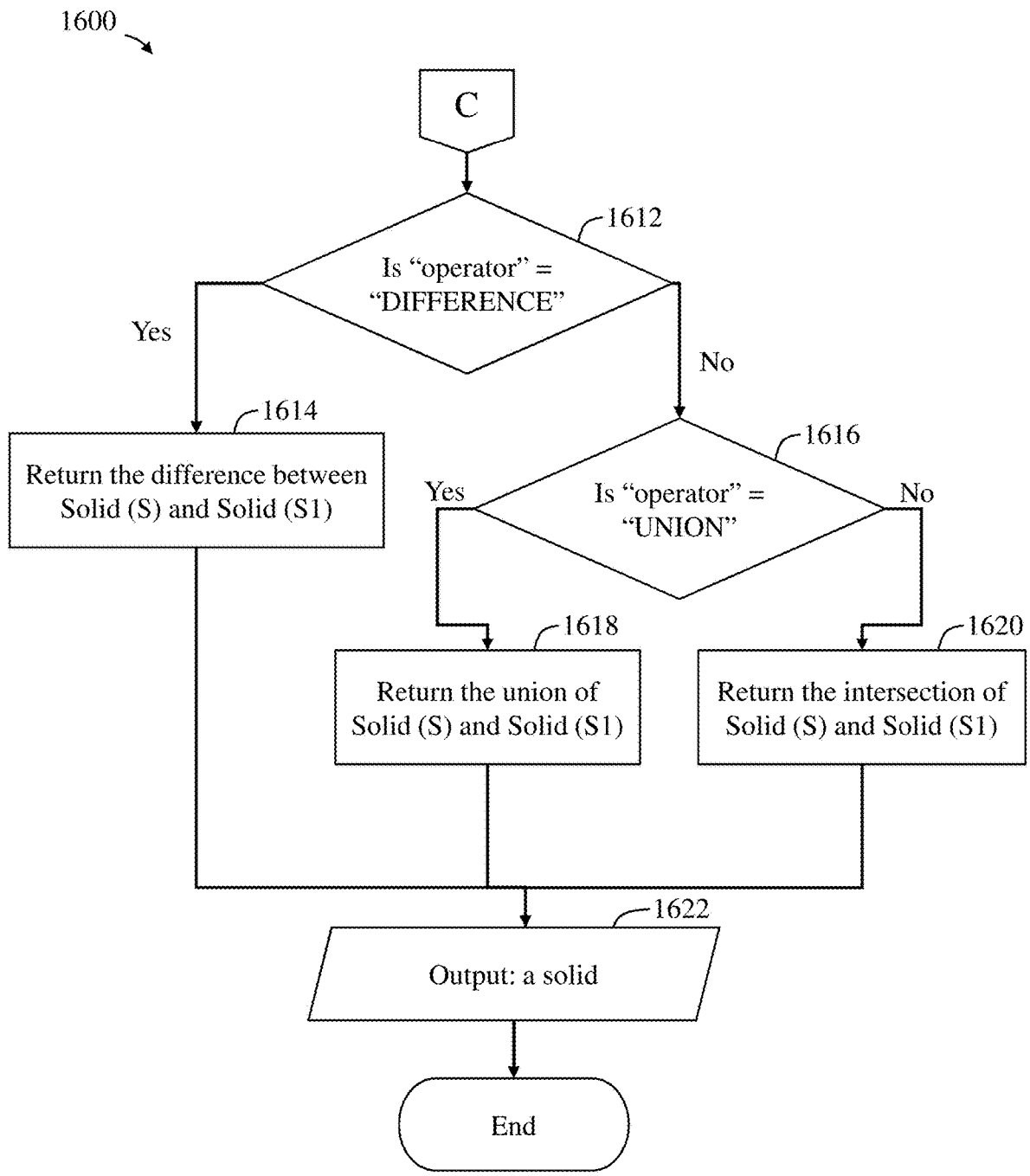
Figure 17A:
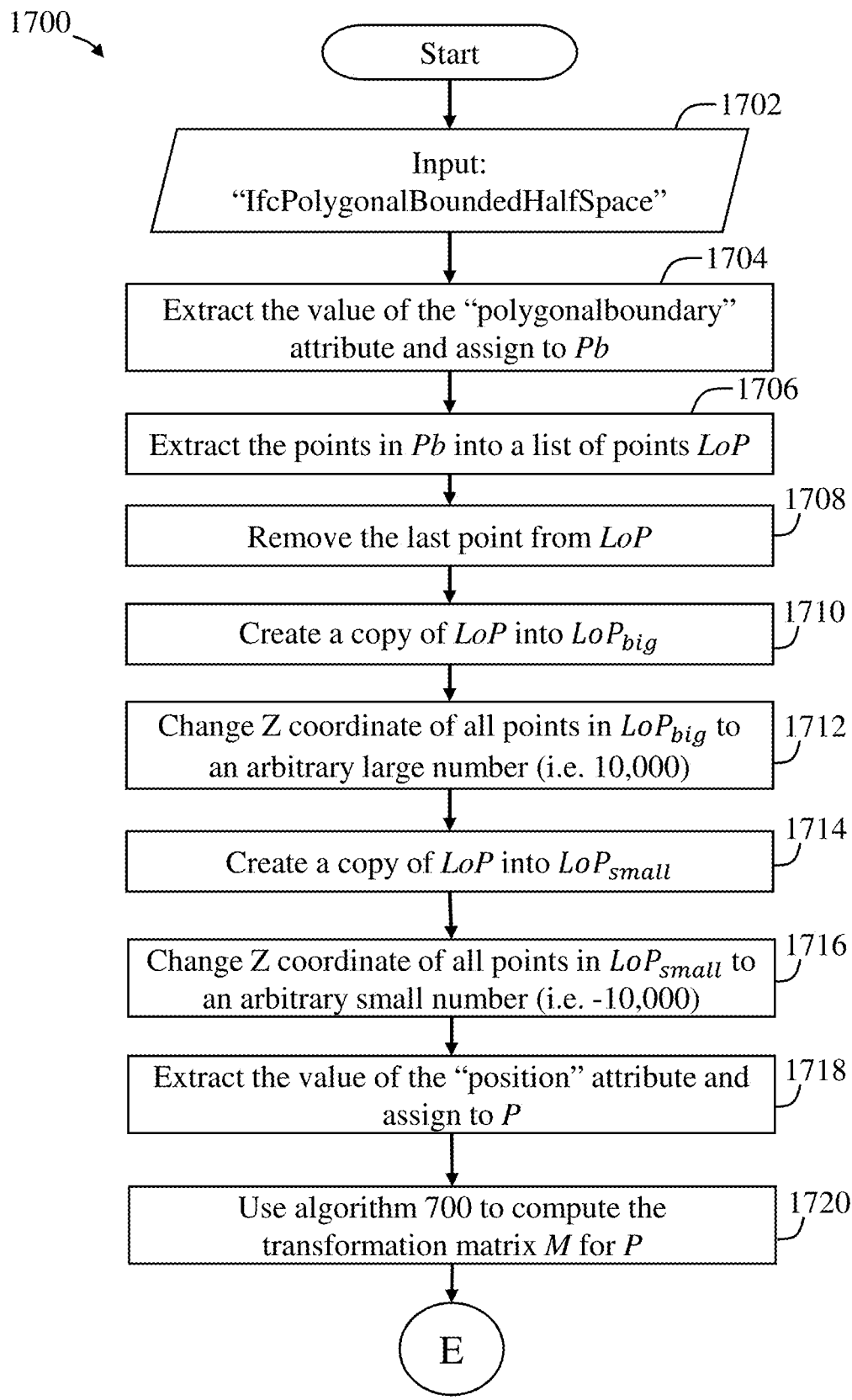
FIG. 17A-D represent a flowchart diagram for algorithm Process_PolygonalBoundedHalfSpace.
Figure 17B:
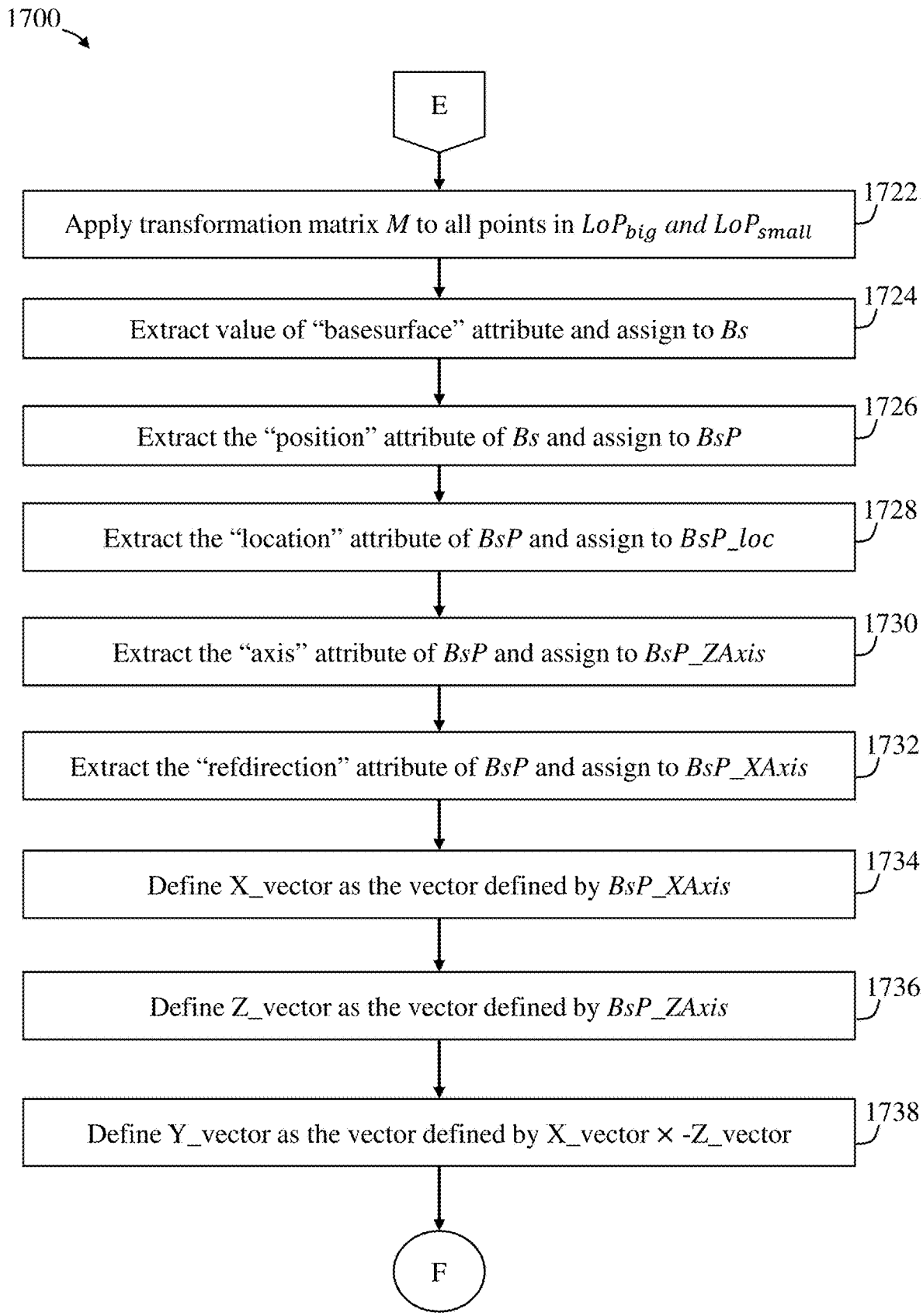
Figure 17C:
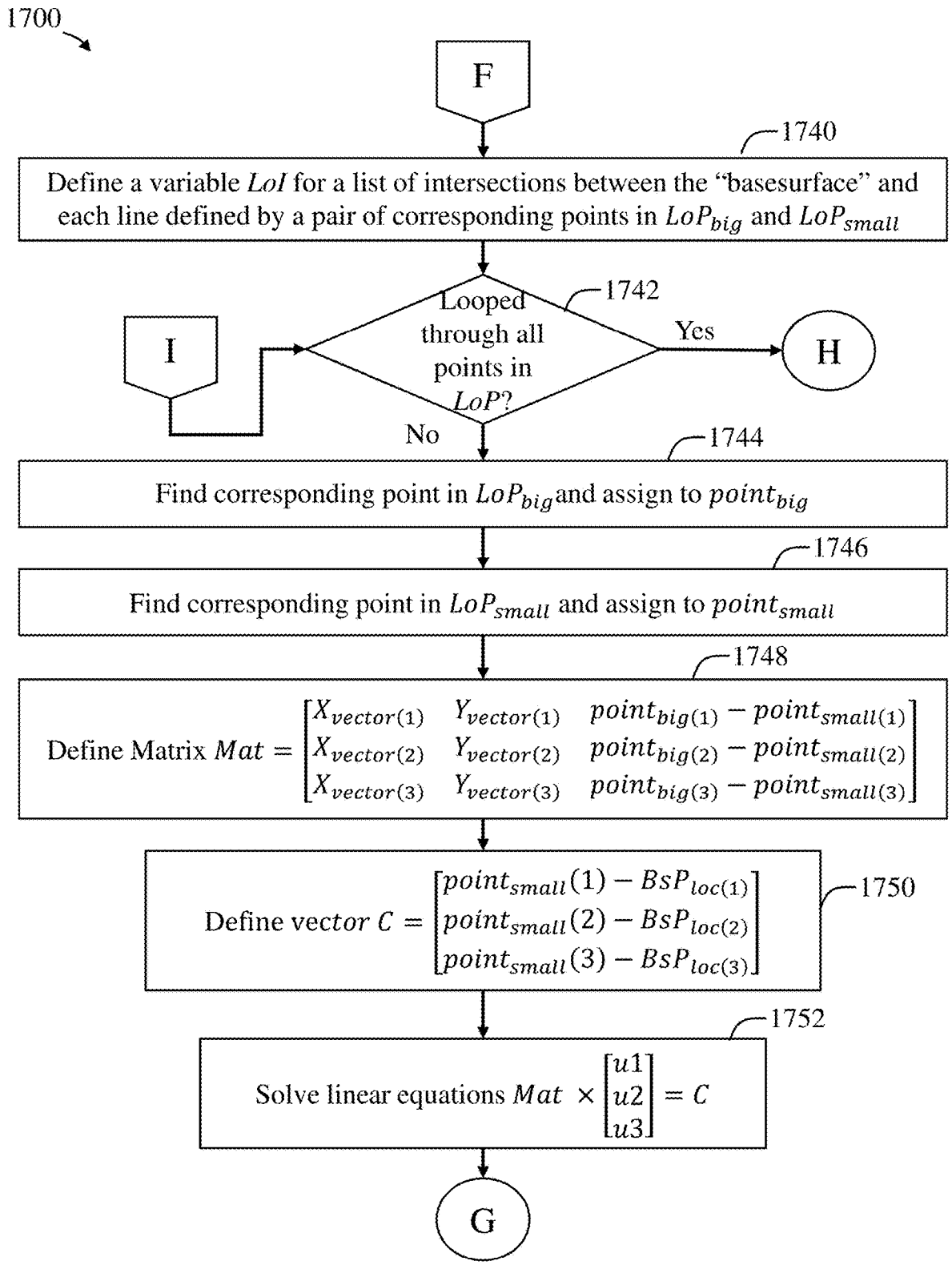
Figure 17D:
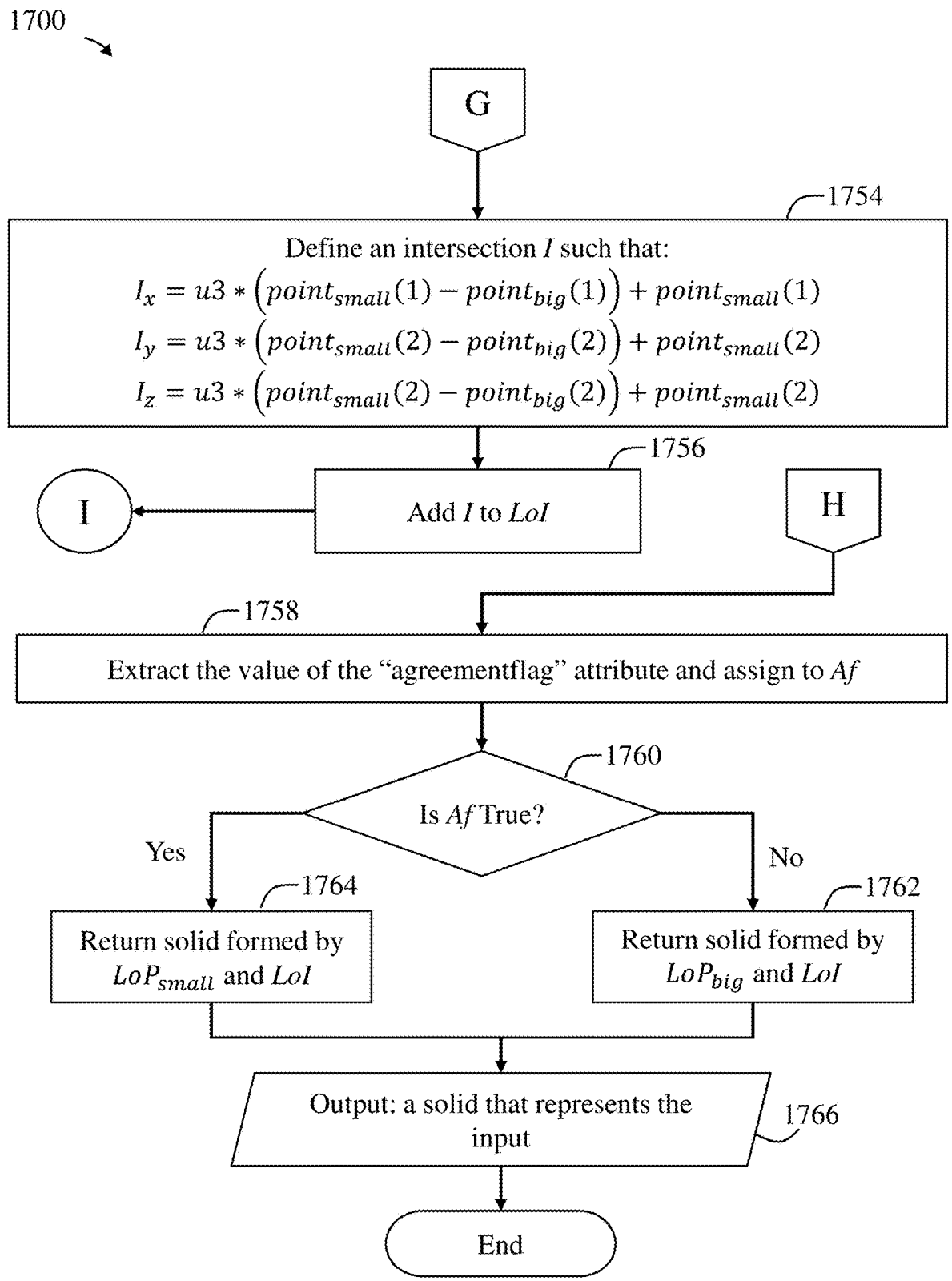

Referring to FIGS. 16A and 16B, a flowchart diagram for algorithm 1600 Process Clipping is shown. The algorithm takes as its input 1602 an "operator", a "firstoperand", and a "secondoperand" and returns as its output 1622 a solid that represents the clipping results of two input solids. The first step 1604 is to determine whether the "firstoperand" is an "IfcExtrudedAreaSolid" and the "secondoperand" is an "IfcPolygonalBoundedHalfSpace". If step 1604 is true, then the next step 1606 is to create a solid S, using the same algorithm 1100 to process the SweptSolid described above, that represents the solid shape of the "IfcExtrudedAreaSolid", and to use algorithm 1700 (shown in FIG. 17) to create a solid S1 that represents the solid shape of the "IfcPolygonalBoundedHalfSpace". Else, if step 1604 returns false, the next step 1608 is to determine whether "firstoperand" is an "IfcBooleanClippingResult" and the "secondoperand" is an "IfcPolygonalBoundedHalfSpace". If step 1608 returns true, then the next step 1610 is to use algorithm 1700 to create a solid S1 that represents the solid shape of the "IfcPolygonalBoundedHalfSpace" and this algorithm 1600 is recursively applied to the "operator", "firstoperand," and "secondoperand" attributes of the "firstoperand" (i.e., the value is an "IfcBooleanClippingResult" in this case) until the "firstoperand" is not an "IfcBooleanClippingResult" but an "IfcExtrudedAreaSolid," to create the solid S.

With further reference to FIGS. 16A-B, The next step 1612 is to determine whether the value "operator" is "DIFFERENCE". If step 1612 returns true then the next step 1614 is to return the difference between solid S and solid S1. Else, if step 1612 returns false, the next step 1616 is to determine whether the value of "operator" is "UNION". If step 1616 returns true then the next step 1618 is to return the union of solid S and solid S1. Else, if step 1616 returns false, then the next step 1620 is to return the intersection between solid S and solid S1.

Referring to FIGS. 17A-D, a flowchart diagram for algorithm 1700 Process Polygonal Bounded Half Space is shown. The algorithm 1700 takes as its input 1702 "IfcPolygonalBoundedHalfSpace" and returns as its output 1766 a solid that represents the input 1702. The first step 1704 is to extract the value of the "polygonalboundary" attribute of the "IfcPolygonalBoundedHalfSpace" and assign it to Pb. The next step 1706 is to extract the points in Pb into a list of points LoP. The next step 1708 is to remove the last point from the list of points LoP. The next step 1710 is to create a copy of LoP into $LoP_{big}$. The next step 1712 is to change the Z-coordinate of all points in $LoP_{big}$ to an arbitrary large number (i.e., 10,000). The next step 1714 is to create a copy of LoP into $LoP_{small}$. The next step 1716 is to change the Z-coordinate of all points in $LoP_{small}$ to an arbitrary small number (i.e., −10,000). The next step 1718 is to extract the value of the "position" attribute of the "IfcPolygonalBoundedHalfSpace" assign it to P. The next step 1720 is to use algorithm 700 to compute the transformation matrix M for P. The next step 1722 is to apply the transformation matrix M to all points in $LoP_{big}$ and $LoP_{small}$. The next step 1724 is to extract the value of the "basesurface" attribute of the "IfcPolygonalBoundedHalfSpace" and assign it to Bs. The next step 1726 is to extract the "position" attribute of Bs and assign it to BsP. The next step 1728 is to extract the "location" attribute of BsP and assign it to BsP_loc. The next step 1730 is to extract the "axis" attribute of BsP and assign it to BsP_ZAxis. The next step 1732 is to extract the "refdirection" attribute of BsP and assign it to BsP_XAxis.

With further reference to FIG. 17A-D, following step 1732, the next step 1734 is to define the vector X_vector as defined by BsP_XAxis. The next step 1736 is to define the vector Z_vector as defined by BsP_ZAxis. The next step 1738 is to define the vector Y_vector as the cross product of X_vector and −Z_vector. The next step 1740 is to define a variable LoI for a list of intersections between the "basesurface" and each line defined by a pair of corresponding points in $LoP_{big}$ and $LoP_{small}$. The next step 1742 is to determine whether all points in LoP have been looped through, each point undergoing steps 1744 through 1756. If all points have not undergone these steps, the next step 1744 is to find the corresponding point in $LoP_{big}$ and assign it to $point_{big}$. The next step 1746 is to find the corresponding point in $LoP_{small}$ and assign it to $point_{small}$. The next step 1748 is to define the matrix Mat according to the following:

$$Mat = \begin{bmatrix} X_{vector(1)} & Y_{vector(1)} & point_{big(1)} - point_{small(1)} \\ X_{vector(2)} & Y_{vector(2)} & point_{big(2)} - point_{small(2)} \\ X_{vector(3)} & Y_{vector(3)} & point_{big(3)} - point_{small(3)} \end{bmatrix}$$

The next step 1750 is to define the vector C according to the following:

$$C = \begin{bmatrix} point_{small}(1) - BsP_{loc(1)} \\ point_{small}(2) - BsP_{loc(2)} \\ point_{small}(3) - BsP_{loc(3)} \end{bmatrix} \tag{5}$$

The next step 1752 is to solve the linear equations:

$$Mat \times \begin{bmatrix} u1 \\ u2 \\ u3 \end{bmatrix} = C \tag{6}$$

The next step 1754 is to define an intersection I such that:

$$I_x = u3*(point_{small}(1) - point_{big}(1)) + point_{small}(1) \tag{7}$$

$$I_y = u3*(point_{small}(2) - point_{big}(2)) + point_{small}(2) \tag{8}$$

$$I_z = u3*(point_{small}(2) - point_{big}(2)) + point_{small}(2) \tag{9}$$

The next step 1756 is to add I to LoI.

Once all points in LoP have undergone steps 1744 to 1756, the next step 1758 is to extract the value of the "agreementflag" attribute of the "IfcPolygonalBoundedHalfSpace" and assign it to Af. The next step 1760 is to determine whether or not Af is true. If Af is true, the next step 1764 is to return the solid formed by $LoP_{small}$ and LoI. If Af is not true, the next step 1762 is to return the solid formed by $LoP_{big}$ and LoI. Thus resulting in an output 1766 of a solid that represents the input 1702.

The CSG type of "ifcShapeRepresentation" is processed using the same method as in the Clipping type of "ifcShapeRepresentation". The MappedRepresentation type of "IfcShapeRepresentation" mainly describes the geometry in its "items" attribute (4th attribute), which is usually just one instance of "IfcMappedItem." An "IfcMappedItem" has two attributes—"mappingsource" (1st attribute) and "mappingtarget" (2nd attribute). algorithm 1800 (shown in FIG. 18) is used to process the "mappingsource" and "mappingtarget," the details of which are shown below.

Figure 18A:
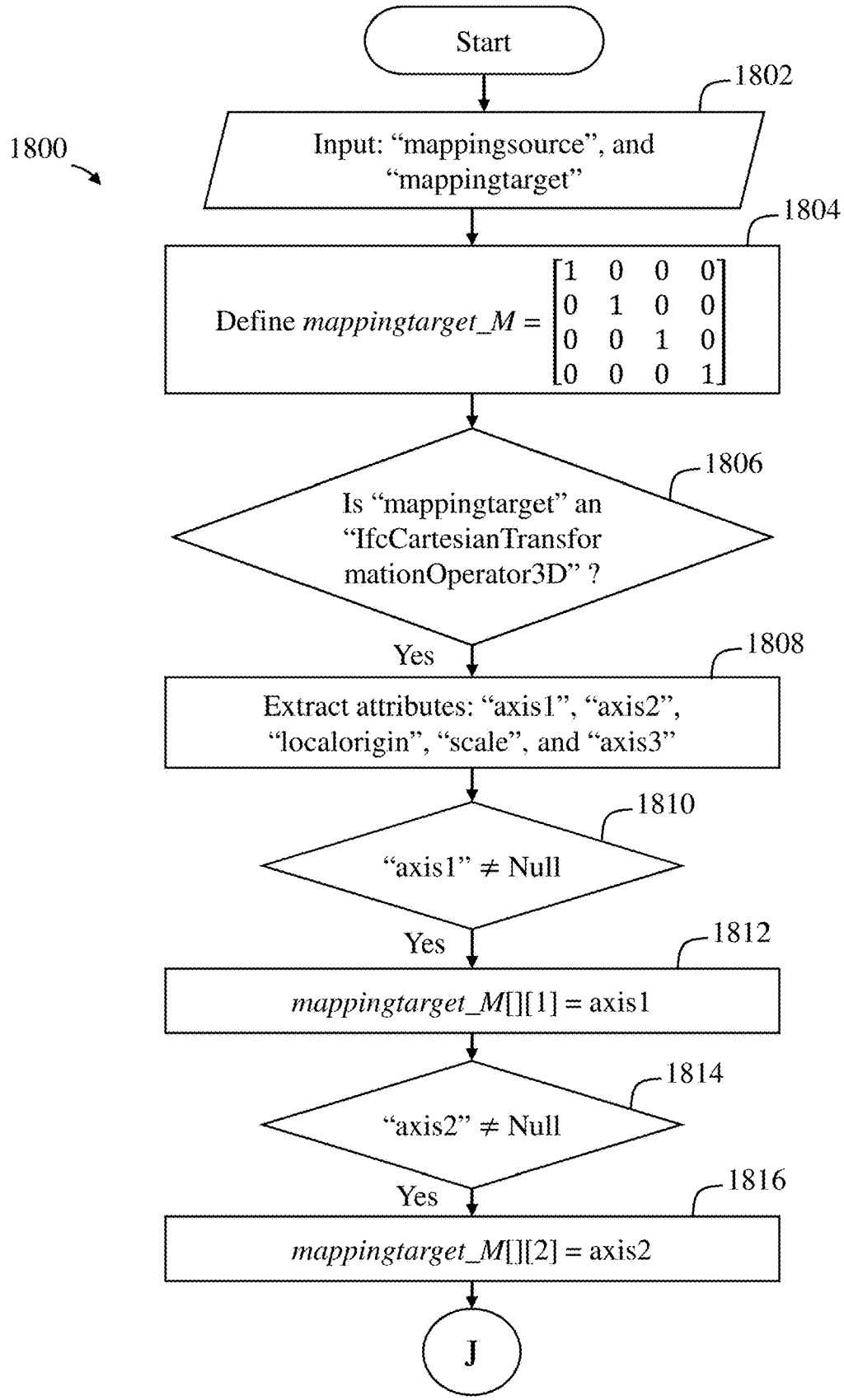
FIGS. 18A-B represent a flowchart diagram of algorithm Process_MappedRepresentation.
Figure 18B:
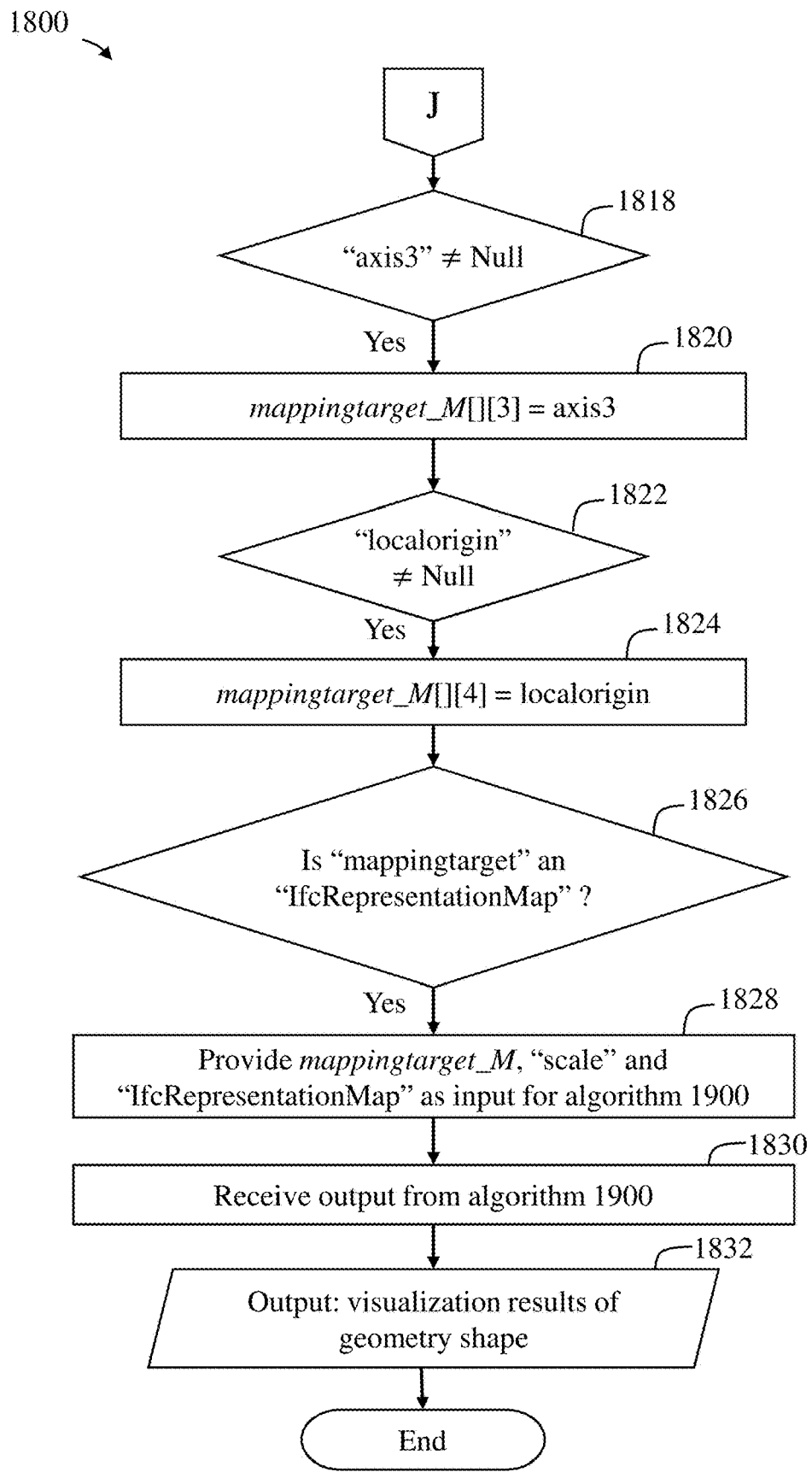

Referring to FIGS. 18A-B, a flowchart diagram of algorithm 1800 Process Mapped Representation is shown. The algorithm 1800 takes as its input 1802 the "mappingsource", and "mappingtarget" of an "IfcMappedItem" and returns as its output 1832 visualization results of the geometry shape represented using "IfcMappedItem". The first step 1804 is to define a matrix mappingtarget_M according to the following:

$$mappingtarget\_M = \begin{bmatrix} 1 & 0 & 0 & 0 \\ 0 & 1 & 0 & 0 \\ 0 & 0 & 1 & 0 \\ 0 & 0 & 0 & 1 \end{bmatrix} \tag{10}$$

The next step 1806 is to determine whether "mappingtarget" is an "IfcCartesianTransformationOperator3D". If step 1806 returns true, then the next step 1808 is to extract the following attributes of "IfcCartesianTransformationOperator3D": "axis1", "axis2", "localorigin", "scale", and "axis3". The next step 1810 is to determine whether "axis1" is not null. If "axis1" is not null, the next step 1812 is to set mappingtarget [1] equal to "axis1". The next step 1814 is to determine if "axis2" is not null. If "axis2" is not null, the next step 1816 is to set mappingtarget_M[ ][2] equal to "axis2". The next step 1818 is to determine whether "axis3" is not null. If "axis3" is not null, the next step 1820 is to set mappingtarget_M[ ][3] equal to "axis3". The next step 1822 is to determine whether "localorigin" is not null. If "localorigin" is not null, the next step 1824 is to set mappingtarget_M[ ][4] equal to "localorigin". The next step 1826 is to determine whether "mappingtarget" is an "IfcRepresentationMap". If it is, the next step 1828 is to provide mappingtarget_M, "scale", and "IfcRepresentationMap" as input for algorithm 1900 (shown in FIG. 19). The next step is to receive the output from algorithm 1900 which is the output 1832 visualization results of the geometry shape represented using "IfcMappedItem".

Figure 19:
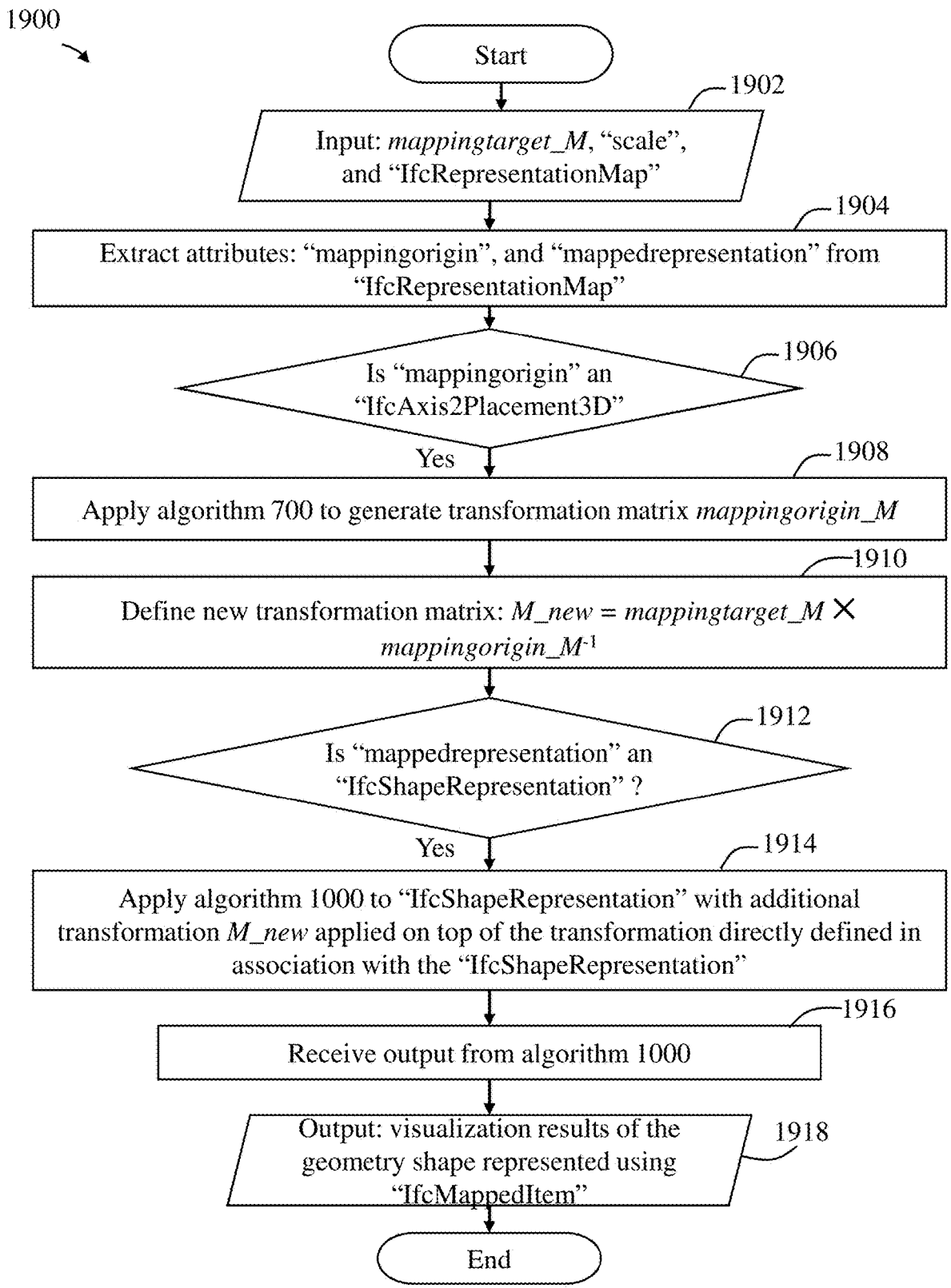
FIG. 19 is a flowchart diagram of algorithm Process_RepresentationMap.

Referring to FIG. 19, a flowchart diagram of algorithm 1900 Process Representation Map is shown. The algorithm 1900 takes as its input 1902 mappingtarget_M (step 1804 in FIG. 18), scale, and "IfcRepresentationMap" and returns as its output 1918 visualization results of the geometry shape represented using "IfcMappedItem". The first step 1904 is to extract the two attributes of "IfcRepresentationMap": "mappingorigin", and "mappedrepresentation". The next step 1906 is to determine if "mappingorigin" is an "IfcAxis2Placement3D". If it is, then the next step 1908 is to apply algorithm 700 to generate the transformation matrix mappingorigin_M. The next step 1910, is to define a new transformation matrix M_new which equals the cross product of matrix mappingtarget_M and the inverse matrix of mappingorigin_M. The next step 1912 is to determine if "mappedrepresentation" is an "IfcShapeRepresentation". If it is, the next step 1914 is to recursively apply the algorithm 1000 to "IfcShapeRepresentation" with additional transformation M_new applied on top of the transformation directly defined in association with the "IfcShapeRepresentation". The next step 1916 is to receive the output from algorithm 1000 in step 1914 such that the output 1918 visualization results of the geometry shape represented using "IfcMappedItem" are obtained.

The assignment of color and transparency to a geometric representation in IFC data is achieved through the use of "IfcStyledItem." An "IfcStyledItem" has three attributes, "item" (1st attribute), "styles" (2nd attribute), and "name" (3rd attribute). The value of the "item" attribute is an "IfcRepresentationItem" such as "IfcExtrudedAreaSolid." The value of the "styles" attribute is a set of "IfcPresentationStyleAssignment." The value of the "name" attribute is an "IfcLabel." The Analysis Engine analyzes an "IfcRepresentationItem" by backtracking its user "IfcStyledItem." Once the "ifcStyledItem" is found, the Analysis Engine extracts the set of "IfcPresentationStyleAssignment." Usually there is only one "IfcPresentationStyleAssignment" instance in the set. An "IfcPresentationStyleAssignment" has one attribute named "styles," whose value is a set of "IfcPresentationStyleSelect." Usually there is only one "IfcPresentationStyleSelect" in the set which is an "IfcSurfaceStyle." An "IfcSurfaceStyle" has three attributes, "name" (1st attribute), "side" (2nd attribute), and "styles" (3rd attribute). The value of the "styles" attribute is a set of "IfcSurfaceStyleElementSelect." Usually there is only one "IfcSurfaceStyleElementSelect" in the set which is an "IfcSurfaceStyleRendering." An "IfcSurfaceStyleRendering" has nine attributes, namely, "surfacecolor" (1st attribute), "transparency" (2nd attribute), "diffusecolour" (3rd attribute), "transmissioncolour" (4th attribute), "diffusetransmissioncolour" (5th attribute), "reflectioncolour" (6th attribute), "specularcolour" (7th attribute), "specularhighlight" (8th attribute), and "reflectancemethod" (9th attribute). The value of the "surfacecolor" attribute (1st attribute) is an "IfcColourRGB." The value of the "transparency" attribute (2nd attribute) is a REAL number representing the percentage transparency. An "IfcColourRGB" has four attributes, "name" (1st attribute), "red" (2nd attribute), "green" (3rd attribute), and "blue" (4th attribute). The values of "red," "green," and "blue" attributes are REAL numbers representing the intensity of the three colors in the composite color being represented. The values of "red," "green," and "blue" attributes and the value of the "transparency" attribute are extracted and fed to the Visualization Engine.

The visualization engine takes all triangles and lines resulted from geometry analysis, transforms their coordinates using the transformation matrix M resulted from placement analysis conducted using algorithm 600, and renders the transformed triangles and lines with color and transparency resulted from color, transparency reading.

Figure 20A:
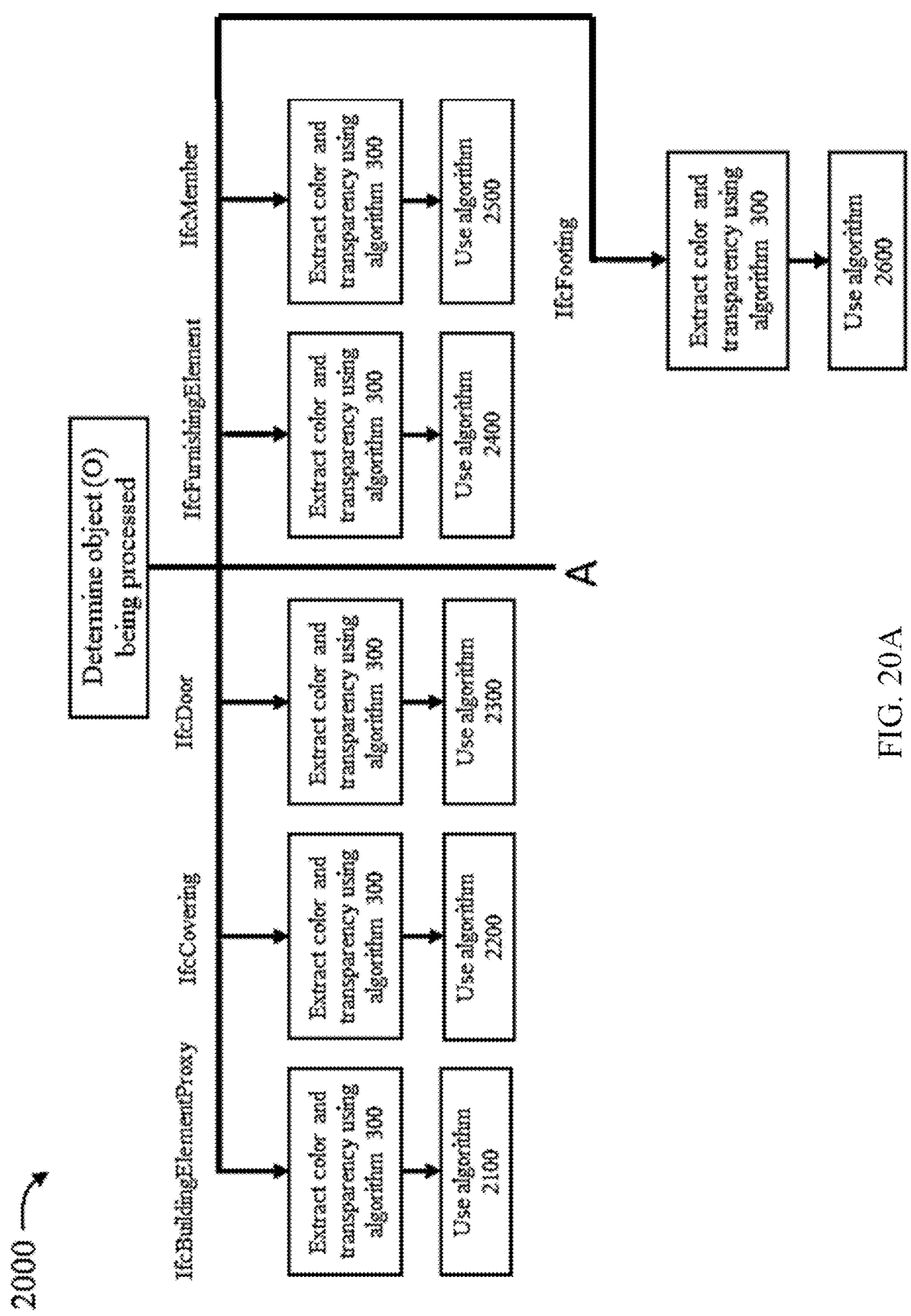
FIGS. 20A and 20B are a flowchart diagram extended over two pages for rendering different types of IFC objects.
Figure 20B:
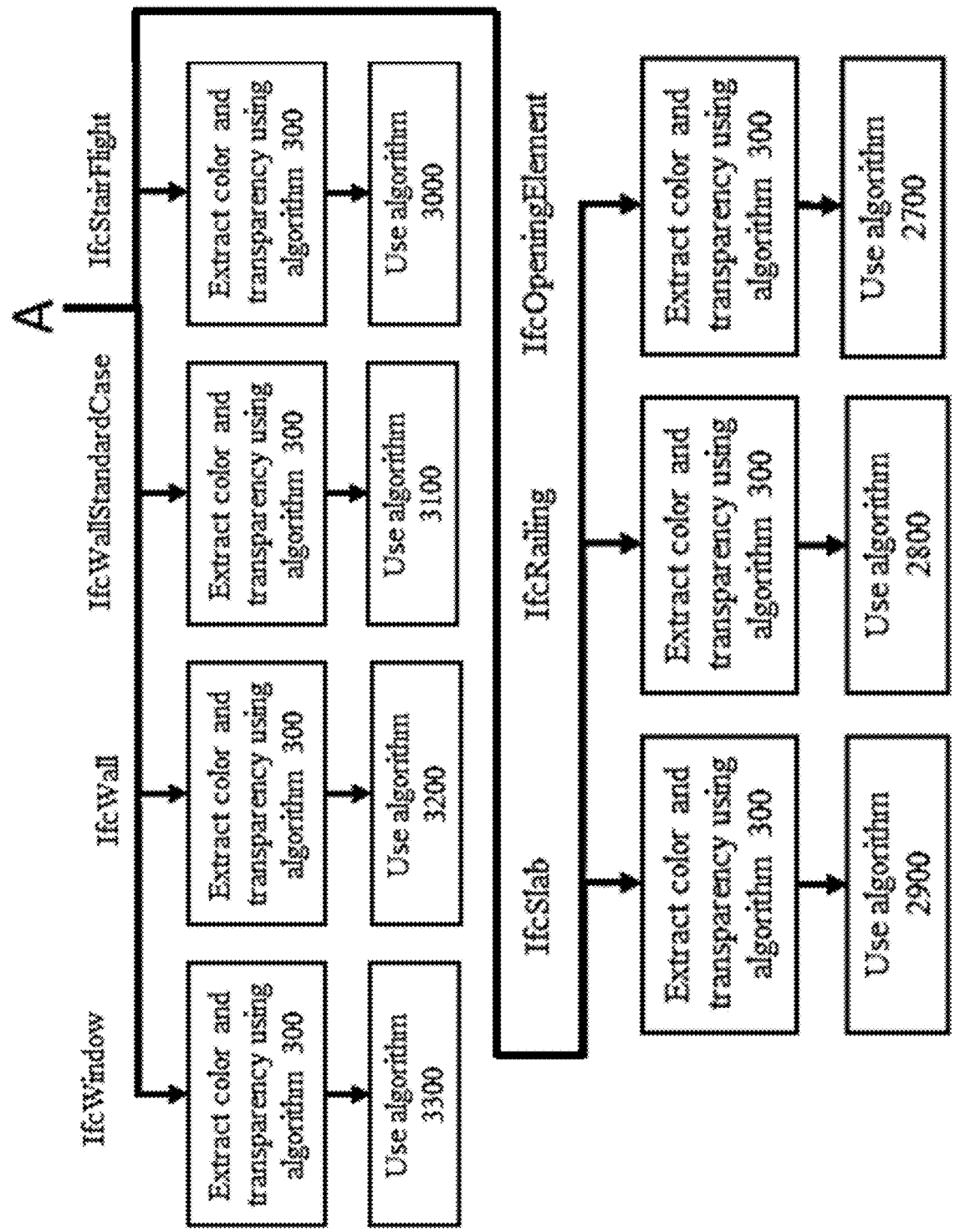

Referring to FIGS. 20A and 20B, a flowchart diagram 2000 for rendering different types of IFC objects is shown. FIGS. 20A and 20B span over two pages. Thirteen different IFC objects were implemented and tested including: IfcBuildingElementProxy, IfcCovering, IfcDoor, IfcFurnishingElement, IfcMember, IfcFooting, IfcOpeningElement, IfcRailing, IfcSlab, IfcStairFlight, IfcWallStandardCase, IfcWall, and IfcWindow. All objects begin by having the color and transparency of their respective IfcXXX extracted using algorithm 300. Where, IfcXXX can refer to any of the IFC objects outlined above. Following that, each IFC object is then processed by a respective algorithm, for instance IfcCovering is processed using algorithm 2200 Process Covering and IfcDoor is processed using algorithm 2300 Process Door, and so on. The algorithms 2100-3300 are described in more detail in the proceeding disclosure.

Figure 21:
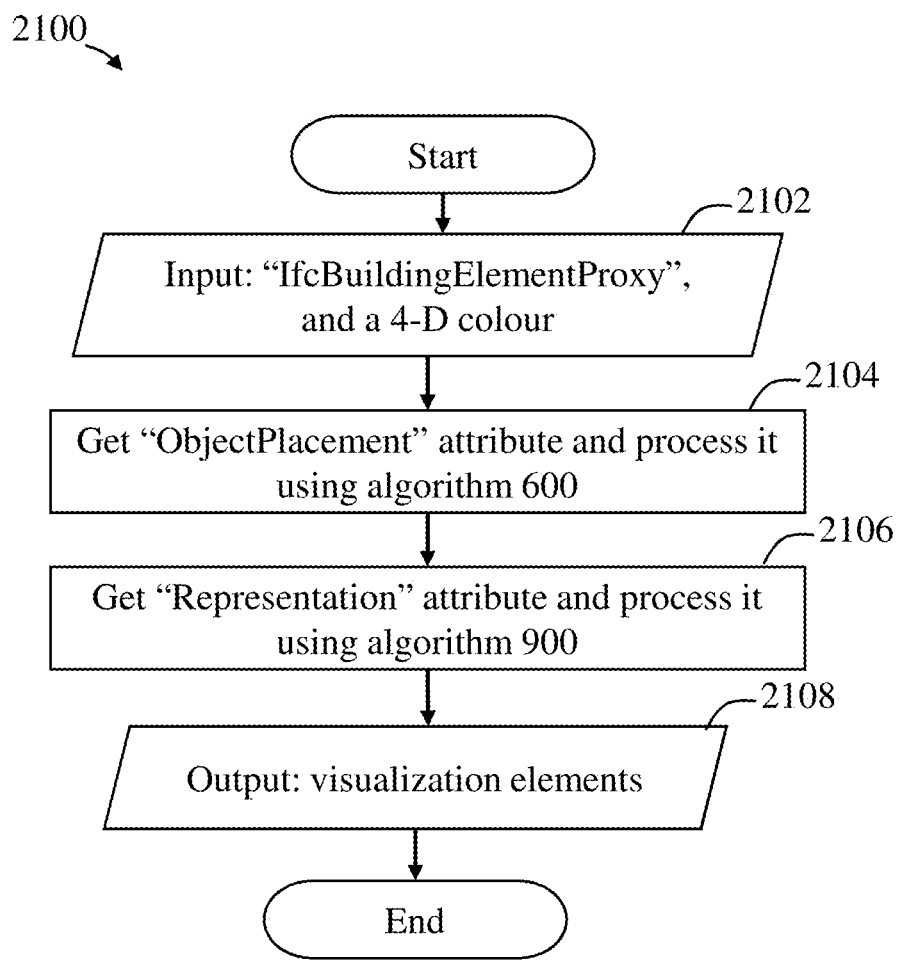
FIG. 21 is a flowchart diagram for algorithm Process_BuildingElementProxy.

Referring to FIG. 21, a flowchart diagram of algorithm 2100 Process Building Element Proxy is shown. The algorithm 2100 takes as an input 2102 an "IfcBuildingElementProxy" and a four dimensional colour describing the red, green, blue, and transparency values. Furthermore, the algorithm 2100 returns as its output 2108 corresponding visualization elements. The first step 2104 is to get the "ObjectPlacement" attribute of the "IfcBuildingElementProxy" (i.e., an "IfcLocalPlacement"), process it using the algorithm 600. The next step 2106 is to get the "Representation" attribute of the "IfcBuildingElementProxy" (i.e., an "IfcProductDefinitionShape"), process it using the algorithm 900.

Figure 22:
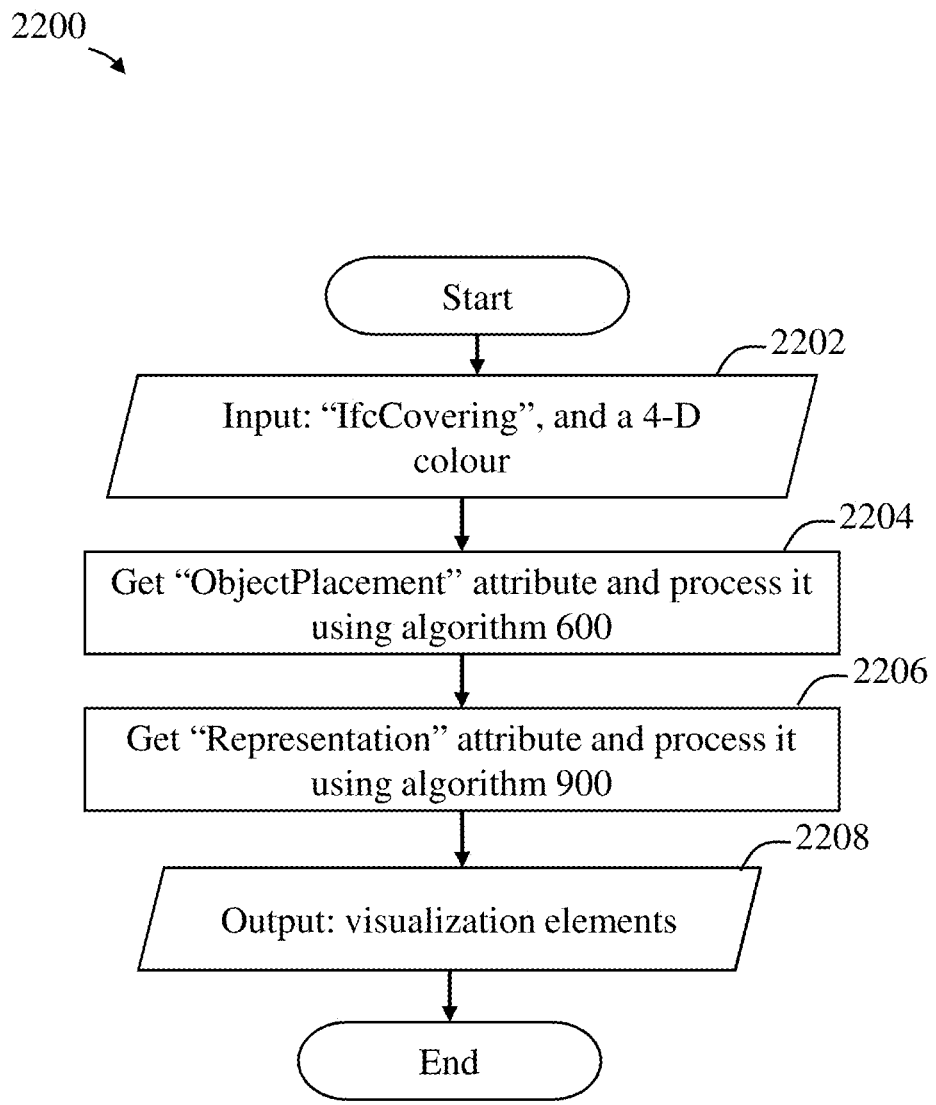
FIG. 22 is a flowchart diagram for algorithm Process_Covering.

Referring to FIG. 22, a flowchart diagram of algorithm 2200 Process Covering is shown. The algorithm 2200 takes as an input 2202 an "IfcCovering" and a four dimensional colour describing the red, green, blue, and transparency values. Furthermore, the algorithm 2200 returns as its output 2208 corresponding visualization elements. The first step 2204 is to get the "ObjectPlacement" attribute of the "IfcCovering" (i.e., an "IfcLocalPlacement"), process it using the algorithm 600. The next step 2206 is to get the "Representation" attribute of the "IfcCovering" (i.e., an "IfcProductDefinitionShape"), process it using the algorithm 900.

Figure 23:
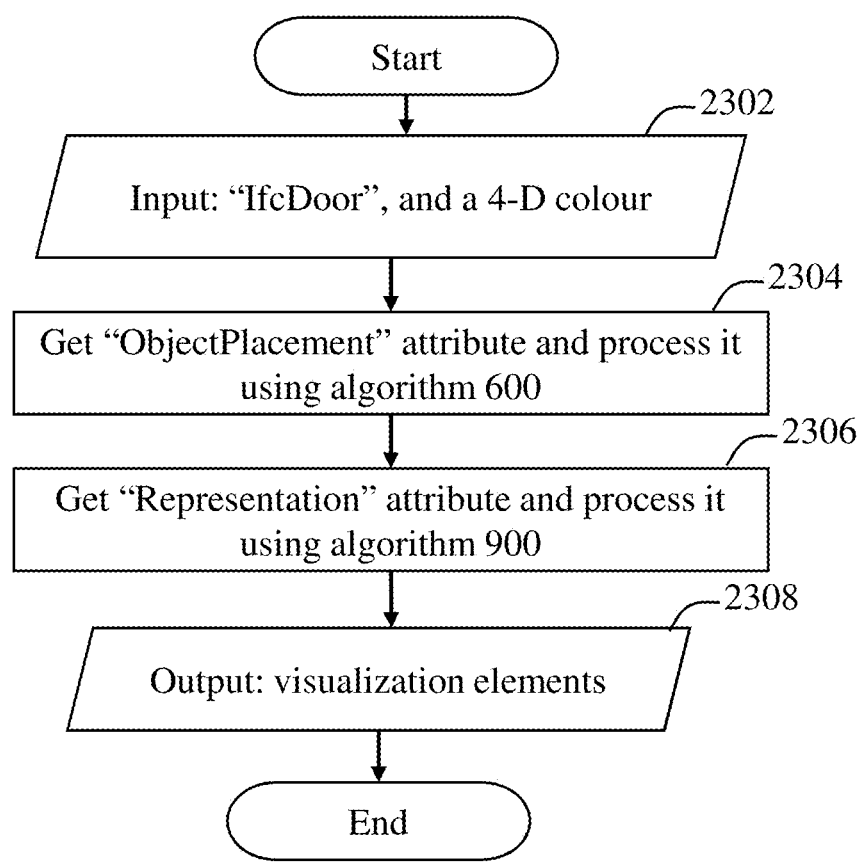
FIG. 23 is a flowchart diagram for algorithm Process_Door.

Referring to FIG. 23, a flowchart diagram of algorithm 2300 Process Door is shown. The algorithm 2300 takes as an input 2302 an "IfcDoor" and a four dimensional colour describing the red, green, blue, and transparency values. Furthermore, the algorithm 2300 returns as its output 2308 corresponding visualization elements. The first step 2304 is to get the "ObjectPlacement" attribute of the "IfcDoor" (i.e., an "IfcLocalPlacement"), process it using the algorithm 600. The next step 2306 is to get the "Representation" attribute of the "IfcDoor" (i.e., an "IfcProductDefinitionShape"), process it using the algorithm 900.

Figure 24:
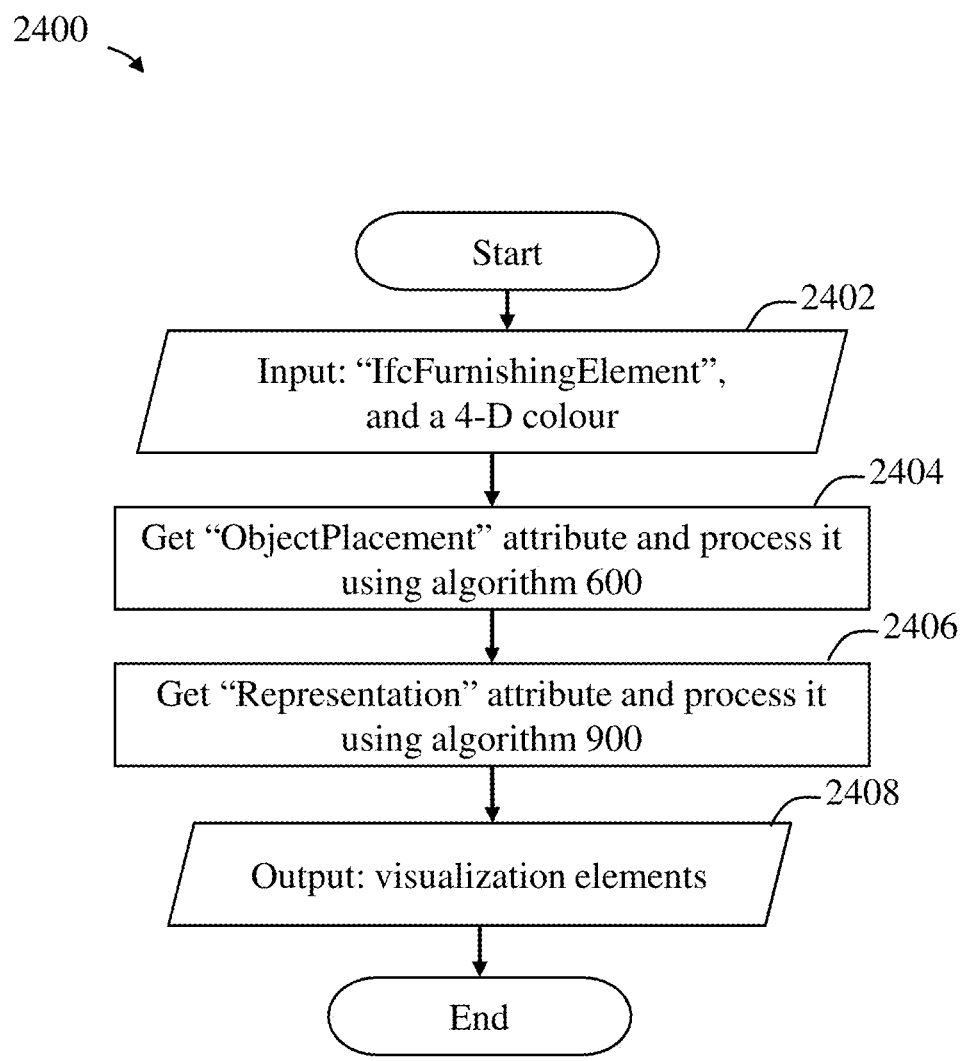
FIG. 24 is a flowchart diagram for algorithm Process_FurnishingElement.

Referring to FIG. 24, a flowchart diagram of algorithm 2400 Process Furnishing Element is shown. The algorithm 2400 takes as an input 2402 an "IfcFurnishingElement" and a four dimensional colour describing the red, green, blue, and transparency values. Furthermore, the algorithm 2400 returns as its output 2408 corresponding visualization elements. The first step 2404 is to get the "ObjectPlacement" attribute of the "IfcFurnishingElement" (i.e., an "IfcLocalPlacement"), process it using the algorithm 600. The next step 2406 is to get the "Representation" attribute of the "IfcFurnishingElement" (i.e., an "IfcProductDefinitionShape"), process it using the algorithm 900.

Figure 25:
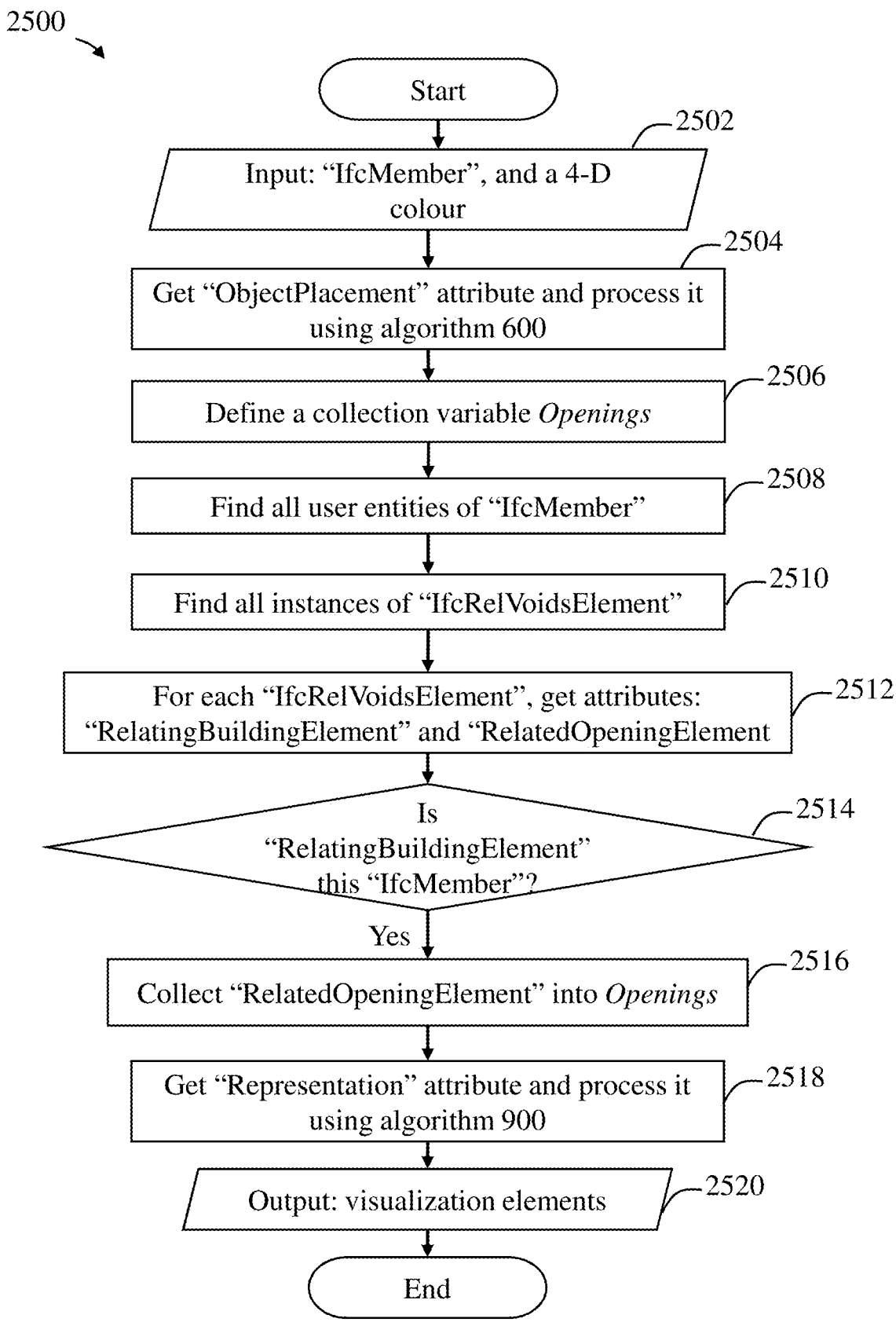
FIG. 25 is a flowchart diagram for algorithm Process_Member.

Referring to FIG. 25, a flowchart diagram of algorithm 2500 Process Member is shown. The algorithm 2500 takes as an input 2502 an "IfcMember" and a four dimensional colour describing the red, green, blue, and transparency values. Furthermore, the algorithm 2500 returns as its output 2520 corresponding visualization elements. The first step 2504 is to get the "ObjectPlacement" attribute of the "IfcMember" (i.e., an "IfcLocalPlacement"), process it using the algorithm 600. The next step 2506 is to define a collection variable Openings. The next step 2508 is to find all user entities of the "IfcMember". The next step 2510 is to find all instances of "IfcRelVoidsElement" in the found user entities from the previous step 2508. The next step 2512 is to get the "RelatingBuildingElement" and "RelatedOpeningElement" attributes for each "IfcRelVoidsElement". The next step 2514 is to determine if the value of the "RelatingBuildingElement" attribute is this "IfcMember". If it is, the next step 2516 is to collect the "RelatedOpeningElement" into collection variable Openings. The next step 2518 is to get the "Representation" attribute of the "IfcMember" (i.e., an "IfcProductDefinitionShape"), process it using the algorithm 900.

Figure 26:
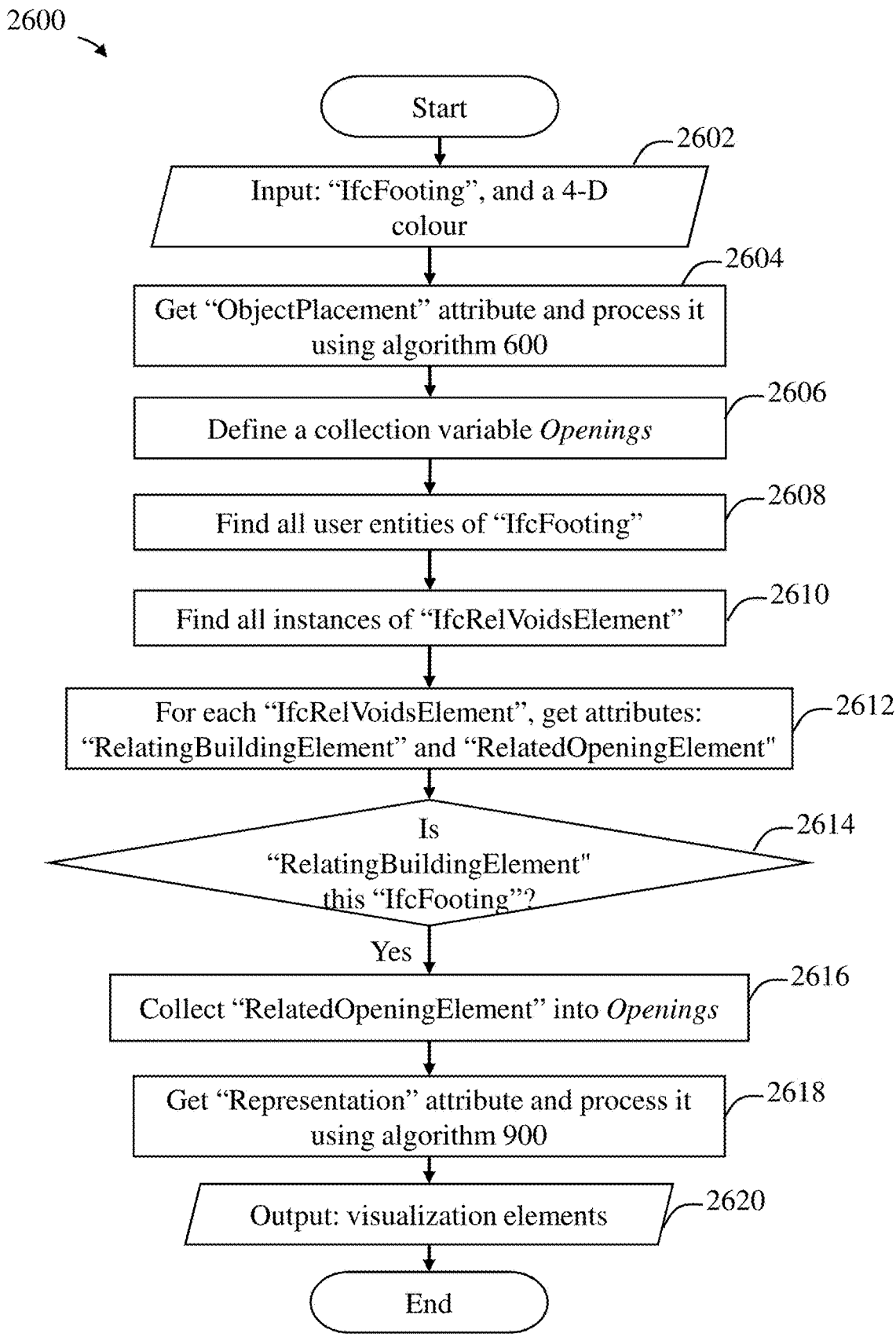
FIG. 26 is a flowchart diagram for algorithm Process_Footing.

Referring to FIG. 26, a flowchart diagram of algorithm 2600 Process Footing is shown. The algorithm 2600 takes as an input 2602 an "IfcFooting" and a four dimensional colour describing the red, green, blue, and transparency values. Furthermore, the algorithm 2600 returns as its output 2620 corresponding visualization elements. The first step 2604 is to get the "ObjectPlacement" attribute of the "IfcFooting" (i.e., an "IfcLocalPlacement"), process it using the algorithm 600. The next step 2606 is to define a collection variable Openings. The next step 2608 is to find all user entities of the "IfcFooting". The next step 2610 is to find all instances of "IfcRelVoidsElement" in the found user entities from the previous step 2608. The next step 2612 is to get the "RelatingBuildingElement" and "RelatedOpeningElement" attributes for each "IfcRelVoidsElement". The next step 2614 is to determine if the value of the "RelatingBuildingElement" attribute is this "IfcFooting". If it is, the next step 2616 is to collect the "RelatedOpeningElement" into collection variable Openings. The next step 2618 is to get the "Representation" attribute of the "IfcFooting" (i.e., an "IfcProductDefinitionShape"), process it using the algorithm 900.

Figure 27:
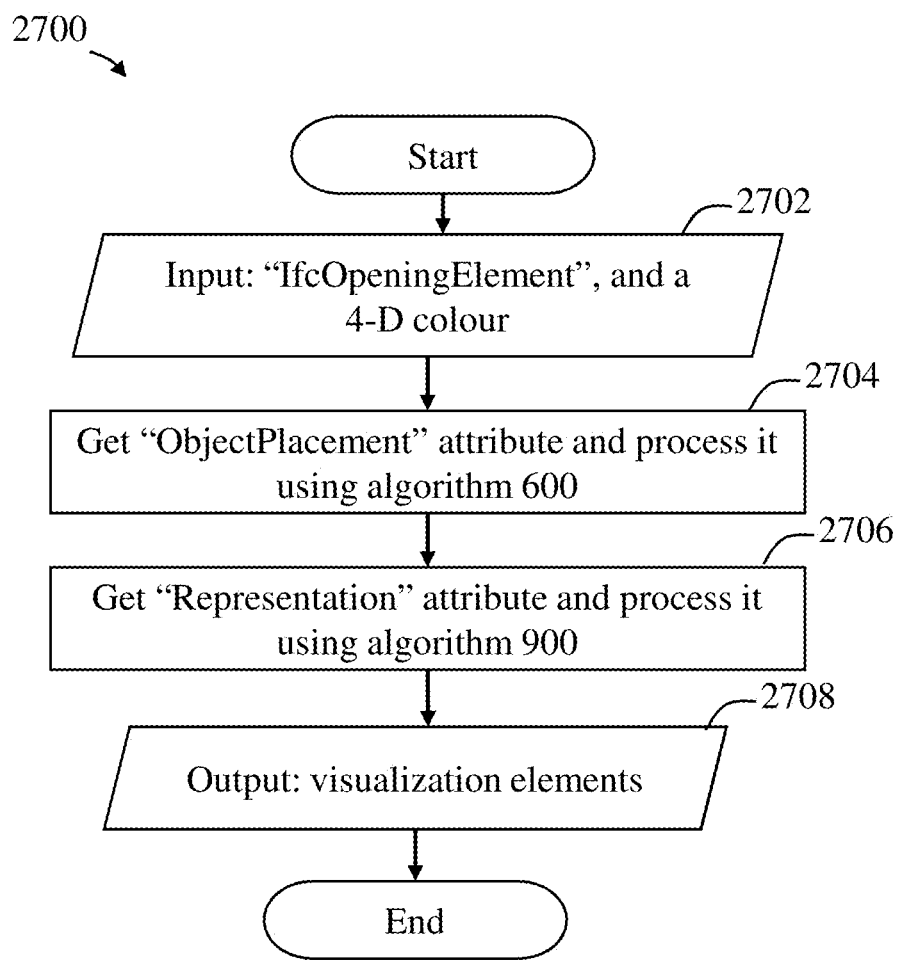
FIG. 27 is a flowchart diagram for algorithm Process_OpeningElement.

Referring to FIG. 27, a flowchart diagram of algorithm 2700 Process Opening Element is shown. The algorithm 2700 takes as an input 2702 an "IfcOpeningElement" and a four dimensional colour describing the red, green, blue, and transparency values. Furthermore, the algorithm 2700 returns as its output 2708 corresponding visualization elements. The first step 2704 is to get the "ObjectPlacement" attribute of the "IfcOpeningElement" (i.e., an "IfcLocalPlacement"), process it using the algorithm 600. The next step 2706 is to get the "Representation" attribute of the "IfcOpeningElement" (i.e., an "IfcProductDefinitionShape"), process it using the algorithm 900.

Figure 28:
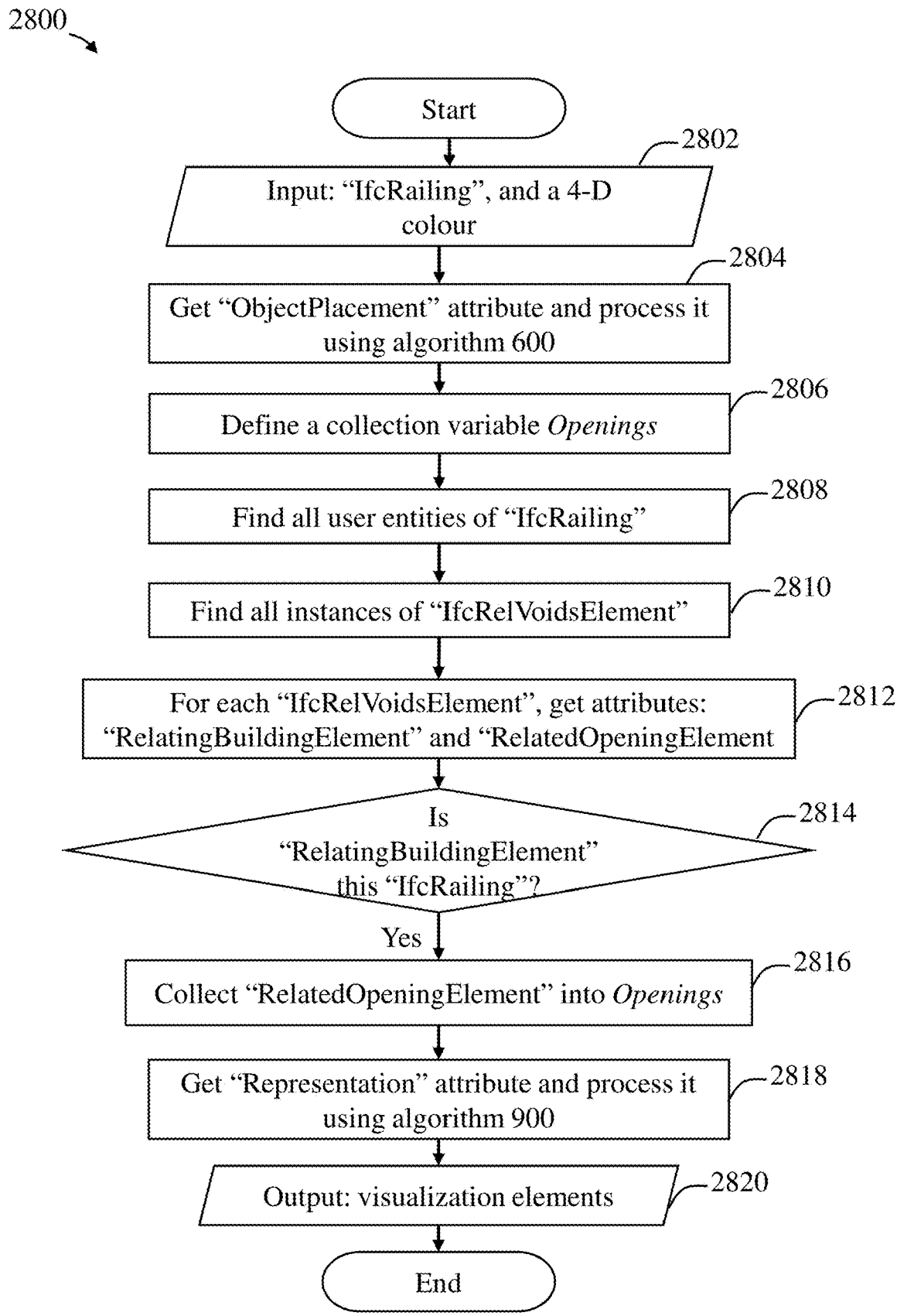
FIG. 28 is a flowchart diagram for algorithm Process_Railing.

Referring to FIG. 28, a flowchart diagram of algorithm 2800 Process Railing is shown. The algorithm 2800 takes as an input 2802 an "IfcRailing" and a four dimensional colour describing the red, green, blue, and transparency values. Furthermore, the algorithm 2800 returns as its output 2820 corresponding visualization elements. The first step 2804 is to get the "ObjectPlacement" attribute of the "IfcRailing" (i.e., an "IfcLocalPlacement"), process it using the algorithm 600. The next step 2806 is to define a collection variable Openings. The next step 2808 is to find all user entities of the "IfcRailing". The next step 2810 is to find all instances of "IfcRelVoidsElement" in the found user entities from the previous step 2808. The next step 2812 is to get the "RelatingBuildingElement" and "RelatedOpeningElement" attributes for each "IfcRelVoidsElement". The next step 2814 is to determine if the value of the "RelatingBuildingElement" attribute is this "IfcRailing". If it is, the next step 2816 is to collect the "RelatedOpeningElement" into collection variable Openings. The next step 2818 is to get the "Representation" attribute of the "IfcRailing" (i.e., an "IfcProductDefinitionShape"), process it using the algorithm 900.

Figure 29:
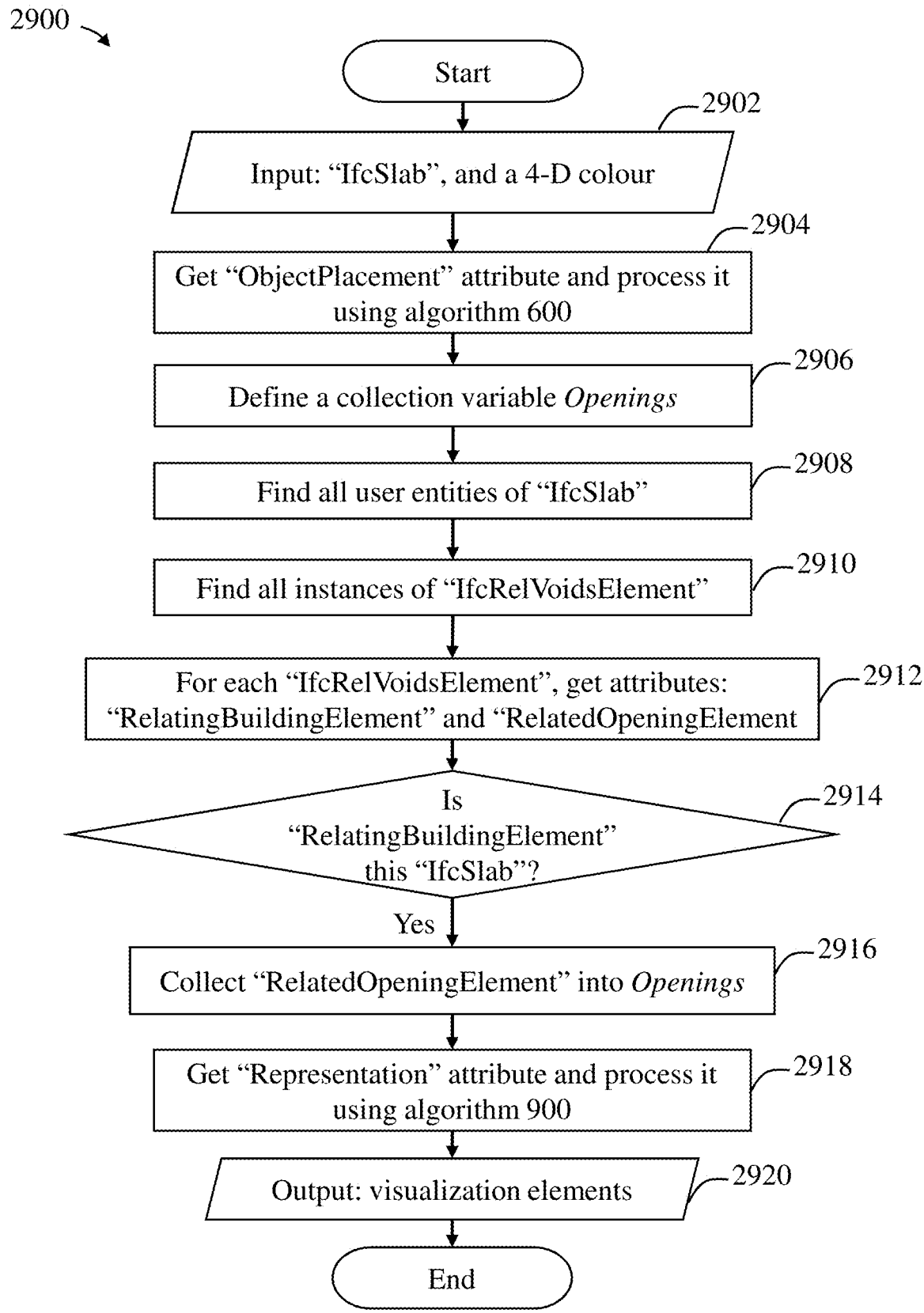
FIG. 29 is a flowchart diagram for algorithm Process_Slab.

Referring to FIG. 29, a flowchart diagram of algorithm 2900 Process Slab is shown. The algorithm 2900 takes as an input 2902 an "IfcSlab" and a four dimensional colour describing the red, green, blue, and transparency values. Furthermore, the algorithm 2900 returns as its output 2920 corresponding visualization elements. The first step 2904 is to get the "ObjectPlacement" attribute of the "IfcSlab" (i.e., an "IfcLocalPlacement"), process it using the algorithm 600. The next step 2906 is to define a collection variable Openings. The next step 2908 is to find all user entities of the "IfcSlab". The next step 2910 is to find all instances of "IfcRelVoidsElement" in the found user entities from the previous step 2908. The next step 2912 is to get the "RelatingBuildingElement" and "RelatedOpeningElement" attributes for each "IfcRelVoidsElement". The next step 2914 is to determine if the value of the "RelatingBuildingElement" attribute is this "IfcSlab". If it is, the next step 2916 is to collect the "RelatedOpeningElement" into collection variable Openings. The next step 2918 is to get the "Representation" attribute of the "IfcSlab" (i.e., an "IfcProductDefinitionShape"), process it using the algorithm 900.

Figure 30:
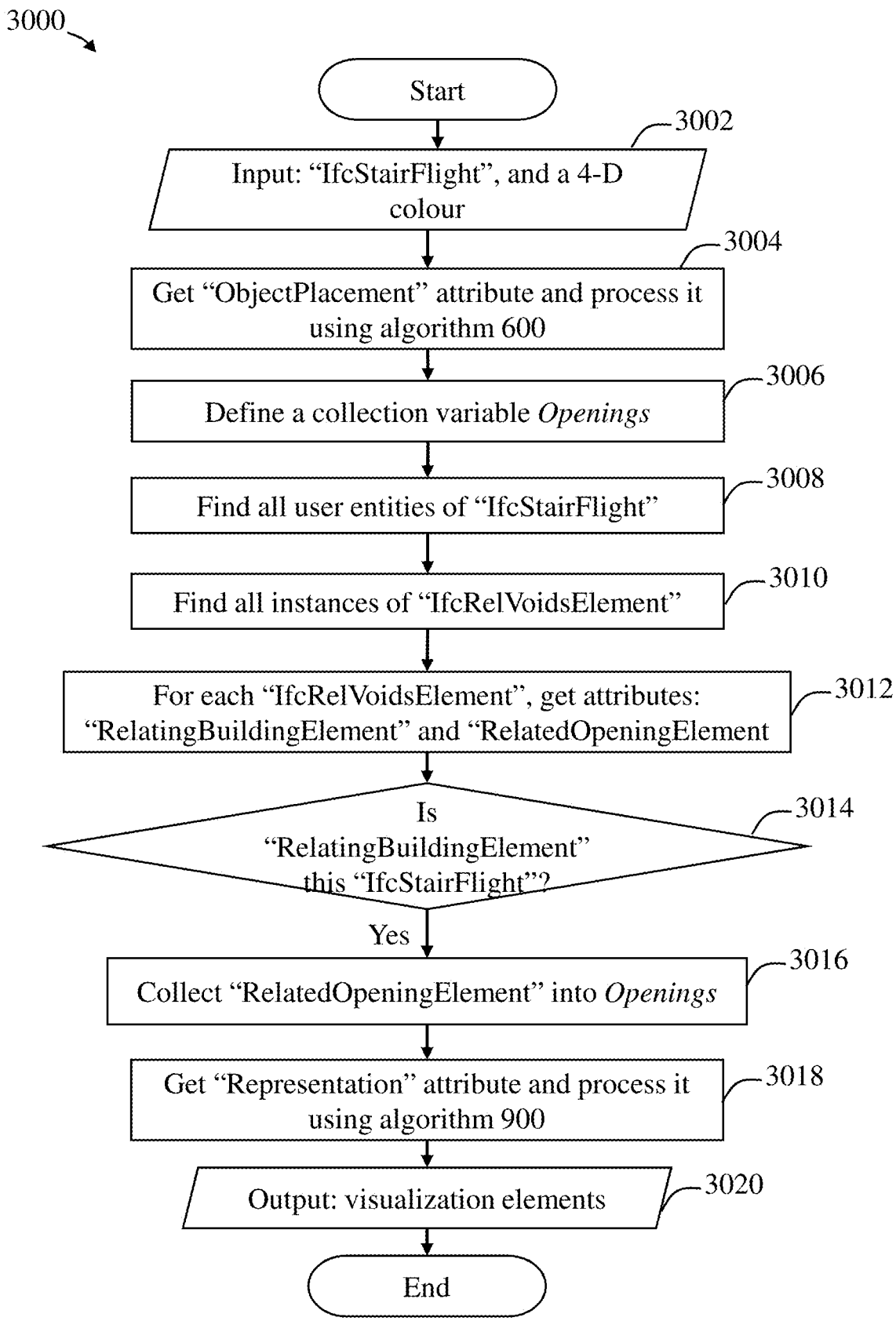
FIG. 30 is a flowchart diagram for algorithm Process_StairFlight.

Referring to FIG. 30, a flowchart diagram of algorithm 3000 Process StairFlight is shown. The algorithm 3000 takes as an input 3002 an "IfcStairFlight" and a four dimensional colour describing the red, green, blue, and transparency values. Furthermore, the algorithm 3000 returns as its output 3020 corresponding visualization elements. The first step 3004 is to get the "ObjectPlacement" attribute of the "IfcStairFlight" (i.e., an "IfcLocalPlacement"), process it using the algorithm 600. The next step 3006 is to define a collection variable Openings. The next step 3008 is to find all user entities of the "IfcStairFlight". The next step 3010 is to find all instances of "IfcRelVoidsElement" in the found user entities from the previous step 3008. The next step 3012 is to get the "RelatingBuildingElement" and "RelatedOpeningElement" attributes for each "IfcRelVoidsElement". The next step 3014 is to determine if the value of the "RelatingBuildingElement" attribute is this "IfcStairFlight". If it is, the next step 3016 is to collect the "RelatedOpeningElement" into collection variable Openings. The next step 3018 is to get the "Representation" attribute of the "Ifc-StairFlight" (i.e., an "IfcProductDefinitionShape"), process it using the algorithm 900.

Figure 31:
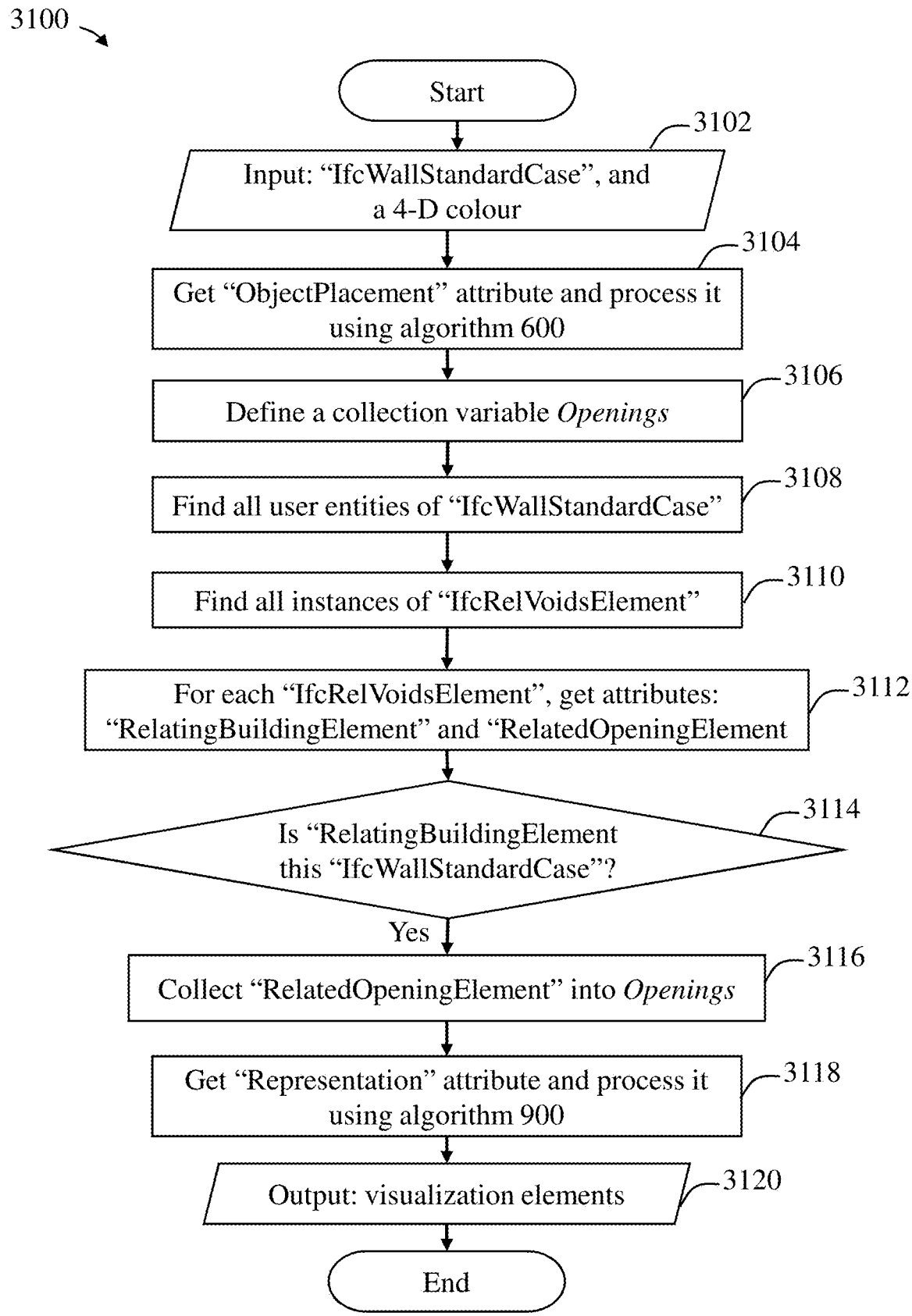
FIG. 31 is a flowchart diagram for algorithm Process_WallStandardCase.

Referring to FIG. 31, a flowchart diagram of algorithm 3100 Process WallStandardCase is shown. The algorithm 3100 takes as an input 3102 an "IfcWallStandardCase" and a four dimensional colour describing the red, green, blue, and transparency values. Furthermore, the algorithm 3100 returns as its output 3120 corresponding visualization elements. The first step 3104 is to get the "ObjectPlacement" attribute of the "IfcWallStandardCase" (i.e., an "IfcLocalPlacement"), process it using the algorithm 600. The next step 3106 is to define a collection variable Openings. The next step 3108 is to find all user entities of the "IfcWallStandardCase". The next step 3110 is to find all instances of "IfcRelVoidsElement" in the found user entities from the previous step 3108. The next step 3112 is to get the "RelatingBuildingElement" and "RelatedOpeningElement" attributes for each "IfcRelVoidsElement". The next step 3114 is to determine if the value of the "RelatingBuildingElement" attribute is this "IfcWallStandardCase". If it is, the next step 3116 is to collect the "RelatedOpeningElement" into collection variable Openings. The next step 3118 is to get the "Representation" attribute of the "IfcWallStandardCase" (i.e., an "IfcProductDefinitionShape"), process it using the algorithm 900.

Figure 32:
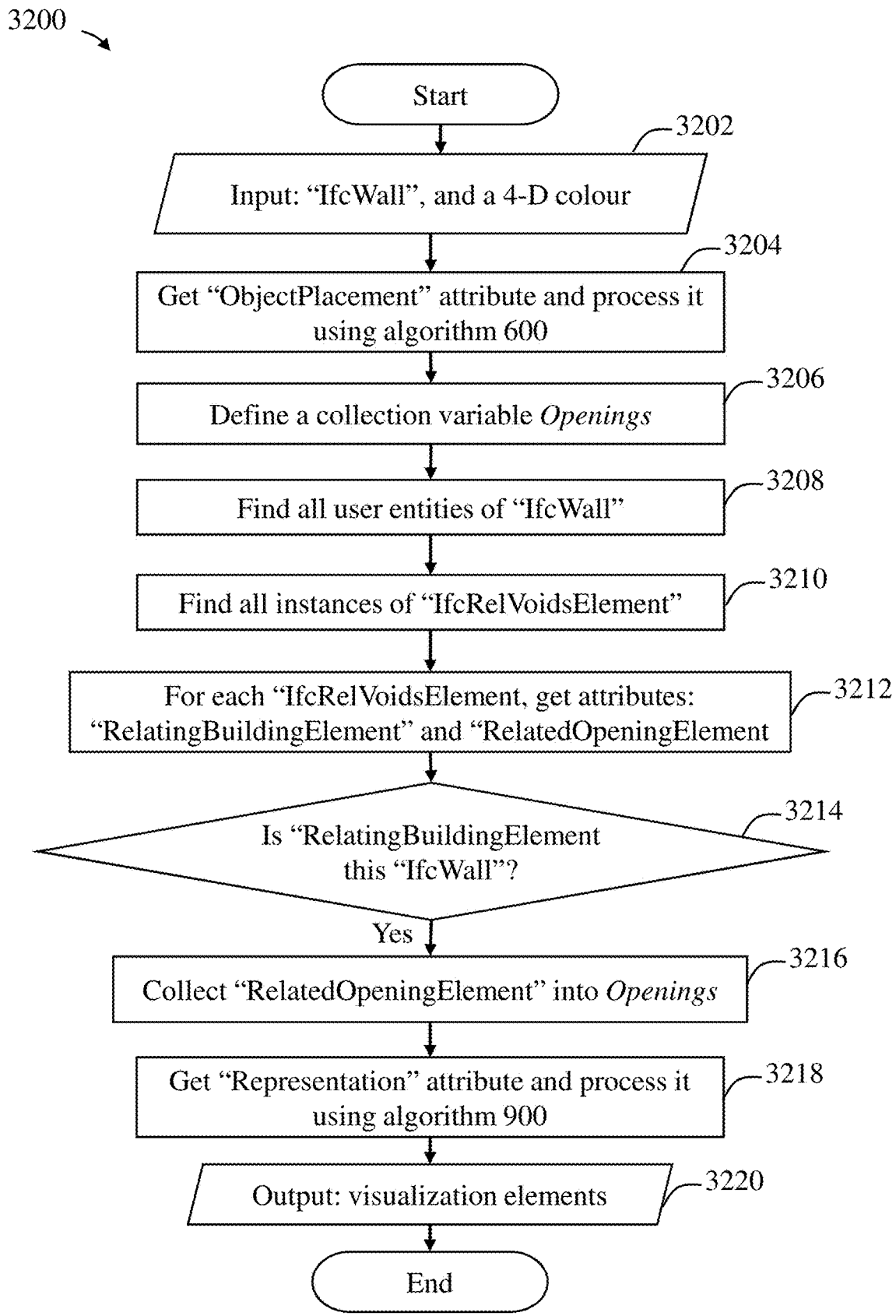
FIG. 32 is a flowchart diagram for algorithm Process_Wall.

Referring to FIG. 32, a flowchart diagram of algorithm 3200 Process Wall is shown. The algorithm 3200 takes as an input 3202 an "IfcWall" and a four dimensional colour describing the red, green, blue, and transparency values. Furthermore, the algorithm 3200 returns as its output 3220 corresponding visualization elements. The first step 3204 is to get the "ObjectPlacement" attribute of the "IfcWall" (i.e., an "IfcLocalPlacement"), process it using the algorithm 600. The next step 3206 is to define a collection variable Openings. The next step 3208 is to find all user entities of the "IfcWall". The next step 3210 is to find all instances of "IfcRelVoidsElement" in the found user entities from the previous step 3208. The next step 3212 is to get the "RelatingBuildingElement" and "RelatedOpeningElement" attributes for each "IfcRelVoidsElement". The next step 3214 is to determine if the value of the "RelatingBuildingElement" attribute is this "IfcWall". If it is, the next step 3216 is to collect the "RelatedOpeningElement" into collection variable Openings. The next step 3218 is to get the "Representation" attribute of the "IfcWall" (i.e., an "IfcProductDefinitionShape"), process it using the algorithm 900.

Figure 33:
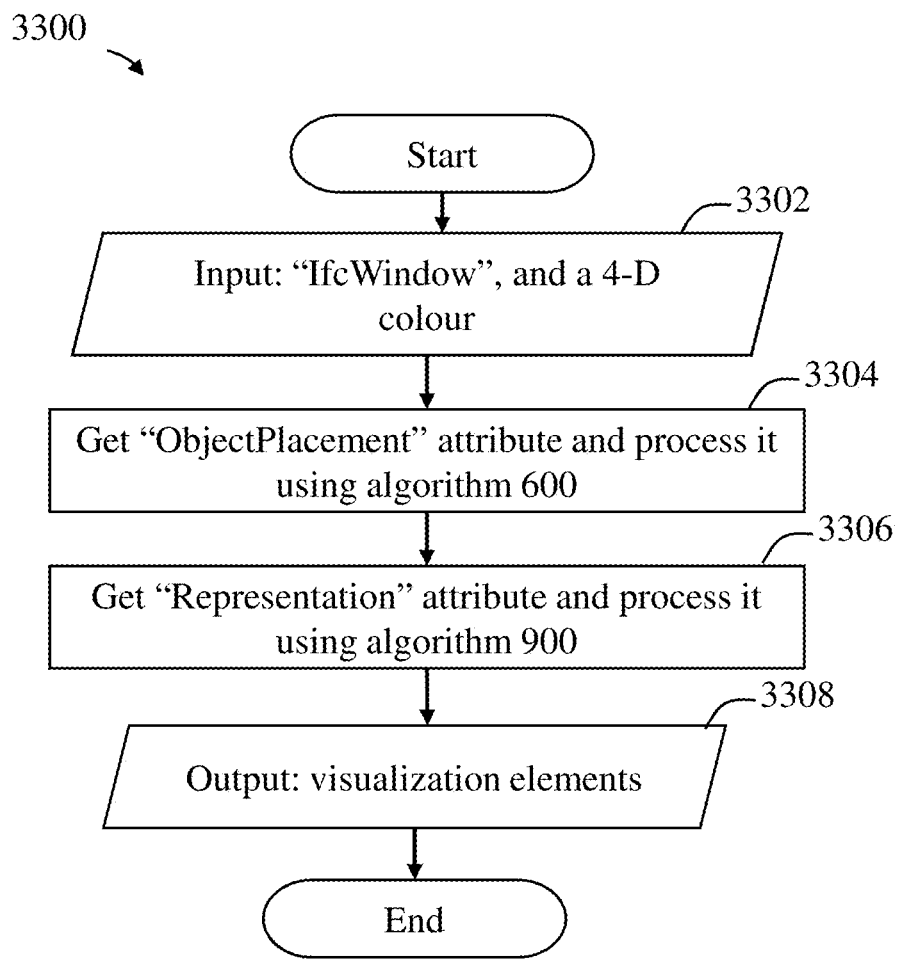
FIG. 33 is a flowchart diagram for algorithm Process_Window.

Referring to FIG. 33, a flowchart diagram of algorithm 3300 Process Window is shown. The algorithm 3300 takes as an input 3302 an "IfcWindow" and a four dimensional colour describing the red, green, blue, and transparency values. Furthermore, the algorithm 3300 returns as its output 3308 corresponding visualization elements. The first step 3304 is to get the "ObjectPlacement" attribute of the "IfcWindow" (i.e., an "IfcLocalPlacement"), process it using the algorithm 600. The next step 3306 is to get the "Representation" attribute of the "IfcWindow" (i.e., an "IfcProductDefinitionShape"), process it using the algorithm 900.

Figure 34:
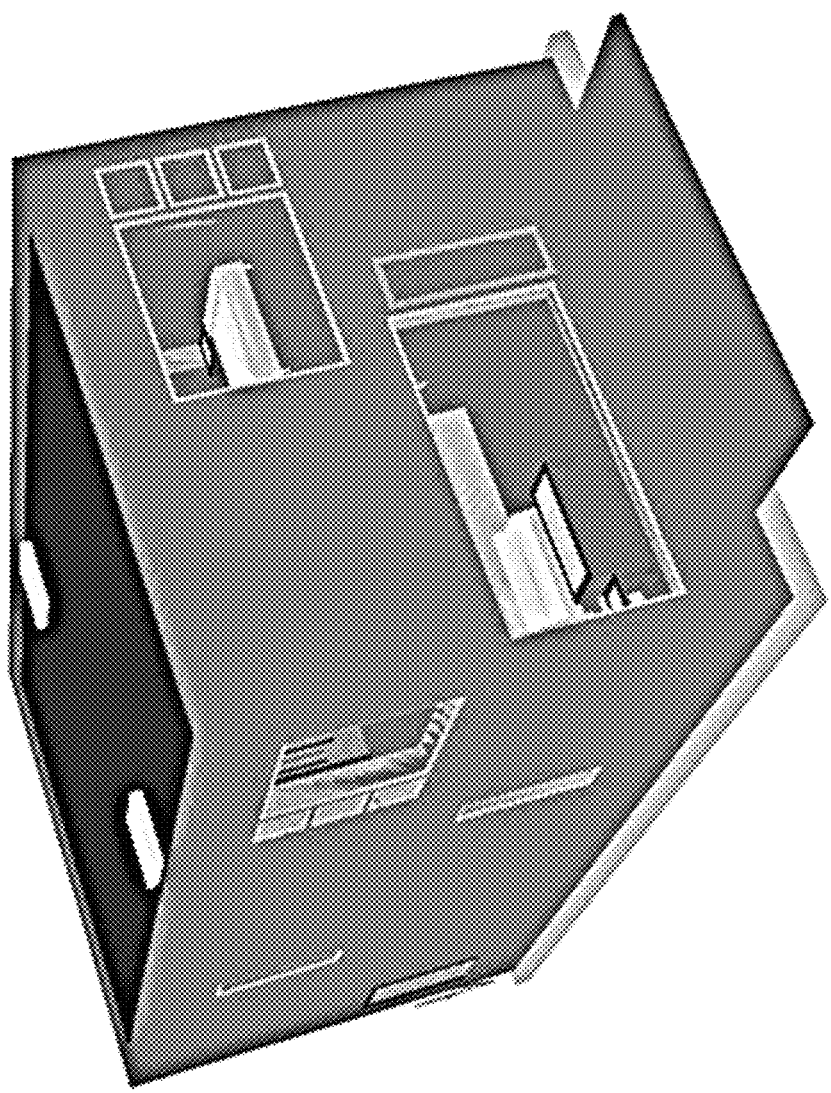
FIG. 34 is an example rendering result of a Duplex Apartment IFC model using methods described in this disclosure.

Referring to FIG. 34, an example rendering result 3400 of a duplex apartment IFC model using the disclosed methods described above is shown. The rendering 3400 was implemented in the Java programming language, however, other languages known to persons of ordinary skill in the art could be used.

Those having ordinary skill in the art will recognize that numerous modifications can be made to the specific implementations described above. The implementations should not be limited to the particular limitations described. Other implementations may be possible.

The invention claimed is:

1. A data-driven, object-oriented, and customizable method for visualizing a three-dimensional (3D) structure, comprising:
   receiving an industry foundation classes (IFC) object oriented model-based data file including instantiation of elements of a structure;
   identifying one or more instances of one or more 3D objects;
   for each 3D object instance:
      retrieving 3D object geometry information,
      dividing the 3D object geometry into a plurality of 3D polygons,
      retrieving 3D object placement information,
      associating the 3D object placement information with the plurality of 3D polygons,
      retrieving object color and transparency information,
      retrieving object functional parameters selected from the group consisting of forces, heat and mass flow, stresses, and strains,
      associating the object color and transparency information with the plurality of 3D polygons,
   providing data associated with the plurality of 3D polygons for the 3D object geometry to a 3D visualization engine;
   providing data associated with the plurality of 3D polygons for the 3D object placement information to the 3D visualization engine;
   providing data associated with the plurality of 3D polygons for the object color and transparency information to the 3D visualization engine;
   providing data associated with the plurality of 3D polygons for the functional parameters to the 3D visualization engine;
   generating a 3D model of the object based on the plurality of 3D polygons; and
   outputting a rendering of the 3D model for displaying on a digital display including one or more of the functional parameters.

2. The method of claim 1, wherein each of the plurality of 3D polygons is a 3D triangle.

3. The method of claim 1, wherein each of the plurality of 3D polygons has a constant size.

4. The method of claim 1, wherein each of the plurality of 3D polygons has a selective size based on size of the 3D object instance.

* * * * *